United States Patent
Nishiwaki

(10) Patent No.: US 11,947,240 B2
(45) Date of Patent: Apr. 2, 2024

(54) OPTICAL APPARATUS

(71) Applicant: Panasonic Intellectual Property Management Co., Ltd., Osaka (JP)

(72) Inventor: Seiji Nishiwaki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 534 days.

(21) Appl. No.: 17/324,164

(22) Filed: May 19, 2021

(65) Prior Publication Data
US 2021/0271149 A1 Sep. 2, 2021

Related U.S. Application Data

(63) Continuation of application No. PCT/JP2020/004402, filed on Feb. 5, 2020.

(30) Foreign Application Priority Data

Mar. 1, 2019 (JP) ............................... 2019-037401

(51) Int. Cl.
G02F 1/313 (2006.01)
G02F 1/295 (2006.01)

(52) U.S. Cl.
CPC ............ *G02F 1/3138* (2013.01); *G02F 1/295* (2013.01)

(58) Field of Classification Search
CPC ................................ G02F 1/3138; G02F 1/295
USPC ......................................................... 359/290
See application file for complete search history.

(56) References Cited

U.S. PATENT DOCUMENTS

5,142,394 A 8/1992 Asada et al.
9,091,667 B2 * 7/2015 Urbanowicz .......... G01N 23/00

FOREIGN PATENT DOCUMENTS

| JP | 3-179320 | 8/1991 |
| JP | 2013-195302 | 9/2013 |
| JP | 2017-156634 | 9/2017 |
| JP | 2017-187649 | 10/2017 |
| JP | 2018-535438 | 11/2018 |
| WO | 2017/095817 | 6/2017 |

OTHER PUBLICATIONS

International Search Report of PCT application No. PCT/JP2020/004402 dated Mar. 31, 2020.

\* cited by examiner

*Primary Examiner* — William Choi
(74) *Attorney, Agent, or Firm* — Rimon P.C.

(57) ABSTRACT

An optical apparatus includes a light source, an optical waveguide element, a light detector, and an optical system. The light source emits a light beam. The optical waveguide element includes first and second gratings. The first grating causes part of the light beam to propagate in the optical waveguide element as a guided light beam. The second grating causes part of the guided light beam to exit from the optical waveguide element. The optical system causes the light beam to enter the first grating and causes a reflected light beam from an object to enter the second grating. Part of the reflected light beam entering the second grating propagates in the optical waveguide element and exits from the first grating as an optical feedback beam. The optical system causes part of the optical feedback beam to enter the light detector as separated light beams separated depending on wavelength.

18 Claims, 32 Drawing Sheets

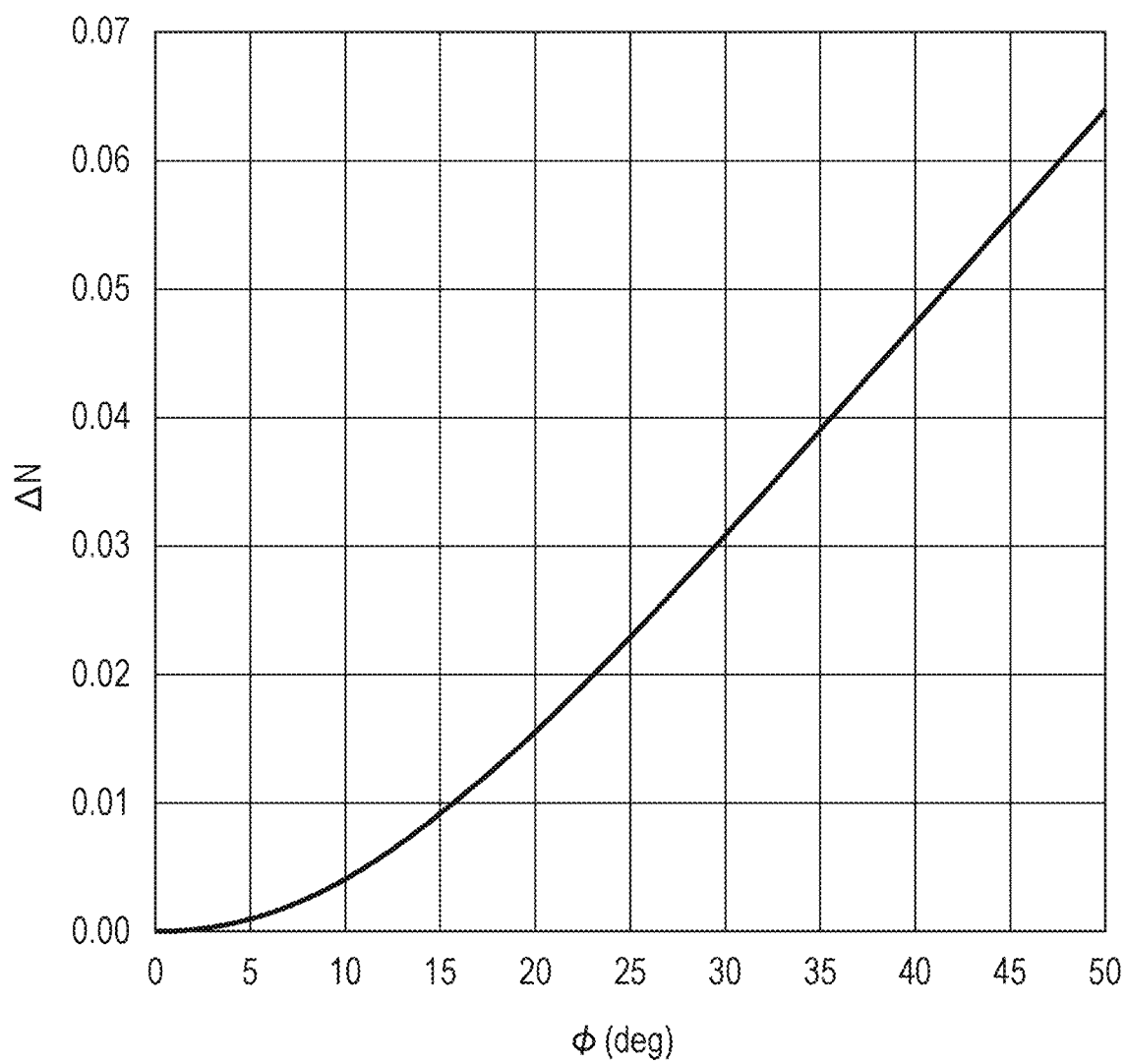

OPTICAL APPARATUS

BACKGROUND

1. Technical Field

The present disclosure relates to an optical apparatus.

2. Description of the Related Art

Various techniques for grasping positions of objects scattered in a field of view have been conventionally developed. For example, there is a technique in which an object is irradiated with a light pulse and a temporal delay of reflected light from the object is measured for each direction to measure a distance to a surface of the object. Japanese Unexamined Patent Application Publication No. 2017-187649 discloses an optical phased array using such a technique.

SUMMARY

In one general aspect, the techniques disclosed here feature an optical apparatus including: at least one light source that emits a light beam containing components of a plurality of wavelengths; an optical waveguide element that is located on a light path of the light beam; a light detector; and an optical system. The optical waveguide element includes: a first grating that has a refractive index varying along a moving radius direction of an imaginary circle about a point of incidence of the light beam and that causes part of the light beam to propagate in the optical waveguide element along the moving radius direction as a guided light beam; and a second grating that is arranged outside the first grating and has a refractive index varying along the moving radius direction and that causes part of the guided light beam to exit from the optical waveguide element as an exiting light beam. The optical system causes the light beam to enter the first grating and causes a reflected light beam generated by reflection of the exiting light beam on an object to enter the second grating. Part of the reflected light beam entering the second grating propagates in the optical waveguide element and exits from the first grating as an optical feedback beam. The optical system causes part of the optical feedback beam to enter the light detector as a plurality of separated light beams separated depending on wavelength. The light detector detects a light amount of each of the separated light beams.

Comprehensive or specific modes of the present disclosure may be implemented by a system, an apparatus, a method, an integrated circuit, a computer program, or a computer-readable recoding medium. Alternatively, the comprehensive or specific modes of the present disclosure may be implemented by a combination of any of the system, the apparatus, the method, the integrated circuit, the computer program, and the recoding medium. The computer-readable recoding medium may include, for example, a non-volatile recording medium such as a compact disc-read only memory (CD-ROM). The apparatus may be formed of one or more apparatuses. When the apparatus is formed of two or more apparatuses, the two or more apparatuses may be arranged in one machine or arranged separately in two or more separate machines. In the specification and the scope of claims, the "apparatus" means not only one apparatus but also a system formed of multiple apparatuses.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7A is a diagram illustrating a relationship between a deviation angle of a propagation direction and a variation amount of an effective refractive index of the guided light beam for achieving the aberration correction;

DETAILED DESCRIPTION (Underlying Knowledge Forming Basis of the Present Disclosure)

Underlying knowledge forming basis of the present disclosure is described before description of embodiments of the present disclosure. In this specification, a term "light" is used not only for visible light but also for non-visible light such as infrared.

As a method of light irradiation for grasping positions of objects scattered in a field of view, there are two typical methods. One method is a method of uniformly irradiating the entire field of view with a light pulse. Another method is a method of exhaustively scanning the entire field of view with a laser beam having directivity. The latter method can suppress an amount of emitted light to a lower level than the former method.

In the scanning with the laser beam, a light source, a light detector, and a galvano mirror are generally arranged on a rotating stage. Light emitted from the light source is reflected on the galvano mirror. Rotating the galvano mirror in an up-down direction enables optical scanning in a vertical direction. Rotating the rotating stage enables optical scanning in a horizontal direction. However, since an apparatus using the galvano mirror has a mechanical structure, this apparatus has a low scanning rate, a large size, and a high price.

As an effort to reduce the mechanical structure, there is known an apparatus that performs optical scanning by using a phased array as disclosed in, for example, Japanese Unexamined Patent Application Publication No. 2017-187649.

Principles of optical scanning using the phased array are described below.

Figure 15A:
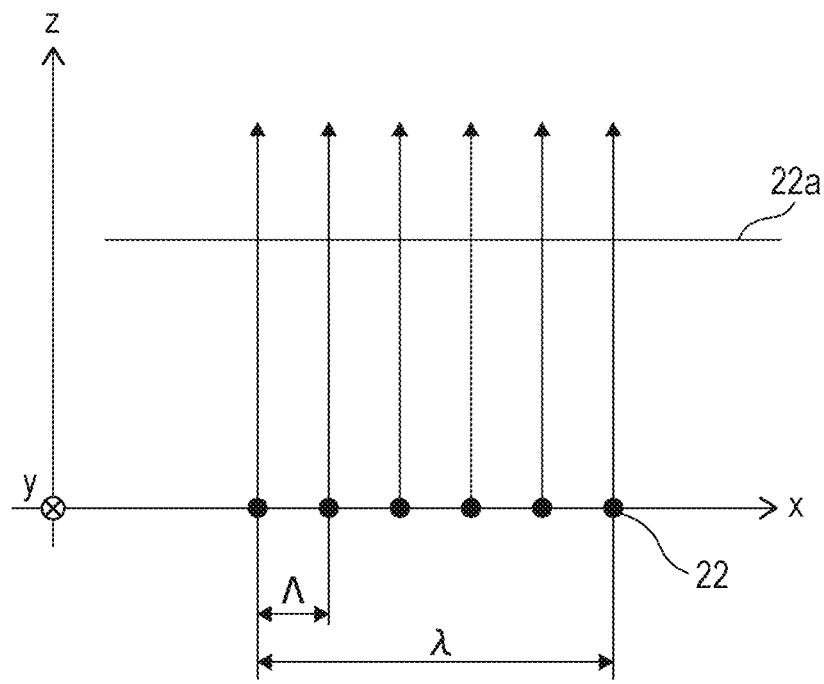
FIG. 15A is a view schematically illustrating laser beams emitted in a vertical direction from a phased array.
Figure 15B:
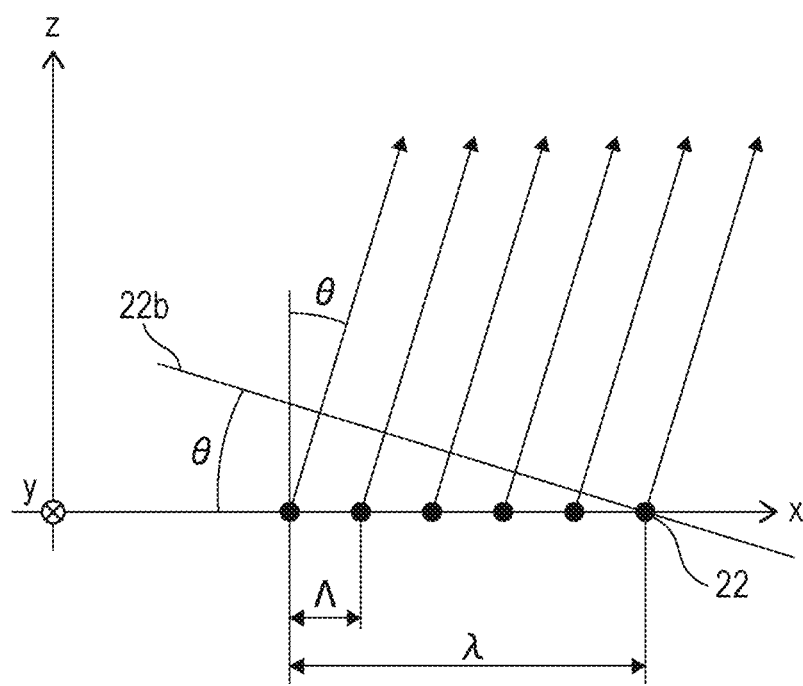
FIG. 15B is a view schematically illustrating laser beams emitted in a tilted direction from the phased array.

FIGS. 15A and 15B are views schematically illustrating laser beams emitted from the phased array in the vertical direction and a tilted direction, respectively. In the examples illustrated in FIGS. 15A and 15B, a z-axis is set in the vertical direction and multiple wave sources 22 are arranged on an x-axis at equal intervals of pitch Λ. When light beams having a wavelength λ and an aligned phase are oscillated from the multiple wave sources 22, as illustrated in FIG. 15A, excited light beams propagate while forming a wavefront 22a parallel to the x-axis. When the light beams are oscillated such that a phase difference between left and right wave sources adjacent to each other is Λ sin θ, as illustrated in FIG. 15B, the excited light beams propagate while forming a wavefront 22b that forms an angle θ with the x-axis. The propagation direction of the excited light beams can be set in two axes by evenly and two-dimensionally arranging the wave sources 22 along the x-axis and a y-axis and adjusting the excitation phase of these wave sources 22.

However, in the method using the phased array, the pitch Λ of the wave sources 22 needs to be set to a fraction of the wavelength λ or less to form the wavefront. In the case of a radio wave, the wavelength is, for example, 10 cm or more. Accordingly, the multiple wave sources 22 that function as antennas configured emit the radio wave can be arranged at intervals of a fraction of the wavelength or less. However, in the case of light, the wavelength is less than 1 μm. Accordingly, it is not easy to arrange the multiple wave sources 22 at intervals of a fraction of the wavelength or less, specifically submicron. Moreover, when laser light sources are used, the light beams are oscillated through an amplification process in oscillators. Accordingly, unlike the radio wave, control of the phases of the laser light beams is not easy.

The present inventors found the aforementioned problems and came up with a new configuration.

An optical apparatus according to one aspect of the present disclosure includes at least one light source that emits a light beam containing components of wavelengths, an optical waveguide element that is located on a light path of the light beam, a light detector, and an optical system. The optical waveguide element includes a first grating that has a refractive index varying along a moving radius direction of an imaginary circle about a point of incidence of the light beam and that causes part of the light beam to propagate in the optical waveguide element along the moving radius direction as a guided light beam and a second grating that is arranged outside the first grating and has a refractive index varying along the moving radius direction and that causes part of the guided light beam to exit from the optical waveguide element as an exiting light beam. The optical system causes the light beam to enter the first grating and causes a reflected light beam generated by reflection of the exiting light beam on an object to enter the second grating. Part of the reflected light beam entering the second grating propagates in the optical waveguide element and exits from the first grating as an optical feedback beam. The optical system causes part of the optical feedback beam to enter the light detector as separated light beams separated depending on wavelength. The light detector detects a light amount of each of the separated light beams.

Such a configuration enables detection of reflected light beams from objects corresponding respectively to components of multiple wavelengths. This can increase a detection range and improve resolution from those in the case where a light beam of a single wavelength is used.

The first grating may have a concentric structure about the point of incidence of the light beam. The second grating may similarly have a concentric structure about the point of incidence of the light beam. Configuring the gratings to have the concentric structures enables easy control of a direction of the exiting light beam to the outside by controlling voltage applied to the optical waveguide element as described later.

The at least one light source may be a single light source that emits a single light beam containing the components of the wavelengths. The light source may be, for example, a laser light source that emits multi-mode laser beams. In this case, directions of light beams exiting from the second grating of the optical waveguide element vary depending on the wavelength. Detecting information on the components of multiple wavelengths can improve spatial resolution from that in the case of using a light beam with a single wavelength. An embodiment of the optical apparatus including the single light source is described in detail later as a first embodiment.

The at least one light source may include light sources. Each of the light sources may emit a corresponding one of light beams with different wavelengths. The optical system may be configured to integrate the light beams and cause the integrated light beam to enter the first grating. The optical system may include a dichroic mirror that integrates the light beams. The optical system may include multiple dichroic mirrors. Each of the multiple light sources may be configured to emit a light beam of a single wavelength or emit a light beam in which light beams of multiple wavelength components are superimposed on one another. Using the multiple light beams with different wavelengths can increase the scan range. An embodiment of the optical apparatus including multiple light sources is described later in detail as a second embodiment.

The optical system may include one or more dichroic mirror that integrates the multiple light beams.

The optical system may include a linear diffraction grating that separates part of the optical feedback beam depending on wavelength to generate the separated light beams. The linear diffraction grating may be a reflection type linear diffraction grating. It is possible to use a Littrow reflective linear diffraction grating in which the entrance direction and the diffraction direction of the light beam substantially match each other in a plane including a normal line of a diffraction surface of the reflection type linear diffraction grating and a grating vector of the reflection type linear diffraction grating.

The optical system may include an optical element that converts a wavefront of the light beam emitted from the light source to a conical wavefront and cause the light beam to enter the first grating with the conical wavefront maintained.

The optical system may include a transparent member having a bottom surface that faces the optical waveguide element and a side surface that is a rotationally-symmetric body having an imaginary axis extending along the light path as a center axis. The optical system may be configured such that the exiting light beam from the second grating enters the transparent member from the bottom surface or the side surface and exits from the side surface.

The transparent member may be a truncated conical prism. A bottom surface with the smaller area out of two bottom surfaces of the truncated conical prism facing each other may be in contact with a surface of the optical waveguide element. The exiting light beam may enter the side surface of the truncated conical prism. The side surface of the truncated conical prism may include a grating whose grating line extends along a circumferential direction of the truncated conical prism.

The optical waveguide element may include a hollow substrate on the surface, the hollow substrate including a cavity or recess with a truncated conical shape having the axis as a center axis. The truncated conical prism may be surrounded by the cavity or the recess.

The optical waveguide element may include, for example, a transparent electrode layer, a liquid crystal layer, a waveguide layer, a dielectric layer, and a reflective electrode layer in this order. The waveguide layer may include the first grating and the second grating on a surface and may have a higher refractive index than the liquid crystal layer. The dielectric layer may have a lower refractive index than the waveguide layer. This structure causes the waveguide layer to function as an optical waveguide path. The refractive index of the liquid crystal layer can be changed by applying voltage between the transparent electrode layer and the reflective electrode layer. This enables changing of an effective refractive index of an optical waveguide path defined by the waveguide layer and changing of an exit angle of the light beam radiating from the second grating.

The waveguide layer may further include a third grating, used to control alignment of liquid crystal molecules in the liquid crystal layer, on the surface between the first grating and the second grating. An alignment direction of the liquid crystal molecules in the state where no voltage is applied can be aligned in a direction perpendicular to a grating vector of the third grating by providing the third grating.

At least one selected from the group consisting of the transparent electrode layer and the reflective electrode layer may include a first electrode facing the first grating, a second electrode facing the second grating, and a third electrode facing the third grating. Voltages can be thereby individually applied to the first to third electrodes.

The third electrode may include divided regions arranged in a circumferential direction of the imaginary circle and insulated from one another. Different voltages can thereby applied to the multiple divided regions and the direction of the exiting light beam can be controlled more finely.

The optical apparatus may further include a control circuit that applies voltage between the transparent electrode layer and the reflective electrode layer. The control circuit can control the direction of the exiting light beam by controlling the voltage applied to the liquid crystal layer via the second electrode.

In the present disclosure, all or some of circuits, units, devices, members, or parts or all or some of functional blocks in the block diagrams may be implemented by, for example, one or multiple electronic circuits that include a semiconductor device, a semiconductor integrated circuit (IC), or a large scale integration (LSI). The LSI or the IC may be integrated on one chip or formed by combining multiple chips. For example, functional blocks other than a storage element may be integrated on one chip. In this description, although a device referred to as LSI or IC is used, the name may change depending on the degree of integration, and a device referred to as system LSI, very large scale integration (VLSI), or ultra large scale integration (ULSI) may be used. A field programmable gate array (FPGA) that is programed after manufacturing of LSI or a reconfigurable logic device that allows reconfiguration of connection relationships in LSI or setup of circuit sections in the LSI may also be used for the same purpose.

Moreover, functions or operations of all or some of the circuits, the units, the devices, the members, and the parts can be implemented by software processing. In this case, software is recorded in one or multiple non-temporary recording media such as a ROM, an optical disc, and a hard disk drive and, when a processor executes the software, the processor and a peripheral device execute a determined function in the software. The system or the apparatus may include one or multiple non-temporary recording media in which the software is recorded, a processor, and a necessary hardware device such as, for example, an interface.

The embodiments of the present disclosure are specifically described below with reference to the drawings. Note that the embodiments described below all illustrate comprehensive or specific examples. Numerical values, shapes, components, arranged positions and connection modes of the components, steps, the order of the steps, and the like are examples and are not intended to limit the technique of the present disclosure. Moreover, components not described in the independent claim describing the highest concept among the components in the following embodiments are described as optional components. Moreover, the drawings are schematic and are not always strict illustration. Furthermore, in the drawings, components that are substantially the same are denoted by the same or similar reference numerals and overlapping description is omitted or simplified in some cases.

First Embodiment

Figure 1A:
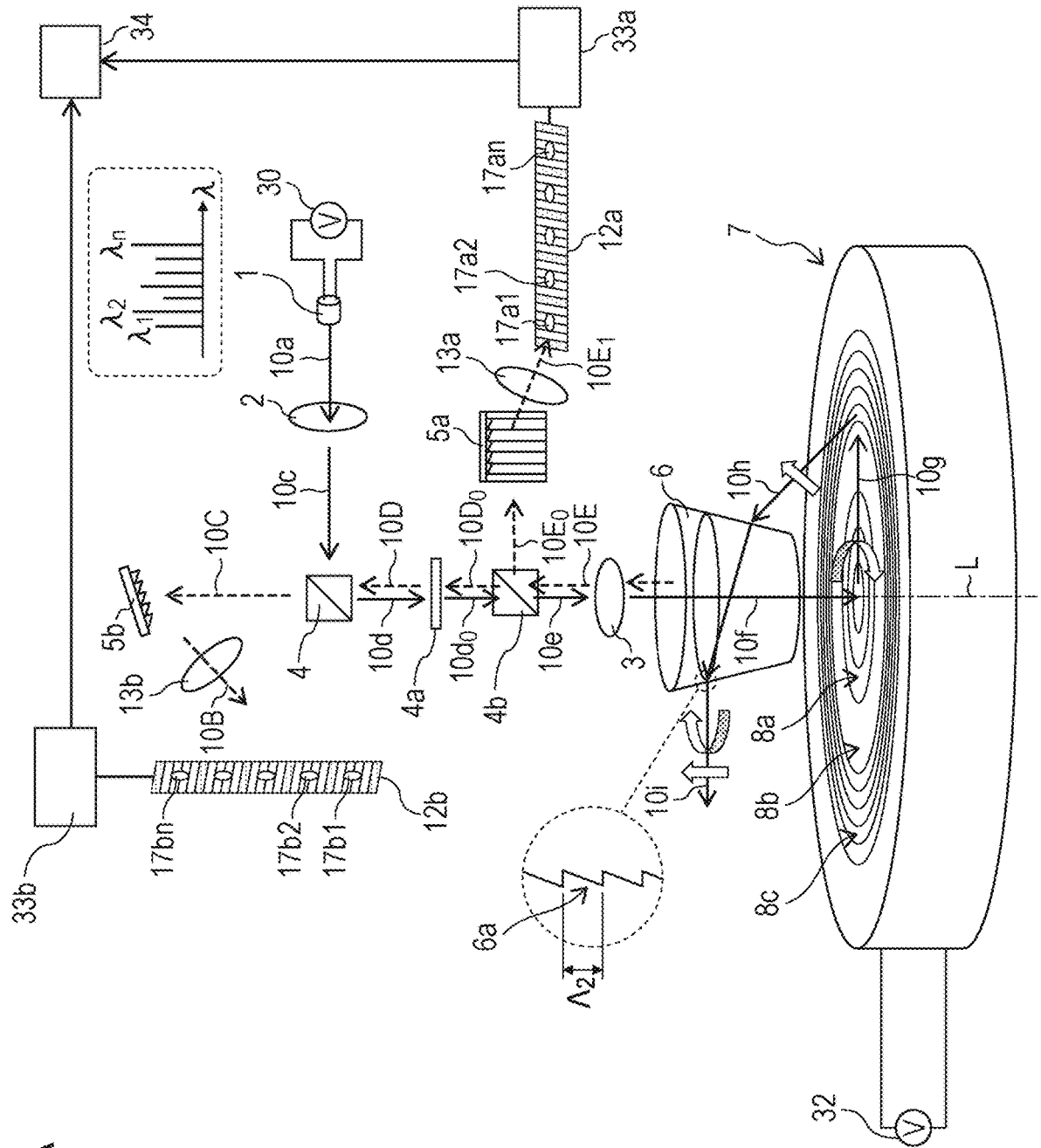
FIG. 1A is a perspective view schematically illustrating a configuration of an optical apparatus and a path of a beam in a first embodiment.
Figure 1B:
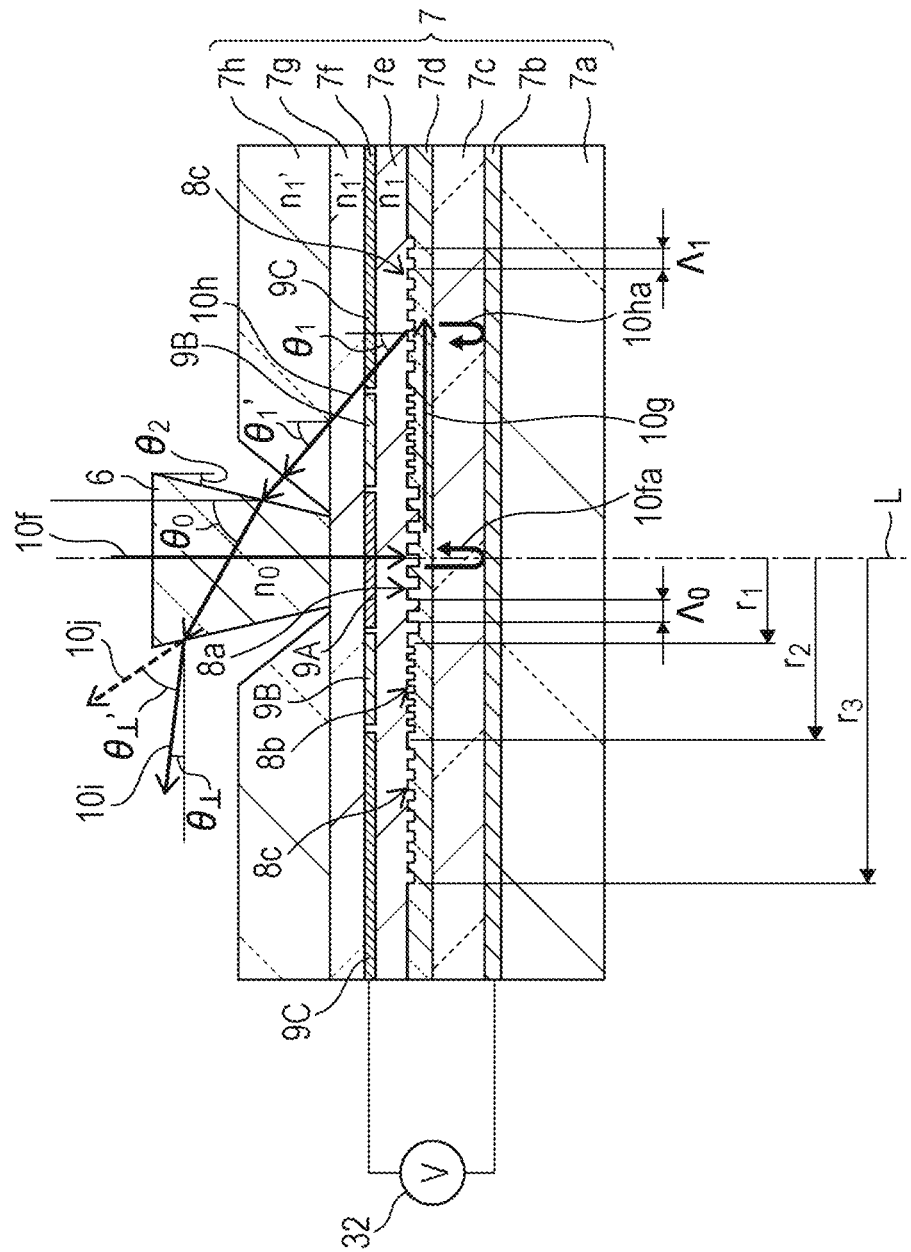
FIG. 1B is a cross-sectional view schematically illustrating part of the configuration of the optical apparatus and the path of the beam in the first embodiment.

FIG. 1A is a perspective view schematically illustrating a configuration of an optical apparatus and a path of a beam in a first embodiment. FIG. 1B is a cross-sectional view schematically illustrating part of the configuration of the optical apparatus and the path of the beam. This optical apparatus includes a light source 1, an optical waveguide element 7, light detectors 12a and 12b, detection circuits 33a and 33b, a main control circuit 34, a light source control circuit 30, a liquid crystal control circuit 32, and an optical system. The optical system is a collection of multiple optical elements. The optical system in the embodiment includes a collimator lens 2, a polarization spectrometer 4, a quarter wave plate 4a, a half mirror 4b, a condensing lens 3, a truncated conical prism 6, wavelength spectrometers 5a and 5b, and detection condensing lenses 13a and 13b. The wavelength spectrometer 5b, the polarization spectrometer 4, the quarter wave plate 4a, the half mirror 4b, the condensing lens 3, the truncated conical prism 6, and the optical waveguide element 7 are arranged such that the centers of these elements are located on an axis L. In the following description, a direction parallel to the axis L is referred to as a vertical direction and a direction orthogonal to the vertical direction is referred to as a horizontal direction for the sake of convenience. These terms are merely for the sake of convenience and do not limit the position of the optical apparatus in actual usage.

The light source control circuit 30 controls the light source 1. The liquid crystal control circuit 32 controls alignment of liquid crystal included in the optical waveguide element 7. The main control circuit 34 controls the light source control circuit 30 and the liquid crystal control circuit 32 based on signals outputted from the detection circuits 33a and 33b. The main control circuit 34, the light source control circuit 30, the liquid crystal control circuit 32, and the detection circuits 33a and 33b may be different circuits separate from one another or all or some of these circuits may be formed of a single circuit.

The light source 1 of the embodiment is a laser light source. The light source control circuit 30 outputs a control signal for controlling laser oscillation. The light source 1 emits a laser light beam 10a that is linearly polarized light with a central wavelength $\lambda$, in response to the control signal. The light source 1 oscillates in multi-mode. Light generated in this multi-mode is overlapping of light beams of n wavelengths $\lambda_1, \lambda_2, \ldots, \lambda_n$ set away from one another at intervals of, for example, about 0.2 nm near the wavelength λ. The sign n is an integer of 2 or more. For example, when n=10, light beams of 10 wavelengths are included in a range of ±1 nm with respect to λ.

The laser light beam 10a emitted from the light source 1 passes the collimator lens 2 to become a parallel light beam 10c. The parallel light beam 10c is reflected on the polarization spectrometer 4 and becomes a light beam 10d. The polarization spectrometer 4 is an optical element such as, for example, a polarization beam splitter that separates light in different directions depending on polarization component. A beam shaping prism may be inserted between the collimator lens 2 and the polarization spectrometer 4. When the parallel light beam 10c spreads in an ellipsoidal shape, the distribution of the parallel light beam 10c can be converted to a circular shape by providing the beam shaping prism. The light beam 10d reflected on the polarization spectrometer 4 enters the quarter wave plate 4a along the axis L and is converted to circularly-polarized light beam $10d_0$. The light beam $10d_0$ is transmitted through the half mirror 4b along the axis L and becomes a light beam 10e. The light beam 10e is condensed by the condensing lens 3 and enters the truncated conical prism 6. The truncated conical prism 6 is a transparent member with a refractive index $n_0$. A light beam 10f having passed the truncated conical prism 6 enters a center portion of the optical waveguide element 7.

Note that FIG. 1A illustrates a state where the truncated conical prism 6 and the optical waveguide element 7 are out of contact with each other for the sake of description. In actual, a bottom surface with the smaller area out of two bottom surfaces of the truncated conical prism 6 facing each other is in contact with the optical waveguide element 7. Moreover, although omitted in FIG. 1A, a hollow substrate 7h is actually provided on a surface of the optical waveguide element 7 as illustrated in FIG. 1B.

As illustrated in FIG. 1B, the optical waveguide element 7 is a laminated structure including multiple layers stacked one on top of another. The optical waveguide element 7 includes a flat surface substrate 7a, a reflective electrode layer 7b, a buffer layer 7c that is a dielectric layer, a waveguide layer 7d, a liquid crystal layer 7e, a transparent electrode layer 7f, a flat surface substrate 7g, and the hollow substrate 7h in this order. The flat surface substrates 7a and 7g are transparent substrates with flat surface shapes. The hollow substrate 7h is a transparent substrate with a truncated conical cavity or recess in a center portion. The truncated conical prism 6 is arranged in the cavity or recess of the hollow substrate 7h. The truncated conical prism 6 and the hollow substrate 7h are in close contact with the flat surface substrate 7g with the axis L being the common axis. In the embodiment, the flat surface substrates 7a and 7g and the hollow substrate 7h are made of a transparent material with a refractive index $n_1'$. However, these substrates may be made of materials with different refractive indices.

The reflective electrode layer 7b, the buffer layer 7c, the waveguide layer 7d, the liquid crystal layer 7e, and the transparent electrode layer 7f are located between the flat surface substrate 7a and the flat surface substrate 7g. The refractive index of the waveguide layer 7d is higher than both refractive indices of the buffer layer 7c and the liquid crystal layer 7e on both sides of the waveguide layer 7d. The buffer layer 7c, the waveguide layer 7d, and the liquid crystal layer 7e are held between the transparent electrode layer 7f and the reflective electrode layer 7b. The reflective electrode layer 7b can be made of a metal material such as, for example, aluminum (Al). The buffer layer 7c is a dielectric layer made of a transparent material with a relatively low refractive index such as, for example, silicon dioxide ($SiO_2$). The waveguide layer 7d can be made of a transparent material with a relatively high refractive index such as, for example, tantalum pentoxide ($Ta_2O_5$). The reflective electrode layer 7b, the buffer layer 7c, and the waveguide layer 7d are formed as films in this order on a surface of the flat surface substrate 7a. The transparent electrode layer 7f can be made of an electrically-conductive transparent material such as, for example, indium tin oxide (ITO).

The optical waveguide element 7 includes gratings 8a, 8b, and 8c. The gratings 8a, 8b, and 8c having concentric uneven structures with the axis L being the center axis are provided on a surface of the waveguide layer 7d. The grating 8a is formed in a circular region located at the center of the surface of the waveguide layer 7d. The grating 8a includes multiple recess portions and multiple protruding portions periodically arranged from the center in the moving radius direction. The grating 8a corresponds to the aforementioned "first grating". The grating 8b is formed on the surface of the waveguide layer 7d, in a ring-shaped region located outside the region in which the grating 8a is formed. The grating 8b corresponds to the aforementioned "third grating". The grating 8c is formed on the surface of the waveguide layer 7d, in a ring-shaped region located outside the region in which the grating 8b is formed. The grating 8c corresponds to the aforementioned "second grating". The grating 8b and 8c also include multiple recess portions and multiple protruding portions periodically arranged in the moving radius direction. The grating 8a and the grating 8c function as a grating coupler. The grating 8b is a grating for liquid crystal alignment. Each of the gratings 8a, 8b, and 8c is not limited to a circular or ring shape and may have a circular or ring shape with a missing portion, such as, for example, a fan shape.

The grating 8a is formed in the circular region with a radius $r_1$ about the axis L. The pitch of the grating 8a is $\Lambda_0$ and the depth is $d_0$. The grating 8b is formed in the ring-shaped region in a range of the radius $r_1$ to a radius $r_2$. For example, the pitch of the grating 8b is $0.8\Lambda_1$ or less and the depth is $d_1$. The grating 8c is formed in the ring-shaped region in a range of the radius $r_2$ to a radius $r_3$. The pitch of the grating 8c is $\Lambda_1$ and the depth is $d_1$. The pitch $\Lambda_0$ and depth $d_0$ of the grating 8a and the pitch $\Lambda_1$ and depth $d_1$ of the grating 8c are set to appropriate values satisfying coupling conditions to be described later. In the embodiment, $\Lambda_0 > \Lambda_1$ and $d_0 > d_1$. The typical sizes of the radiuses $r_1$, $r_2$, and $r_3$ are on the order of sub-millimeter or millimeter. The typical sizes of the pitches $\Lambda_0$ and $\Lambda_1$ and the depths $d_0$ and $d_1$ are on the order of submicron. When the pitch of the grating 8b is set to, for example, $0.8\Lambda_1$ or less, the uneven structure of the grating 8b functions only for the liquid crystal alignment and does not function as the grating coupler. Accordingly, the uneven structure of the grating 8b does not allow radiation of the guided light beam. Meanwhile, the uneven structure of the grating 8c allows radiation of the guided light beam.

As long as an uneven structure appears on the surface of the waveguide layer 7d on the liquid crystal layer 7e side, an uneven structure similar to the gratings 8a, 8b, and 8c may be formed also on a surface of the buffer layer 7c on the waveguide layer 7d side. Appearance of the uneven structure on the surface of the waveguide layer 7d on the liquid crystal layer 7e side causes the gratings to function as means of aligning the liquid crystal. The liquid crystal molecules are aligned in the circumferential direction in which the recess portions of the gratings extend.

The transparent electrode layer 7f made of ITO or the like is formed on a surface of the flat surface substrate 7g on the waveguide layer 7d side. The transparent electrode layer 7f faces the waveguide layer 7d with the liquid crystal layer 7e therebetween. The transparent electrode layer 7f and the reflective electrode layer 7b function as electrodes for controlling alignment of the liquid crystal molecules in the liquid crystal layer 7e. The transparent electrode layer 7f in the embodiment is divided into three regions of regions 9A, 9B, and 9C with the axis L at the center. The regions 9A, 9B, and 9C face the gratings 8a, 8b, and 8c, respectively. In the state where no voltage is applied to the liquid crystal layer 7e, the liquid crystal molecules of the liquid crystal layer 7e are aligned in the direction in which the recess portions on the surface of the waveguide layer 7d extend, that is in a rotation direction about the axis L. In other words, the alignment direction of the liquid crystal in the liquid crystal layer 7e is parallel to the surface of the waveguide layer 7d and perpendicular to the grating vectors of the gratings 8a, 8b, and 8c. The regions 9A, 9B, and 9C function as independent electrodes. The reflective electrode layer 7b may be divided into three regions instead of the transparent electrode layer 7f. Alternatively, each of the transparent electrode layer 7f and the reflective electrode layer 7b may be divided into three regions.

A concentric grating about the axis L similar to the grating 8b may be formed on a surface of the flat surface substrate 7g on the transparent electrode layer 7f side. Similarly, concentric gratings about the axis L may be formed on the surface of the flat surface substrate 7g on the transparent electrode layer 7f side at positions facing the gratings 8a and 8c. Forming the uneven structure on the surface of the flat surface substrate 7g causes the uneven structure to be transferred also onto the surface of the transparent electrode layer 7f. The liquid crystal molecules of the liquid crystal layer 7e can be thereby aligned in the direction in which the recess portions extend. As a matter of course, the liquid crystal molecules in the liquid crystal layer 7e can be also aligned by forming an alignment film such as polyimide on the surface of at least one of the waveguide layer 7d or the transparent electrode layer 7f and performing rubbing processing on the alignment film in the circumferential direction.

The light beam 10f having passed a lower surface of the truncated conical prism 6 is circularly-polarized light and is focused on the grating 8a that is the grating coupler, along the axis L. The light beam 10f focused on the grating 8a excites a guided light beam 10g traveling from an intersection between the waveguide layer 7d and the axis L toward the outer peripheral side in the waveguide layer 7d. Since the circularly-polarized light enters the grating 8a, the guided light beam 10g is excited evenly in all deviation angle directions.

Figure 2A:
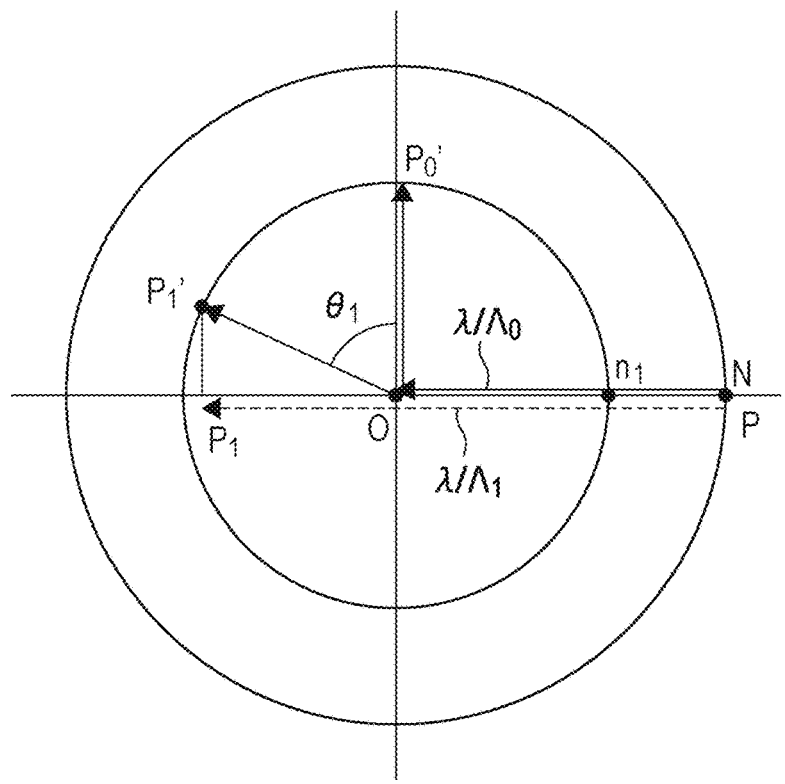
FIG. 2A is a vector diagram illustrating a relationship between a guided light beam and an entering light beam of an input grating coupler and a relationship between a radiating light beam and a guided light beam of an output grating coupler.

FIG. 2A is a vector diagram illustrating a relationship between the guided light beam and the entering light beam of the grating 8a that is an input grating coupler and a relationship between the radiating light beam and the guided light beam of the grating 8c that is an output grating coupler. The point of incidence of the light beam in the grating 8a is denoted by O. As illustrated in FIG. 2A, when an intersection of a circle with a radius of N and a horizontal axis is a point P, a coupling condition of the entering light beam with the guided light beam is such a condition that a magnitude of a lattice vector PO expressed by an arrow with the size $\lambda/\Lambda_0$ is equal to an effective refractive index N of the waveguide layer 7d. Specifically, this coupling condition is expressed by Math 1.

$$0 = N - \lambda/\Lambda_0 \qquad \text{[Math 1]}$$

As illustrated in FIG. 1B, a light beam 10fa transmitted through the grating 8a is reflected by the reflective electrode layer 7b, enters the grating 8a again, and increases excitation of the guided light beam 10g. The guided light beam 10g propagates in the moving radius direction of concentric circles. Part of the guided light beam 10g radiates from the grating 8c to the liquid crystal layer 7e at an angle $\theta_1$, this angle becomes an angle $\theta_1'$ in the hollow substrate 7h, and the part of the guided light beam 10g becomes a radiating light beam 10h traveling toward the truncated conical prism 6. In this case, assume that a relationship of $n_1' \times \sin \theta_1' = n_0 \times \sin \theta_0$ is established between a direction (angle $\theta_1'$) of the beam in the hollow substrate 7h with a refractive index $n_1'$ and a direction (angle $\theta_0$) of the beam in the truncated conical prism 6 with a refractive index no for sake of simplicity.

As illustrated in FIG. 2A, a coupling condition with the radiating light beam is such a condition that a foot of a perpendicular of a vector $OP_1'$ to the horizontal axis matches an end point $P_1$ of a lattice vector $PP_1$ expressed by a broken line arrow with a size $\lambda/\Lambda_1$, the vector $OP_1'$, having a size $n_1$ and forming an angle $\theta_1$ with respect to the vertical axis. This coupling condition is expressed as $-n_1 \sin \theta_1 = N - \lambda/\Lambda_1$. Based on Snell's Law ($n_1 \times \sin \theta_1 = n_1' \times \sin \theta_1'$) and the relationship of $n_1' \times \sin \theta_1' = n_0 \times \sin \theta_0$, the coupling condition is expressed by Math 2.

$$-n_0 \sin \theta_0 = N - \lambda/\Lambda_1 \qquad \text{[Math 2]}$$

As illustrated in FIG. 1B, a light beam 10ha having radiated from the grating 8c toward the reflective electrode layer 7b is reflected by the reflective electrode layer 7b and overlaps the radiating light beam 10h. The control signals from the liquid crystal control circuit 32 cause voltage to be applied to the liquid crystal layer 7e via the transparent electrode layer 7f and the reflective electrode layer 7b. This application of voltage causes the alignment of the liquid crystal to change. The refractive index $n_1$ of the liquid crystal layer 7e for the guided light beam 10g changes with this alignment change and the effective refractive index N of the waveguide layer 7d for the guided light beam 10g changes. When the effective refractive index N changes in the region of the grating 8c, the direction $\theta_1$ of the light beam exiting from the grating 8c to the outside of the optical waveguide element 7 changes. The liquid crystal control circuit 32 can send the signals independently to the regions 9A, 9B, and 9C of the transparent electrode layer 7f.

Note that the voltage signals applied to the liquid crystal layer 7e are each an alternating wave. A tilt angle of the liquid crystal molecules is determined depending on the magnitude of the amplitude of the alternating wave. The greater the amplitude of the alternating wave is, the closer the alignment direction of the liquid crystal is to the normal line direction of the waveguide layer 7d. In the following description, the voltage applied to the liquid crystal layer 7e means the magnitude of the amplitude of the alternating wave applied to the liquid crystal layer 7e.

The beam light having radiated from the grating 8c enters the side surface of the truncated conical prism 6 via the flat surface substrate 7g and the hollow substrate 7h. In this case, refraction occurs at an interface between the hollow substrate 7h and the air and at an interface between the air and the truncated conical prism 6. The light beam having entered the side surface of the truncated conical prism 6 is refracted on the side surface on the opposite side of the truncated conical prism 6 and, as illustrated by a dotted line arrow in FIG. 1B, becomes a light beam 10*j* exiting in a direction of an angle $\theta_\perp'$ with respect to the horizontal plane. As described above, when the angle of the beam in the truncated conical prism 6 with respect to the vertical direction is denoted by $\theta_0$, a relational formula of refraction in the case where the angle formed between the vertical direction and the side surface of the truncated conical prism 6 is $\theta_2$ is expressed by Math 3.

$$\sin(\theta_\perp'+\theta_2)=n_0\cos(\theta_0-\theta_2) \quad \text{[Math 3]}$$

The hollow substrate 7*h* and the truncated conical prism 6 are arranged with the axis L being the common center axis. As illustrated in the circular dotted line frame in FIG. 1A, blazed gratings may be formed on a truncated conical inner surface of the hollow substrate 7*h* and the side surface of the truncated conical prism 6. Providing appropriately-designed blazed gratings can make the direction of the exiting light beam closer to the horizontal direction. The blazed gratings include multiple grooves with saw-tooth shaped cross section. Each groove has a structure extending in a circumferential direction of the side surface of the truncated conical prism 6 or the inner surface of the hollow substrate 7*h*, that is in the rotation direction about the axis L. In other words, a lattice line of the blazed grating extends in the circumferential direction of the side surface of the truncated conical prism 6 or the inner surface of the hollow substrate 7*h*. The light beam passing the side surface of the truncated conical prism 6 provided with the blazed grating is diffracted in a plane including the axis L. Thus, as illustrated in FIG. 1B, on the side surface of the truncated conical prism 6, a diffracted light beam 10*i* exits to the outside at an angle of $\theta_\perp$ with respect to the horizontal plane. Since the beam passes the side surface of the truncated conical prism 6 twice, the beam is affected by the diffraction of the blazed grating twice. Since a change angle due to diffraction in this case is greater than that in the case where diffraction is performed only once, the pitch $\Lambda_2$ of each blazed grating can be made larger and processing of the blazed grating is facilitated.

Figure 2B:
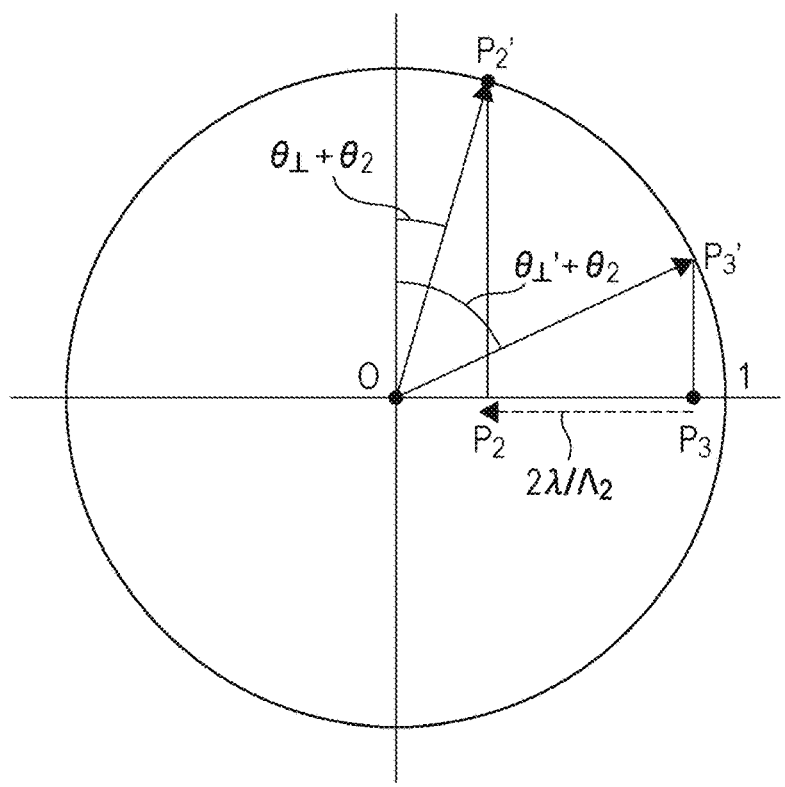
FIG. 2B is a vector diagram illustrating a relationship of diffraction occurring on a side surface of a truncated conical prism.

FIG. 2B is a vector diagram illustrating a relationship of the diffraction occurring on the side surface of the truncated conical prism 6. When the braze grating is formed only on the side surface of the truncated conical prism 6, the relationship of the diffraction is as illustrated in FIG. 2B. Specifically, the relationship of the diffraction is expressed as a relationship in which a distance between a foot $P_2$ of a perpendicular of a vector $OP_2'$ having a size 1 and forming an angle $\theta_\perp+\theta_2$ with respect to the vertical axis and a foot $P_3$ of a perpendicular of a vector $OP_3'$ having a size 1 and forming an angle $\theta_\perp'+\theta_2$ with respect to the vertical axis is equal to twice the size of the lattice vector, that is $2\lambda/\Lambda_2$. In other words, a relational formula of the diffraction is expressed by Math 4.

$$\sin(\theta_\perp+\theta_2)=\sin(\theta_\perp'+\theta_2)-2\lambda/\Lambda_2 \quad \text{[Math 4]}$$

The truncated conical prism 6 is located on the flat surface substrate 7*g*. Generally, a transparent member having a bottom surface that faces the optical waveguide element and a side surface that is rotational symmetry about the axis L may be used instead of the truncated conical prism 6. The exiting light beam from the grating 8*c* enters the transparent member from the bottom surface or the side surface and exits from the side surface. When the pitch of the grating 8*c* is not constant in a waveguide direction, there may be used a rotationally-symmetric prism whose generating line has a curved shape. Meanwhile, when the pitch of the grating 8*c* is constant, there may be used a rotationally-symmetric prism whose generating line has a linear shape, that is a rotationally-symmetric prism with a columnar or truncated cone shape.

Based on Math 2, when the wavelength $\lambda$ or the effective refractive index N changes, the angle $\theta_1$ of the exiting beam 10*i* changes. Specifically, when the wavelength of the light from the light source 1 or the refractive index of the liquid crystal layer 7*e* between the region 9C and the reflective electrode layer 7*b* changes, the direction of the exiting beam 10*i* changes in an up-down direction (hereinafter, referred to as "vertical direction") of FIG. 1B. Accordingly, scanning with the exiting beam 10*i* in the vertical direction is achieved by controlling the wavelength of the light from the light source 1 or the refractive index of the liquid crystal layer 7*e*.

Based on the coupling condition $-n_1\sin\theta_1=N-\lambda/\Lambda_1$, a derivative of the effective refractive index N with respect to a radiation angle $\theta_1$ is expressed by Math 5.

$$\frac{dN}{d\theta_1}=-\sqrt{n_1^2-\left(\frac{\lambda}{\Lambda_1}-N\right)^2}$$

Moreover, based on the coupling condition $-n_1\sin\theta_1=N-\lambda/\Lambda_1$, a derivative of the radiation angle $\theta_1$ with respect to the wavelength $\lambda$ is expressed by Math 6.

$$\frac{d\theta_1}{d\lambda}=\frac{1}{n_1\cos\theta_1}\left(\frac{1}{\Lambda_1}-\frac{dN}{d\lambda}\right)$$

By using the relationship of $n_1\times\sin\theta_1=n_0\times\sin\theta_0$, based on Math 3 to Math 6, a derivative of the exit angle $\theta_\perp$ with respect to the wavelength $\lambda$ is expressed by Math 7, the exit angle $\theta_\perp$ being an angle with respect to the horizontal direction of the diffracted light.

$$\frac{d\theta_\perp}{d\lambda}=-\left\{\frac{\sin(\theta_0-\theta_2)}{\cos\theta_0}\left(\frac{1}{\Lambda_1}-\frac{dN}{d\lambda}\right)+\frac{2}{\Lambda_2}\right\}/\cos(\theta_\perp+\theta_2)$$

In a return route after reflection on an object, the light beam travels through the light path of the exiting beam 10*i* in a reverse direction and enters the side surface 6*a* of the truncated conical prism 6. This light beam travels through the light paths of the radiating light beam 10*h*, the guided light beam 10*g*, and the input-side light beams 10*f* and 10*e* in the reverse direction. Particularly, regarding entrance into the grating 8*c*, only the light beam that has the same wavelength and the same phase plane as those in the exit of the radiating light beam 10*h* in an outgoing route is selectively coupled. Accordingly, stray light in which at least one of the wavelength or the phase is different from that of the exiting light beam is effectively excluded. About half of a light beam 10E having traveled to the half mirror 4*b* along the same route as that in the outgoing route in the reverse direction is reflected on the half mirror 4*b* to become a light beam 10E$_0$ and the other half is transmitted through the half mirror 4*b* to become a light beam 10D$_0$.

The light beam 10E$_0$ reflected on the half mirror 4*b* is reflected and diffracted by the wavelength spectrometer 5*a* to be dispersed depending on the wavelength. Dispersed light beams $10E_1$ are condensed by the detection condensing lens 13a and forms multiple condensed light spots $17a1$, $17a2$, ... $17an$ on a light receiving surface of the light detector 12a. The light detector 12a includes multiple light receiving elements divided into strip shapes. When each light receiving element receives light, the light receiving element generates an electric signal depending on an amount of the received light. The light detector 12a can thereby detect the multiple condensed light spots $17a1$, $17a2$, ... separately.

The light beam $10D_0$ transmitted through the half mirror 4b is transmitted through the quarter wave plate 4a to be converted to a transmitted light beam 10D including linearly-polarized light. Part of the transmitted light beam 10D is transmitted through the polarization spectrometer 4 and travels toward the wavelength spectrometer 5b as a transmitted light beam 10C. The transmitted light beam 10C is reflected and diffracted by the wavelength spectrometer 5b to be dispersed depending on the wavelength. The dispersed light beam 10B is condensed by the detection condensing lens 13b and forms multiple condensed light spots $17b1$, $17b2$, ..., $17bn$ on a light receiving surface of the light detector 12b. The light detector 12b includes multiple light receiving elements divided into strip shapes. When each light receiving element receives light, the light receiving element generates an electric signal depending on an amount of the received light. The light detector 12b can thereby detect the multiple condensed light spots $17b1$, $17b2$, ... separately.

The light detector 12a is connected to the detection circuit 33a. The light detector 12b is connected to the detection circuit 33b. The detection circuit 33a processes the detection signal outputted from the light detector 12a. The detection circuit 33b processes the detection signal outputted from the light detector 12b.

The optical apparatus of the embodiment further includes the main control circuit 34 connected to the detection circuits 33a and 33b. The main control circuit 34 generates control signals for controlling the light source control circuit 30 and the liquid crystal control circuit 32 based on the signals outputted from the detection circuits 33a and 33b. The light source control circuit 30 adjusts the intensity of the laser light beam emitted from the light source 1 in response to the control signal received from the main control circuit 34. The liquid crystal control circuit 32 adjusts the voltage between the transparent electrode layer 7f and the reflective electrode layer 7b in response to the control signal received from the main control circuit 34 and thereby adjusts the refractive index of the liquid crystal layer 7e. Note that the light source control circuit 30, the liquid crystal control circuit 32, and the main control circuit 34 do not have to be implemented by different pieces of hardware and may be implemented by a single circuit.

In the embodiment, the beam having exited from the grating 8c passes the side surface of the truncated conical prism 6. This configuration can increase the degree of freedom of design. The configuration is not limited to the mode described above and may be, for example, a configuration in which the radiating light beam 10h enters the truncated conical prism 6 from the bottom surface thereof. In the embodiment, since the beam passes the side surface of the truncated conical prism 6 twice, the beam is affected by the diffraction of the blazed grating twice. Accordingly, the pitch of the blazed grating can be increased and the manufacturing is facilitated. Moreover, the blazed grating can be formed also on the truncated conical inner surface of the hollow substrate 7h. In this case, the beam is affected by the diffraction three times. The greater the number of times of diffraction is, the greater the pitch of the blazed grating can be made. Thus, the manufacturing is facilitated and overall diffraction efficiency is improved.

In the embodiment, the hollow substrate 7h is arranged to facilitate take-out of the light beam radiating from the grating 8c into the air. The hollow substrate 7h may be omitted in a structure in which the light beam can be taken out. However, providing the hollow substrate 7h having the truncated conical cavity as in the embodiment allows the radiating light from the grating 8c to be taken out into the air irrespective of the radiation angle of the radiating light, that is without being affected by total reflection. Thus, the degree of freedom in design can be improved.

Figure 3A:
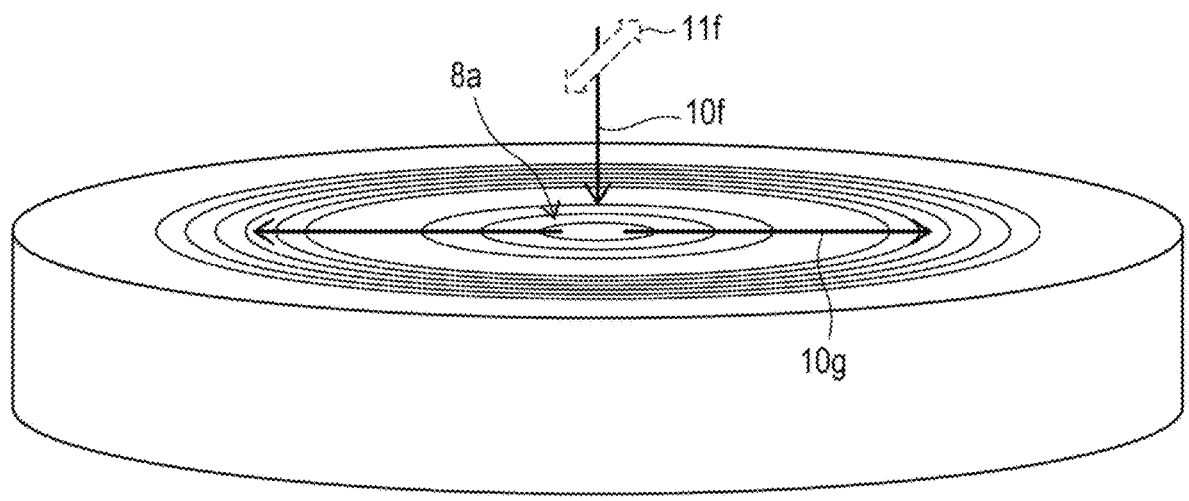
FIG. 3A is a perspective view schematically illustrating a polarization direction of the entering light beam and how the entering light beam is inputted into the input grating coupler.
Figure 3B:
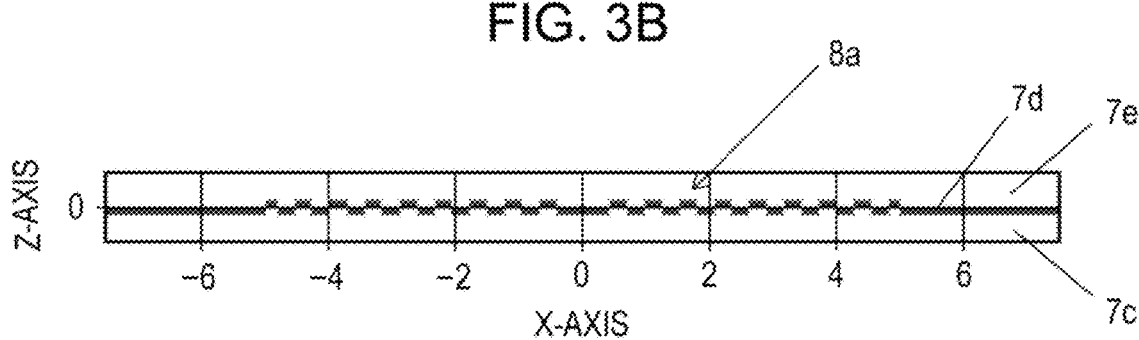
FIG. 3B is a cross-sectional view schematically illustrating an example of the input grating coupler.
Figure 3C:
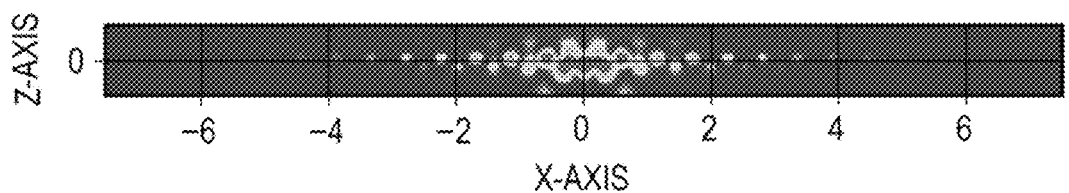
FIG. 3C is a cross-sectional view illustrating a state of a light beam guided in a waveguide layer by means of light intensity distribution.
Figure 3D:
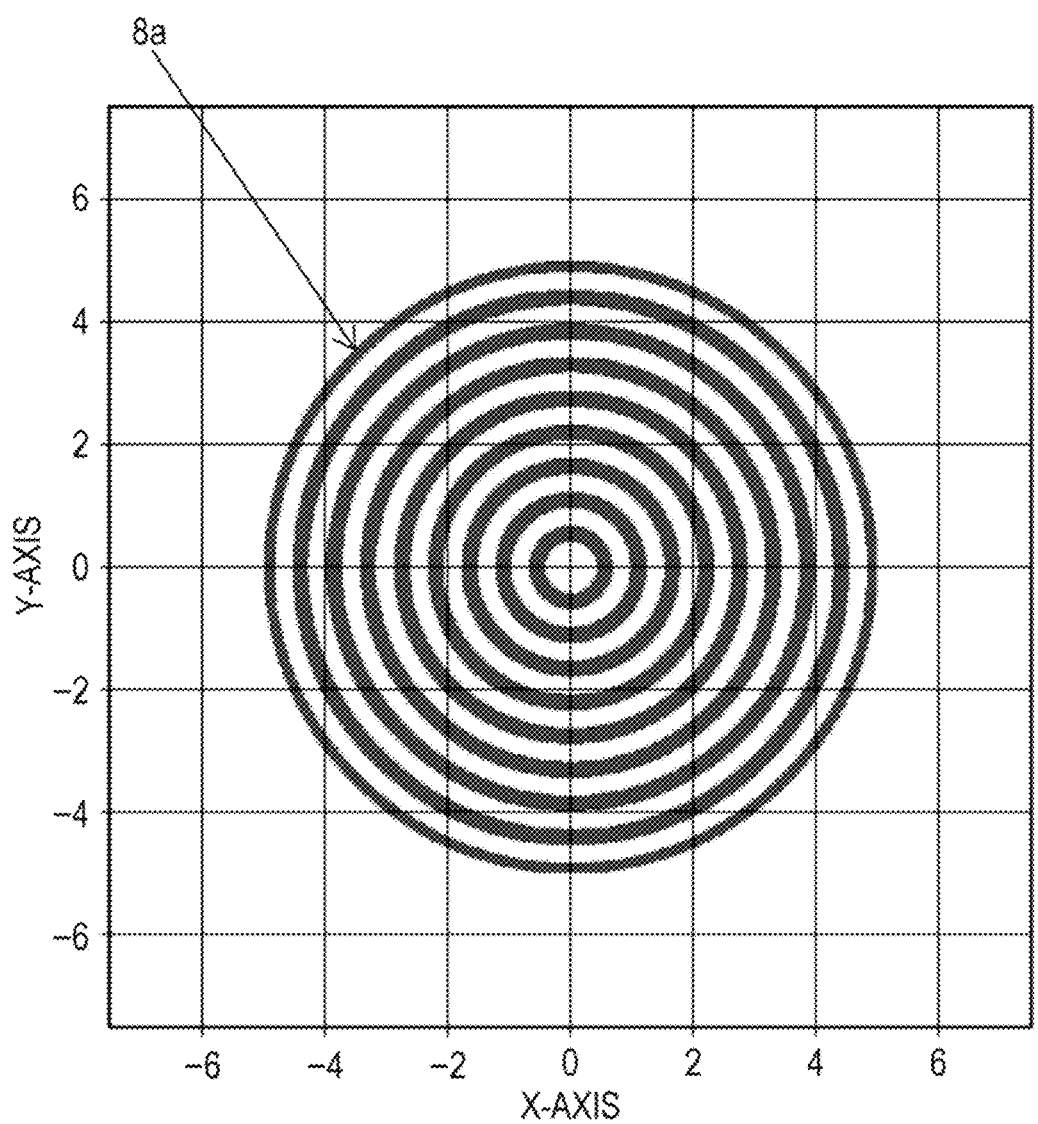
FIG. 3D is a plan view schematically illustrating an example of the input grating coupler.
Figure 3E:
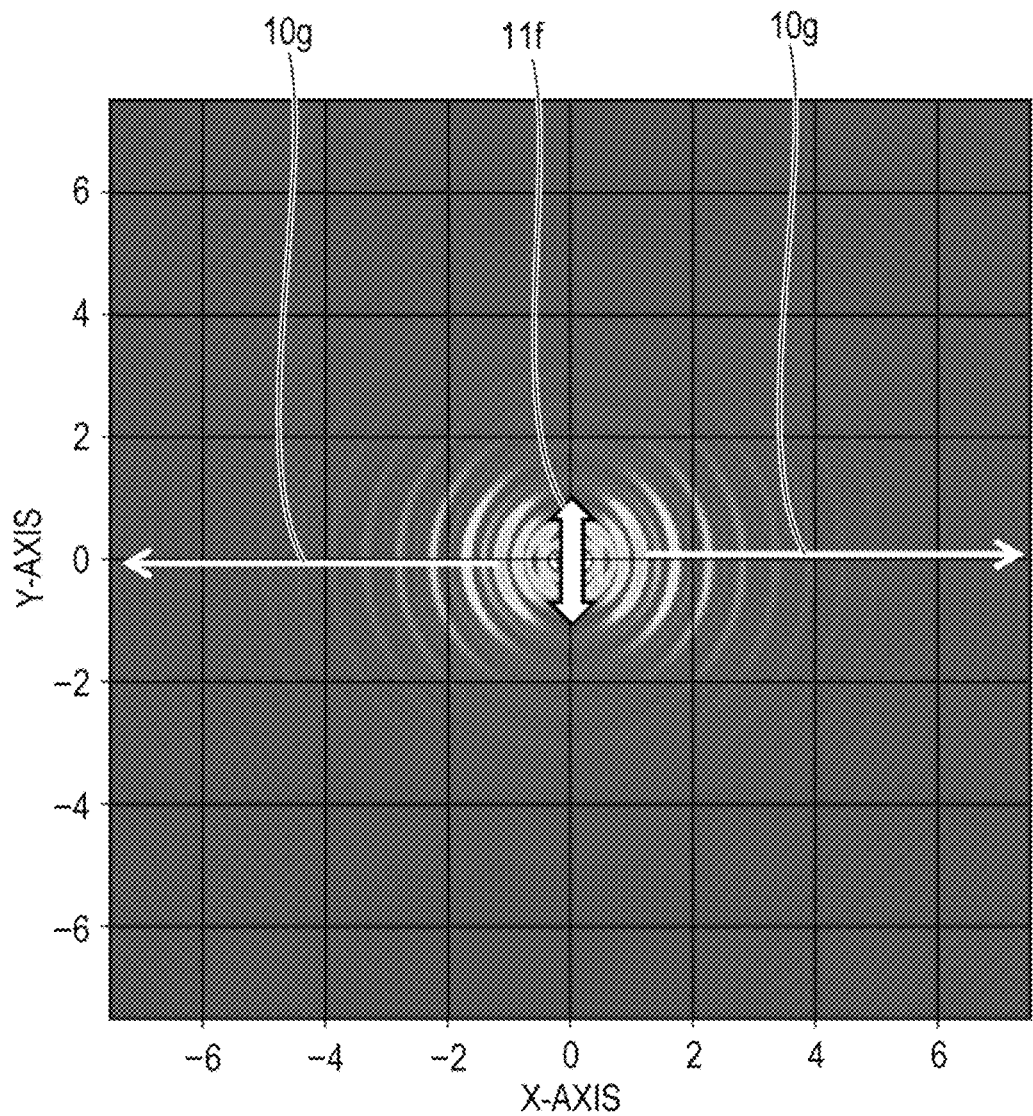
FIG. 3E is a view illustrating an example of the light intensity distribution of the guided light beam excited when the polarization direction of the entering light beam is parallel to a Y-axis direction.
Figure 3F:
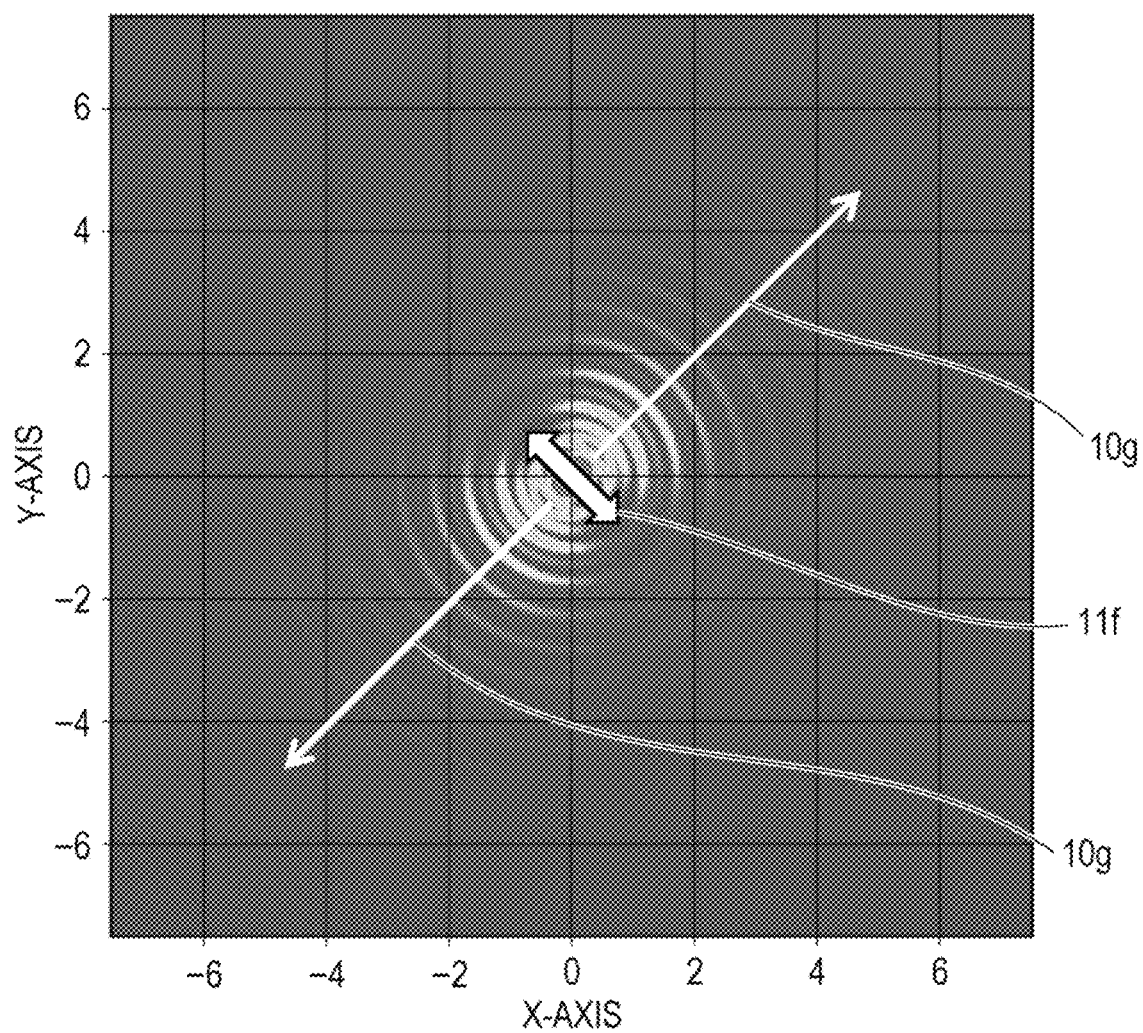
FIG. 3F is a view illustrating an example of the light intensity distribution of the guided light beam excited when the polarization direction of the entering light beam is parallel to a direction tilted 135 degrees with respect to an X-axis.
Figure 3G:
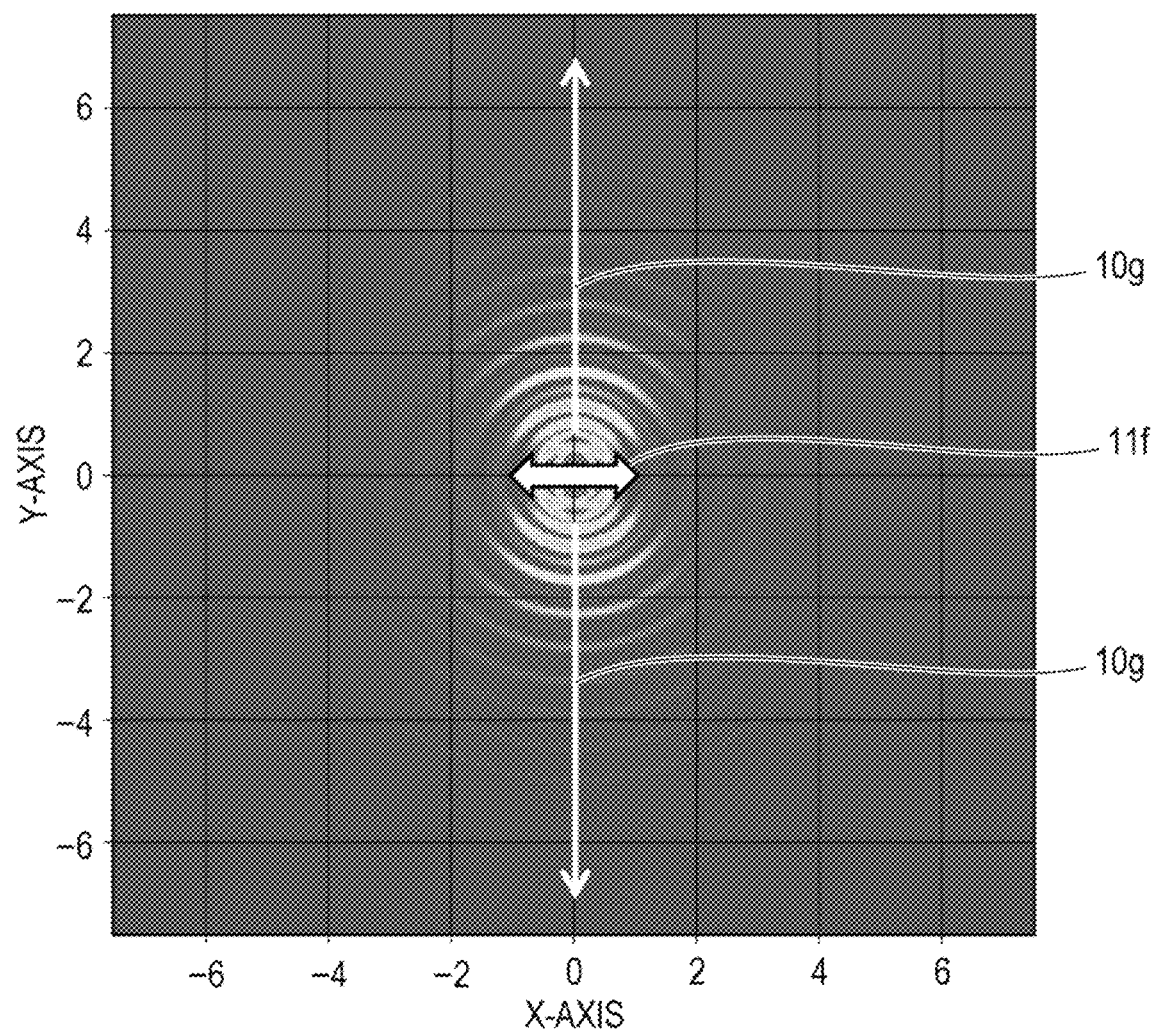
FIG. 3G is a view illustrating an example of the light intensity distribution of the guided light beam excited when the polarization direction of the entering light beam is parallel to the X-axis direction.

FIG. 3A is a perspective view schematically illustrating a polarization direction of the light beam 10f that is the entering light beam and how the light beam 10f is inputted into the grating 8a that is the input grating coupler. FIG. 3B is a cross-sectional view schematically illustrating an example of the grating 8a that is the input grating coupler. FIG. 3C is a cross-sectional view illustrating a state of a light beam that is inputted, coupled, and guided, by means of light intensity distribution. FIG. 3D is a plan view schematically illustrating an example of the grating 8a that is the input grating coupler. FIGS. 3E to 3G are plan views illustrating relationships between the polarization direction and a propagation direction of the light by means of light intensity distribution. In the examples illustrated in FIGS. 3B and 3D, the radius of the grating 8a is $r_1=5$ μm, the pitch of the grating 8a is $\Lambda_0=0.57$ μm, and the depth of the grating 8a is $d_0=0.10$ μm, the material of the waveguide layer 7d is $Ta_2O_5$, the thickness of the waveguide layer 7d is 0.15 μm, and the refractive index of each of the liquid crystal layer 7e and the buffer layer 7c is the same refractive index as $SiO_2$. In the examples illustrated in FIG. 3C and FIGS. 3E to 3G, analysis results for wavelength $\lambda=0.94$ μm are illustrated. In this case, entrance of the light beam into the grating 8a in a perpendicular direction causes a guided light beam in a TE mode to be excited. In the following description, a coordinate system of X, Y, and Z orthogonal to one another as illustrated is used. The center of the grating 8a is set as the origin O, the X-axis and the Y-axis are set in two directions orthogonal to each other and parallel to the plane in which the gratings spread, and the Z-axis is set in a direction perpendicular to both of the X-axis and the Y-axis. Regarding the Z-axis, the direction from which the entering light beam comes is set as a positive direction.

FIGS. 3C and 3E illustrate an example of the intensity distribution of the guided light beam excited when the polarization direction 11f of the light beam 10f that is the entering light beam is parallel to the Y-axis direction. In this case, the excited guided light beam strongly propagates in the X-axis direction. As illustrated in FIG. 3F, when the polarization direction 11f of the light beam 10f that is the entering light beam is parallel to a direction tilted 135 degrees from the X-axis, the excited guided light beam strongly propagates in a direction tilted 45 degrees from the X-axis direction. As illustrated in FIG. 3G, when the polarization direction 11f of the light beam 10f that is the entering light beam is parallel to the X-axis direction, the excited guided light beam strongly propagates in the Y-axis direction. As described above, the grating 8a causes part of the light beam 10f that is the entering light beam to propagate in the waveguide layer 7d while spreading mainly in a direction perpendicular to the polarization direction 11f. Accordingly, when the polarization of the light beam 10f that is the entering light beam is circular polarization as in the embodiment, the excited guided light beam propagates evenly in all directions.

Figure 4A:
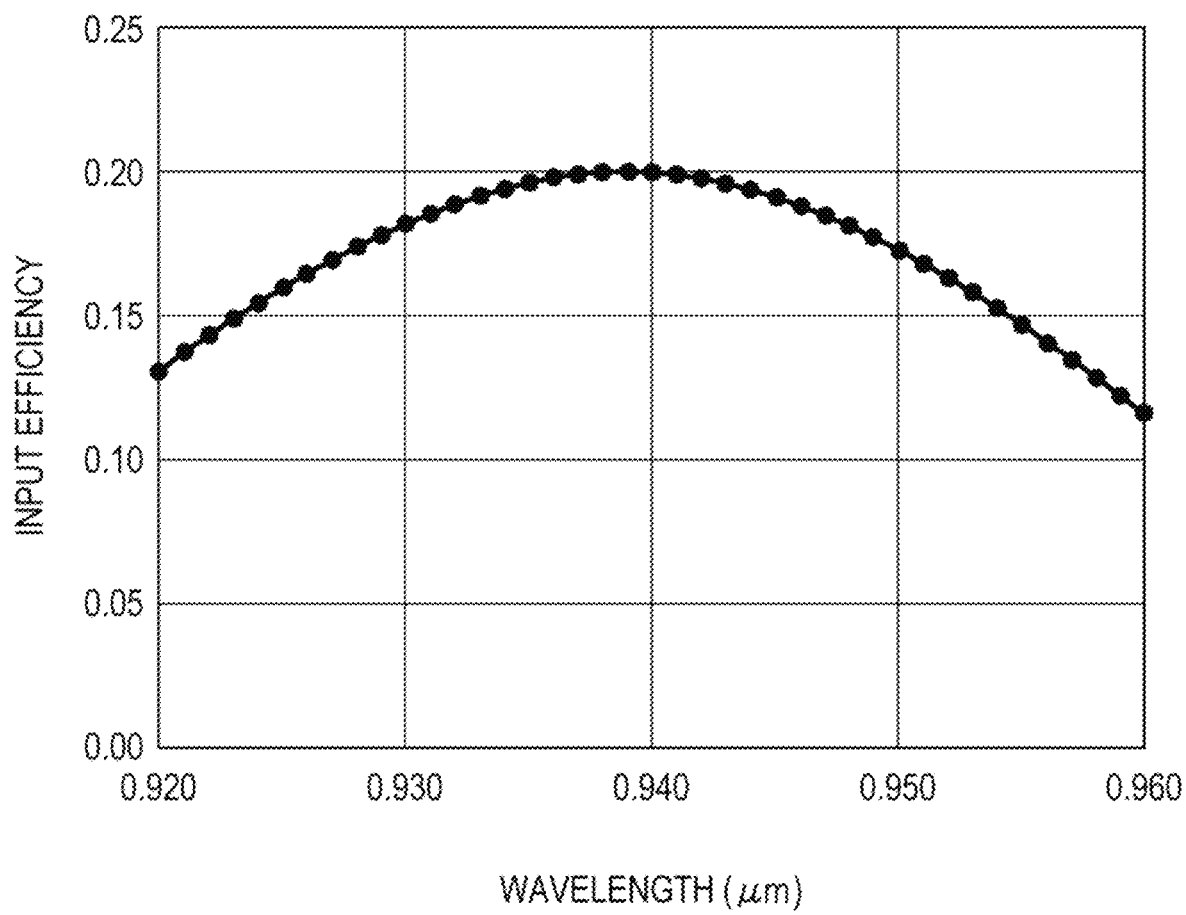
FIG. 4A is a diagram illustrating wavelength dependency of input coupling efficiency of the input grating coupler in the case where a reflective electrode layer is absent.
Figure 4B:
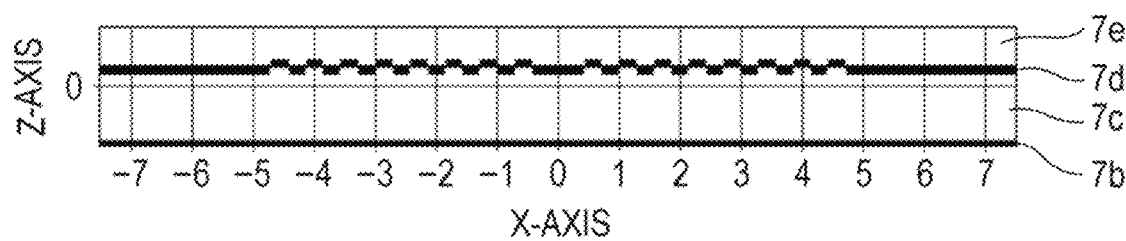
FIG. 4B is a cross-sectional view schematically illustrating the input grating coupler in the case where the reflective electrode layer is present.
Figure 4C:
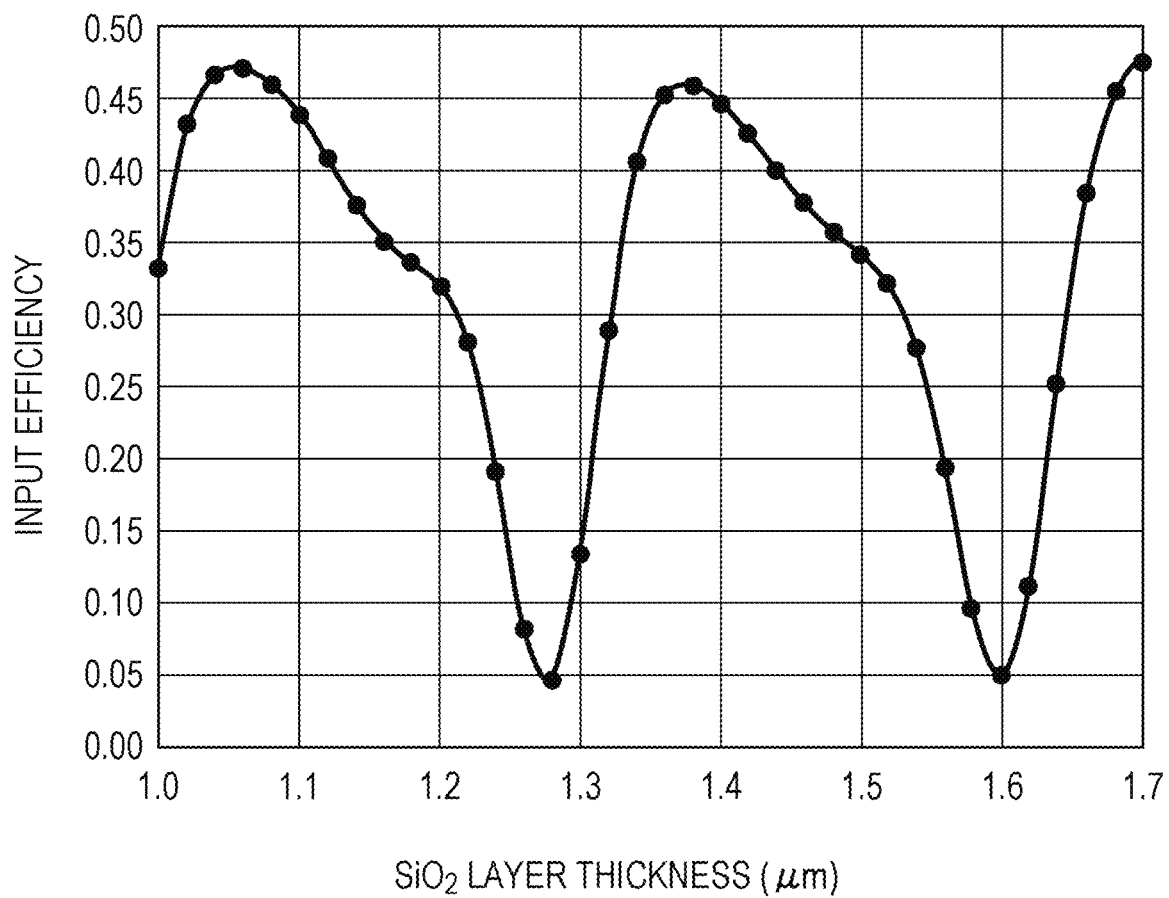
FIG. 4C is a diagram illustrating dependency of the input coupling efficiency to the thickness of a buffer layer in the case where the reflective electrode layer is present.
Figure 4D:
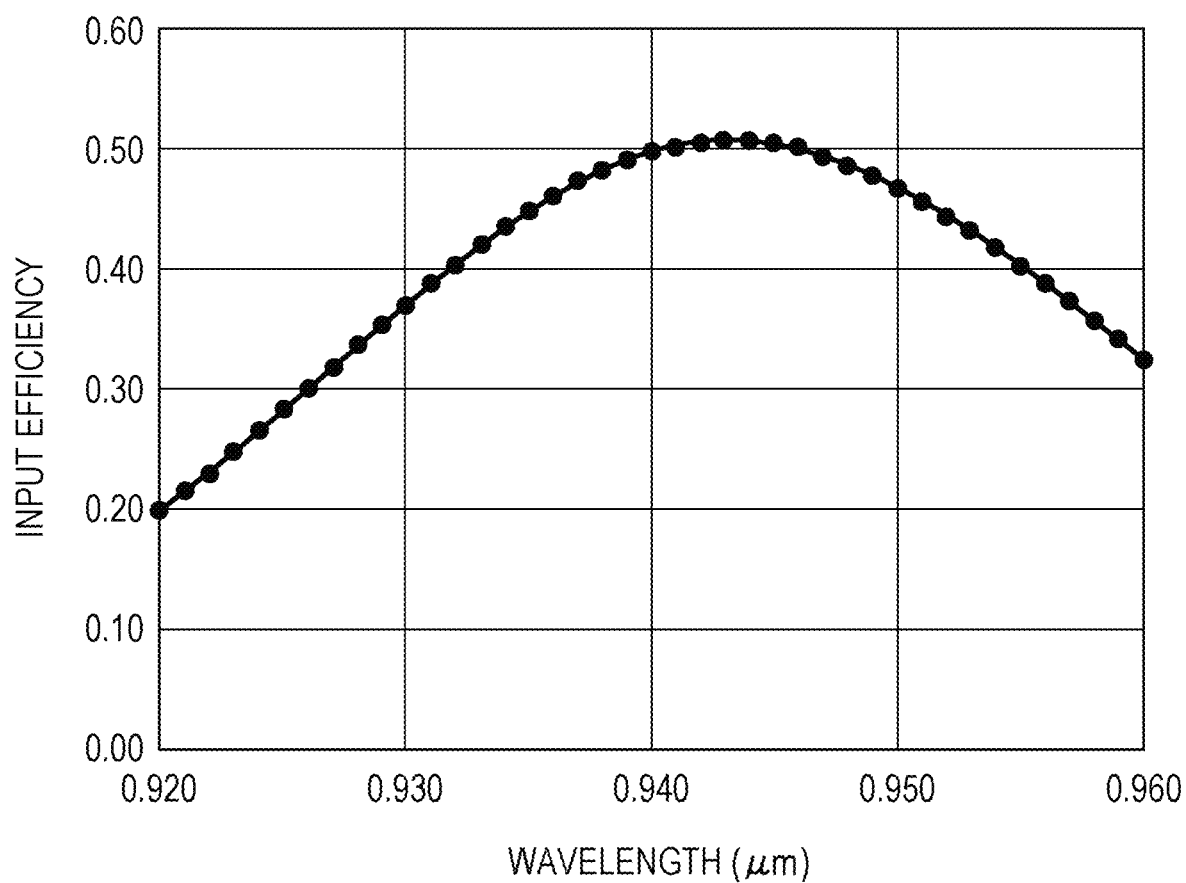
FIG. 4D is a diagram illustrating wavelength dependency of the input coupling efficiency in the case where the reflective electrode layer is present.

FIG. 4A is a diagram illustrating wavelength dependency of input coupling efficiency of the grating 8a that is the input grating coupler in the case where the reflective electrode layer 7b is absent. FIG. 4B is a cross-sectional view schematically illustrating the grating 8a that is the input grating coupler in the case where the reflective electrode layer 7b is present. FIG. 4C is a diagram illustrating dependency of the input coupling efficiency to the thickness of the $SiO_2$ layer that is the buffer layer 7c in the case where the reflective electrode layer is present. FIG. 4D is a diagram illustrating wavelength dependency of the input coupling efficiency in the case where the reflective electrode layer is present.

Analysis conditions in the example illustrated in FIG. 4A are the same as the analysis conditions in the examples illustrated in FIGS. 3A to 3G. As illustrated in FIG. 4A, when the wavelength is 0.94 μm, input efficiency up to 20% can be obtained. Conditions of the shape in the example illustrated in FIG. 4B are the same as the conditions of the shapes in the examples illustrated in FIGS. 3A to 3G, except for the point that the reflective electrode layer 7b made of Al is provided. As illustrated in FIG. 4C, the input efficiency periodically changes depending on the thickness of the buffer layer 7c. When the thickness of the buffer layer 7c is 1.06 μm, the input efficiency takes a local maximum. FIG. 4D illustrates the wavelength dependency of the input efficiency in the case where the thickness of the buffer layer 7c is fixed to 1.06 μm. When the wavelength is 0.944 μm, the input efficiency takes a local maximum and a local maximum value is about 50%. Accordingly, in the case of so-called azimuthal polarization in which the polarization direction of the entering light beam is aligned in a circle tangent direction, a coupling efficiency of almost 100% can be obtained. Meanwhile, in the case where the entering light beam is a circularly-polarized light beam, a coupling efficiency of almost 50% can be obtained.

Next, aberration correction in the embodiment is described.

Figure 5A:
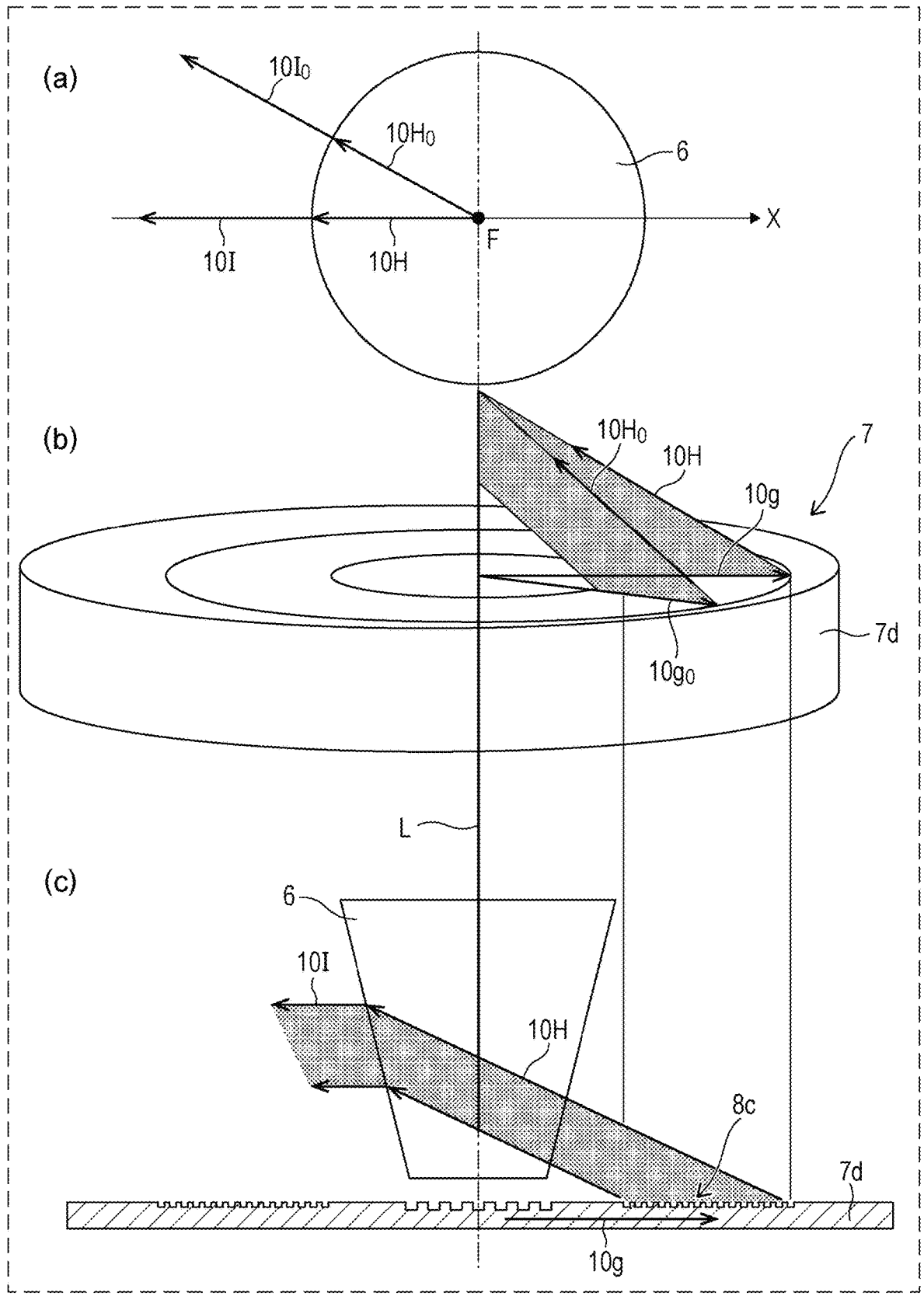
FIG. 5A is a view schematically illustrating propagation paths of radiating light beams from an output grating coupler in the case where aberration correction is absent.
Figure 5B:
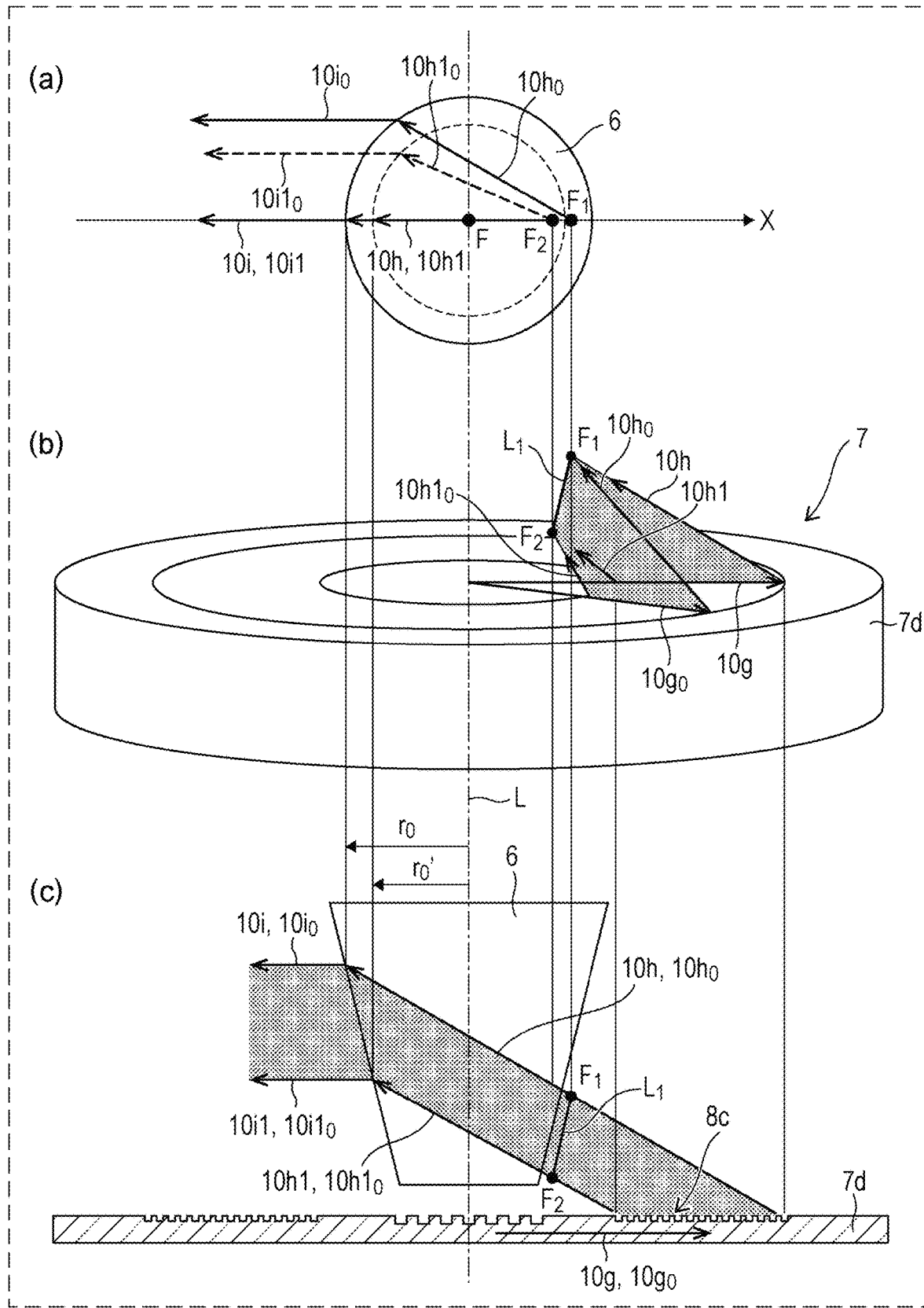
FIG. 5B is a view schematically illustrating propagation paths of the radiating light beams from the output grating coupler in the case where the aberration correction is present.

FIG. 5A is a view schematically illustrating propagation paths of the radiating light beams from the grating 8c that is the output grating coupler in the case where the aberration correction is absent. FIG. 5B is a view schematically illustrating propagation paths of the radiating light beams from the grating 8c that is the output grating coupler in the case where the aberration correction is present. In each of FIGS. 5A and 5B, part (a) is a plan view, part (b) is a perspective view, and part (c) is a cross-sectional view. Note that, in the configurations of FIGS. 5A and 5B, an effect of a refraction on the light entering side out of two refractions on the side surface of the truncated conical prism 6 is small and can be ignored. In the following description, only the refraction on the light exit side that accounts for almost all of a refraction effect is discussed.

Part (b) of FIG. 5A illustrates the guided light beams 10g and $10g_0$ that propagate in the waveguide layer 7d in different directions. When the aberration correction is absent, the guided light beams 10g and $10g_0$ exits from the grating 8c, become light beams 10H and $10H_0$ propagating in the truncated conical prism 6, and are refracted on the side surface of the truncated conical prism 6 to become light beams 10l and $10l_0$ exiting to the outside, respectively. As illustrated in part (b) of FIG. 5A, the light beams 10H and $10H_0$ intersect each other at the center axis L. As illustrated in part (a) of FIG. 5A, in a plan view, the light beams 10l and $10l_0$ intersect each other at a point F on the center axis L and exit from the side surface of the truncated conical prism 6. In this case, the light beams 10l and $10l_0$ are not bent in a plane parallel to the horizontal plane and become divergent light linearly traveling in the moving radius direction of the cross section of the truncated conical prism 6.

Meanwhile, when the aberration correction is present as illustrated in FIG. 5B, paths of the guided light beams are as follows. The guided light beams 10g and $10g_0$ propagating in the waveguide layer 7d exit from the grating 8c, enter the side surface of the truncated conical prism 6, and are refracted to become light beams 10h, $10h_0$, 10h1, and $10h1_0$ propagating in the truncated conical prism 6. The light beams 10h and $10h_0$ are light beams radiating from an outer portion of the grating 8c and the light beams 10h1 and $10h1_0$ are light beams radiating from an inner portion of the grating 8c. The light beams 10h and 10h1 are radiating light beams originating in the guided light beam 10g and the light beams $10h_0$ and $10h1_0$ are radiating light beams originating in the guided light beam $10g_0$. The light beams 10h, $10h_0$, 10h1, and $10h1_0$ become light beams 10i, $10i_0$, 10i1, and $10i1_0$ refracted on the side surface on the opposite side of the truncated conical prism 6 and exiting to the outside. As illustrated in part (b) of FIG. 5B, the light beams 10h, $10h_0$, 10h1, and $10h1_0$ intersect one another on an axis $L_1$ away from the center axis L along the positive direction of the X-axis. The axis $L_1$ is tilted with respect to the center axis L. The light beams 10h and $10h_0$ from the outer peripheral portion of the grating 8c intersect each other at a point $F_1$ on the axis $L_1$. The light beams 10h1 and $10h1_0$ from the inner peripheral portion of the grating 8c intersect each other at a point $F_2$ on the axis $L_1$. As illustrated in parts (a) and (c) of FIG. 5B, the generating line of the truncated conical prism 6 is also titled according to the tilt of the axis $L_1$ and a radius $r_0$ of a circle including the point $F_1$ that is a refraction point of the light beams 10h and $10h_0$ from the outer peripheral portion is different from a radius $r_0'$ of a circle including the point $F_2$ that is a refraction point of the light beams 10h1 and $10h1_0$ from the inner peripheral portion. As a result, the light beams exiting from the side surface of the truncated conical prism 6 can be made to be parallel light beams. As described above, moving the intersection of the radiating light beams from points on the axis L to points on the axis $L_1$ enables aberration correction. This aberration correction can be achieved by setting the voltage between the transparent electrode layer 7g and the reflective electrode layer 7b to a value varying depending on a deviation angle position in the region of the grating 8b as to be described later.

Next, description is given of a method of estimating an aberration correction amount required to turn the beams into the parallel light beams.

Figure 6A:
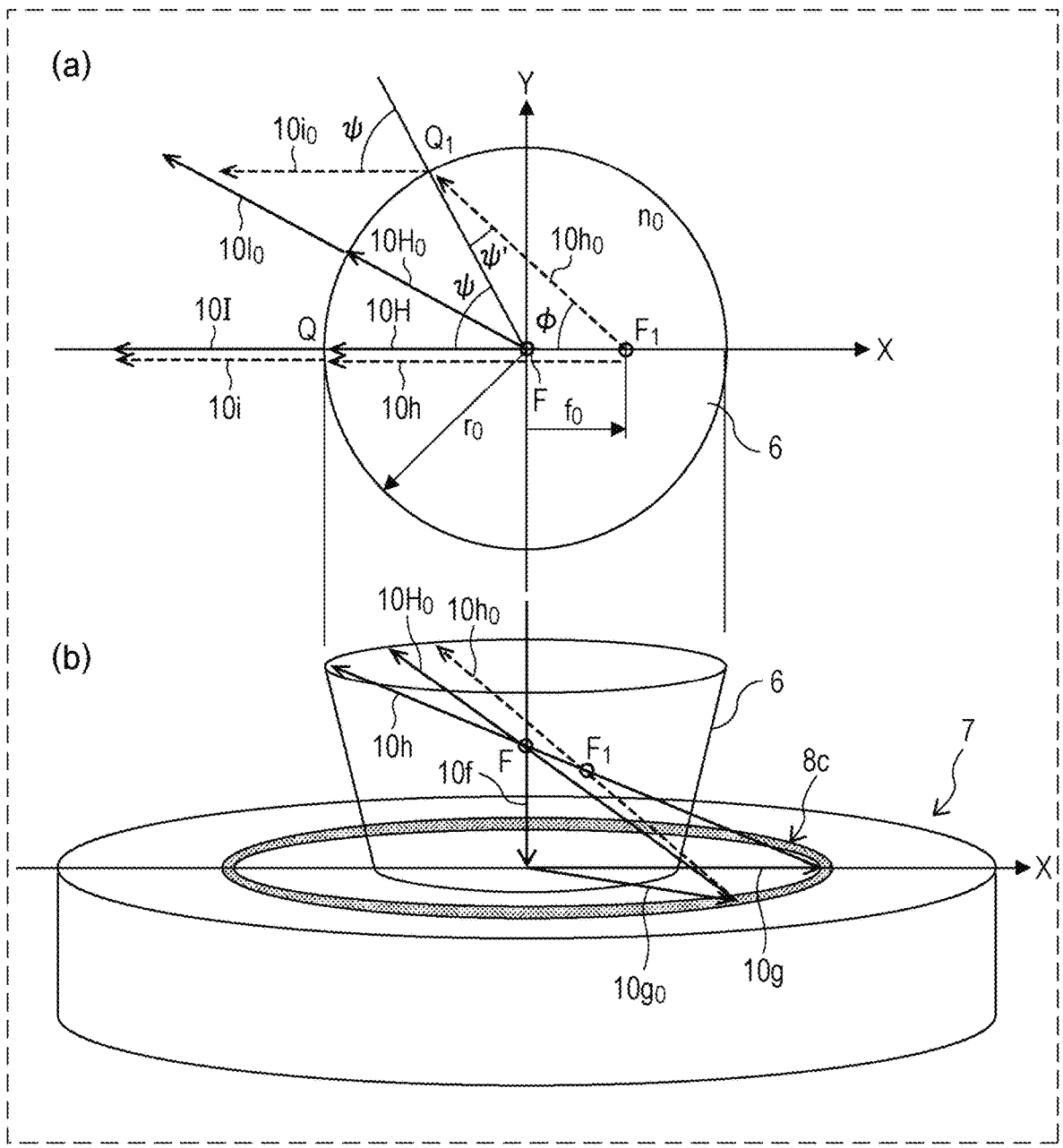
FIG. 6A is a view schematically illustrating how the radiating light beams from the output grating coupler are refracted on the side surface of the truncated conical prism and are made to exit.

FIG. 6A is a view schematically illustrating how the radiating light beams from the grating 8c that is the output grating coupler are refracted on the side surface of the truncated conical prism 6 and are made to exit. The refraction of each radiating light beam occurs twice on the entrance side and the exit side of the side surface of the truncated conical prism 6. However, as described above, only the refraction on the exit side that accounts for almost all of the refraction effect is discussed herein.

The paths of the beams illustrated in FIG. 6A are as described with reference to FIGS. 5A and 5B. As illustrated in part (a) of FIG. 6A, an intersection of the light beam 10h and the side surface of the truncated conical prism 6 is denoted by Q and an intersection of the light beam $10h_0$ and the side surface of the truncated conical prism 6 is denoted by $Q_1$. An angle $QFQ_1$ is denoted by ψ, an angle $FF_1Q_1$ is denoted by φ, and an angle $FQ_1F_1$ is denoted by ψ'. When the light beam $10i_0$ is parallel to the light beam $10i$, Math 8 is established.

$$\sin\psi = n_0 \sin\psi' \qquad \text{[Math 8]}$$

In this case, the angles φ, ψ, and ψ' satisfy the relationship of Math 9.

$$\phi = \psi - \psi' \qquad \text{[Math 9]}$$

Based on Math 8 and Math 9, Math 10 provides the angle ψ.

$$\sin\psi = \frac{n_0 \sin\phi \sqrt{n_0^2 + 1 + 2n_0 \cos\phi}}{\sqrt{(n_0^2 - 1)^2 + 4n_0^2 \sin^2\phi}}$$

Meanwhile, when an interval between the point F and the point $F_1$ is defined as $f_0$, Math 11 provides $f_0$.

$$f_0 = \frac{r_0 \sin\psi'}{\sin\phi} = \frac{r_0 \sin\psi}{n_0 \sin\phi}$$

The light beams $10h$ and $10h_0$ are focused on the point F and the light beams $10h$ and $10h_0$ are focused on the point $F_1$. According to the theory of aberration, aberration that changes a focal position of focused light from F to $F_1$, that is focal movement aberration in the vertical direction is provided by the left-hand side of Math 12. In this case, ΔN expresses a variation amount of the effective refractive index.

$$n_0 f_0 (1 - \cos\phi) = (r_2 - r_1) \Delta N \qquad \text{[Math 12]}$$

Figure 6B:
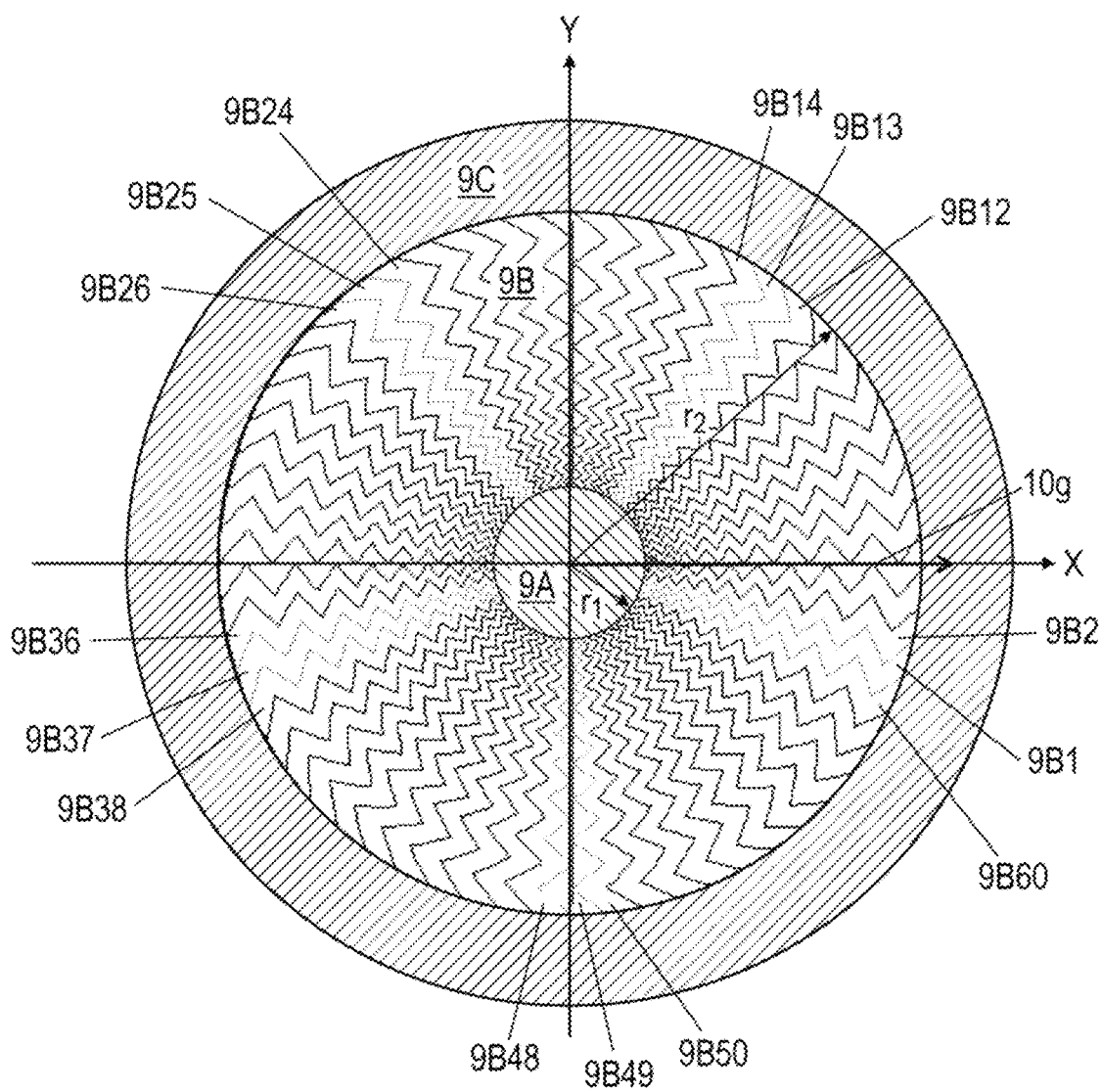
FIG. 6B is a diagram illustrating an example of a pattern of a transparent electrode layer for achieving the aberration correction.

FIG. 6B is a view schematically illustrating an example of a pattern of the transparent electrode layer 7g for achieving the aberration correction. The region 9B is located at a position facing the grating 8b and formed in the range from the radius $r_1$ to the radius $r_2$. The region 9B in the example of FIG. 6B includes multiple conductive divided regions arranged in the circumferential direction of an imaginary circle about the point of incidence of the light beam 10f. Each divided region extends in zigzag in the moving radius direction of the circle. The liquid crystal control circuit 32 can independently apply voltage to the divided regions facing a portion of the waveguide layer 7d in which the guided light beam 10g is to propagate among the multiple divided regions in the region 9B, one by one. This allows the direction of the radiation beam to rotate about the axis L while achieving the aberration correction. In FIG. 6B, regions illustrated by faint zigzag lines are the divided regions in which the value of the voltage is set such that the guided light beam is deflected from these regions to surrounding regions, that is regions illustrated by bold zigzag lines and the waveguide intensity gradually decreases at a certain moment.

In the example illustrated in FIG. 6B, the region 9B is divided every 6 degrees in the circumferential direction and is divided into 60 zigzag fan-shaped divided regions 9B1 to 9B60. These divided regions 9B1 to 9B60 are electrically insulated from each other and voltage can be independently applied to the divided regions 9B1 to 9B60. When different voltages are applied to the multiple divided regions 9B1 to 9B60, the refractive index of the liquid crystal layer 7e varies depending on the deviation angle position. As a result, the effective refractive index of the guided light beam 10g also varies depending on the deviation angle position. The phase of the guided light beam can be thus made to vary from one deviation angle of propagation to another. When a variation width of the effective refractive index is denoted by ΔN, the right-hand side of Math 12 provides a range of a phase difference occurring in a propagation distance $(r_2 - r_1)$. Accordingly, Math 12 expresses a condition in which the radiating light beam is refracted on the truncated conical side surface and becomes the parallel light beam. Math 13 provides ΔN in the aberration correction based on Math 12.

$$\Delta N = \frac{n_0 f_0 (1 - \cos\phi)}{r_2 - r_1}$$

FIG. 7A is a diagram illustrating a relationship between a deviation angle φ of the propagation direction and the variation amount ΔN of the effective refractive index of the guided light beam for achieving the aberration correction. In FIG. 7A, the variation amount ΔN is plotted as a function of the deviation angle φ based on Math 13. In this example, the refractive index of the truncated conical prism 6 is assumed to be $n_0=1.58$, the radius of the truncated conical prism 6 to be $r_0=1.25$ mm, and the width of the region 9B to be $(r_2-r_1)=8$ mm. For example, it is found that ΔN=0.041 is required to obtain a phase difference necessary in a deviation angle range of −36 degrees to 36 degrees.

Figure 7B:
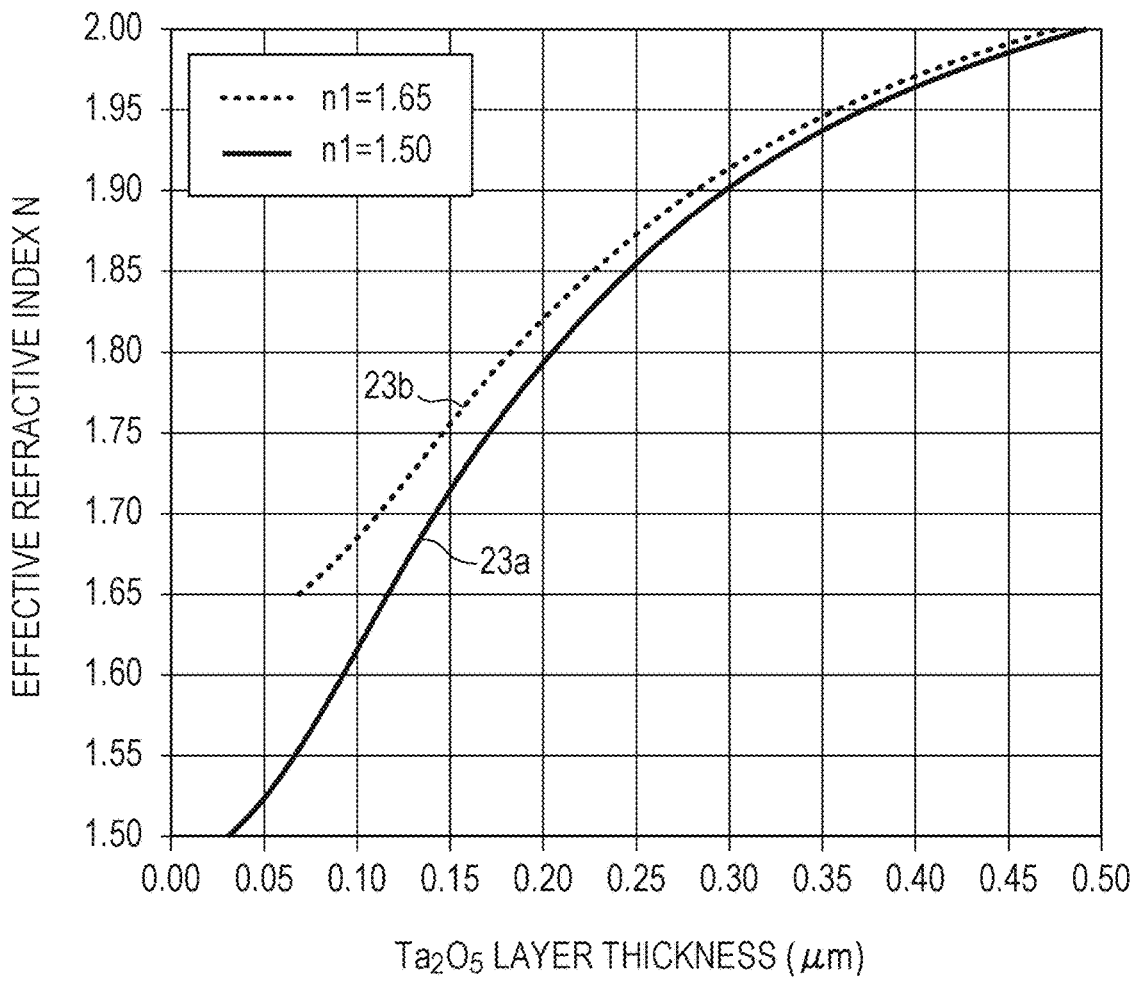
FIG. 7B is a diagram illustrating an example of a relationship between the thickness of the waveguide layer and the effective refractive index N.
Figure 7C:
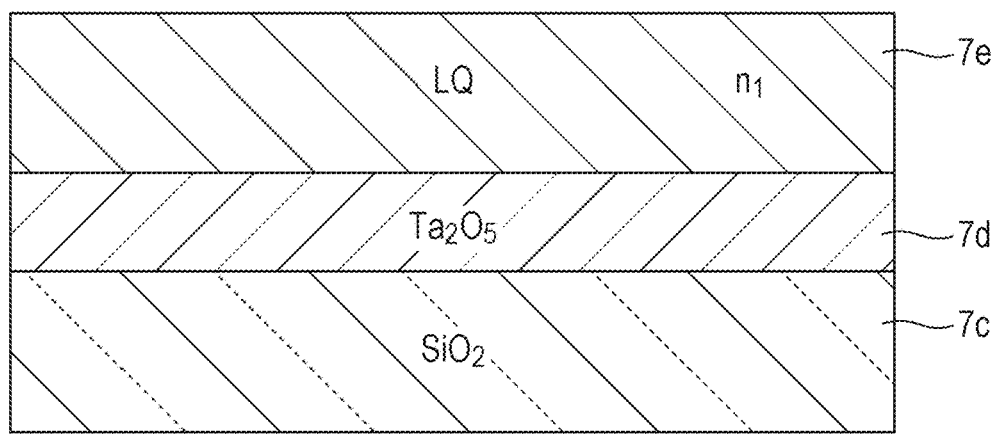
FIG. 7C is a view schematically illustrating arrangement of a buffer layer, the waveguide layer, and a liquid crystal layer.

FIG. 7B is a diagram illustrating an example of a relationship between the effective refractive index N and the thickness of the $Ta_2O_5$ layer that is the waveguide layer 7d with the refractive index $n_1$ of the liquid crystal layer 7e being a parameter. FIG. 7C is a view schematically illustrating arrangement of the buffer layer 7c, the waveguide layer 7d, and the liquid crystal layer 7e. In this example, the buffer layer 7c is made of $SiO_2$ and the waveguide layer 7d is made of $Ta_2O_5$.

A refractive index difference of nematic liquid crystal molecules is about 0.20 at the largest. Assuming that 80% of this refractive index difference functions as an effective refractive index difference, the effective refractive index difference is about 0.15. In the example illustrated in FIG. 7B, the wavelength of the light beam is assumed to be 0.94 μm and the refractive index of the buffer layer 7c is assumed to be 1.45. In the example of FIG. 7B, a curve 23a and a curve 23b illustrate the relationship between the thickness of the waveguide layer 7d and the effective refractive index N calculated assuming that $n_1=1.50$ and that calculated assuming that $n_1=1.65$, respectively.

When the refractive index difference of the liquid crystal is assumed to be 0.15 in the model of FIG. 7C, it is found from FIG. 7B that variation from ΔN=0.04 to ΔN=0.06 can be expected by setting the thickness of the waveguide layer 7d made of $Ta_2O_5$ to about 0.10 μm to 0.15 μm.

Next, description is given of principles of controlling the propagation direction of the guided light beam by applying voltage to the liquid crystal layer 7e. Description is given below of an example in which both of the transparent electrode layer 7f and the reflective electrode layer 7b have multiple divided zigzag electrode patterns.

Figure 8A:
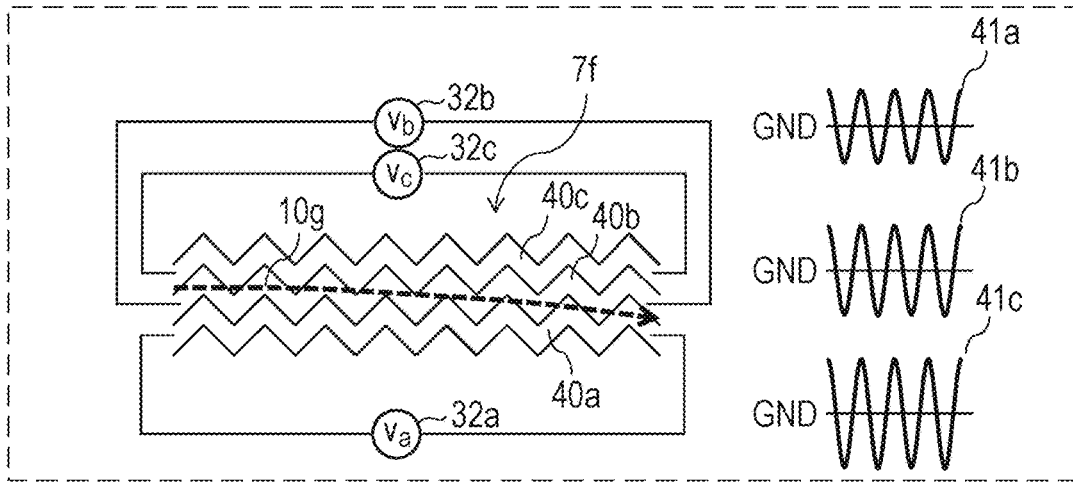
FIG. 8A is a view schematically illustrating relationships between applied voltages and electrode patterns in the transparent electrode layer.
Figure 8B:
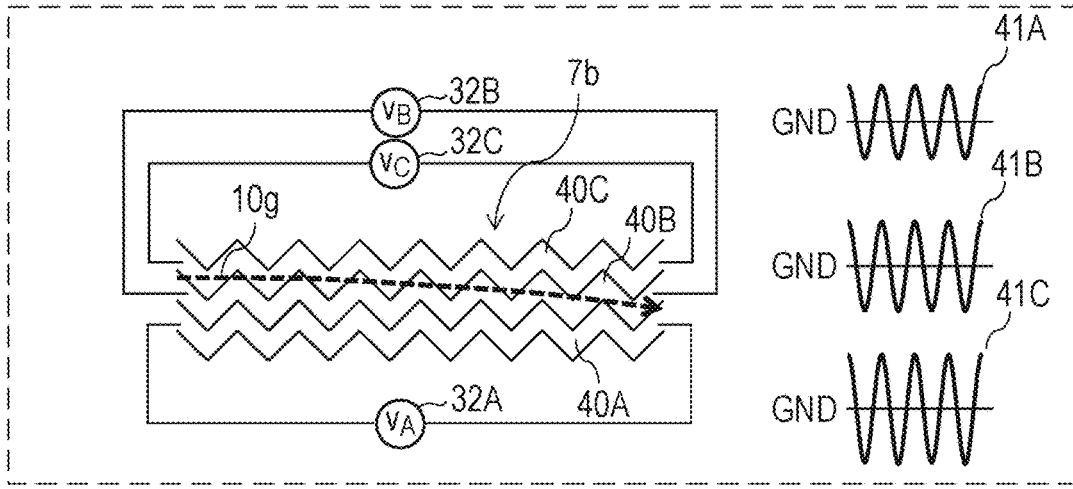
FIG. 8B is a view schematically illustrating relationships between applied voltages and electrode patterns in the reflective electrode layer.

FIG. 8A is a view schematically illustrating relationships between the applied voltages and the electrode patterns in the transparent electrode layer 7f. FIG. 8B is a view schematically illustrating relationships between the applied voltages and the electrode patterns in the reflective electrode layer 7b. FIG. 8A illustrates three zigzag electrode patterns 40a, 40b, and 40c in the transparent electrode layer 7f. Similarly, FIG. 8B illustrates three zigzag electrode patterns 40A, 40B, and 40C in the reflective electrode layer 7b. These electrode patterns are insulated from one another. Voltage signals from control circuits 32a, 32b, and 32c are applied independently to the electrode patterns 40a, 40b, and 40c illustrated in FIG. 8A. Similarly, voltage signals from control circuits 32A, 32B, and 32C are applied independently to the electrode patterns 40A, 40B, and 40C illustrated in FIG. 8B.

Figure 8C:
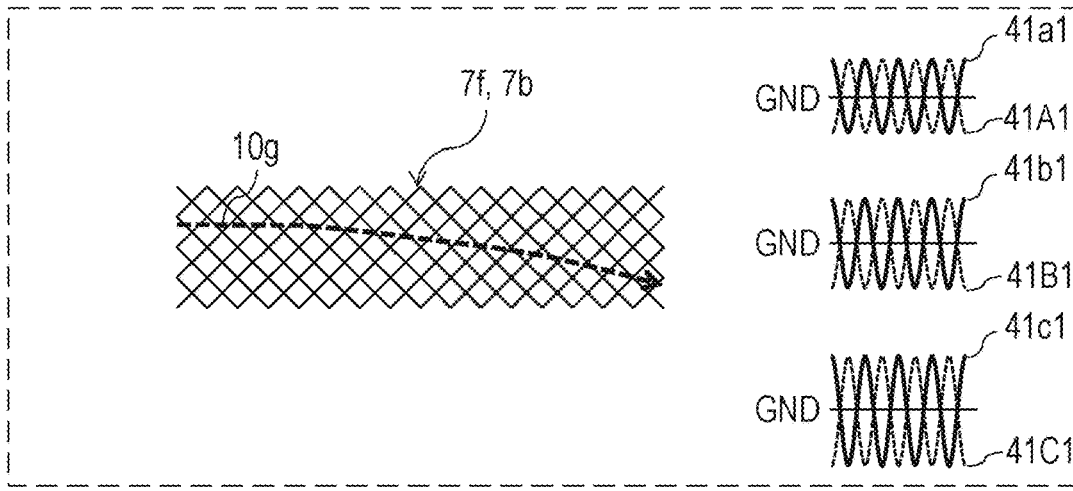
FIG. 8C is a view schematically illustrating relationships between the applied voltages and a configuration in which the electrode patterns in the transparent electrode layer and the electrode patterns in the reflective electrode layer are aligned and laid one on top of another.

FIG. 8C is a view schematically illustrating relationships between the applied voltages and a configuration in which the electrode patterns in the transparent electrode layer 7f and the electrode patterns in the reflective electrode layer 7b are aligned and laid one on top of another. Assuming that the side of the transparent electrode layer 7f is the upper side and the side of the reflective electrode layer 7b is the lower side, the zigzag patterns located on the upper and lower sides are in a relationship in which a line formed by connecting vertices on one side of the zigzag on the upper side overlaps that on the lower side. The shape of the zigzag pattern on the reflective electrode layer 7b side is a shape obtained by reversing the zigzag pattern on the transparent electrode layer 7f side upside down. Accordingly, as illustrated in FIG. 8C, the pattern in which the electrode patterns on the transparent electrode layer 7f side and the electrode patterns on the reflective electrode layer 7b side are aligned and laid one on top of another has a shape in which rhombuses are continuously arranged.

The electrode pattern illustrated in FIG. 8C may be formed only on one surface. However, since rhombuses are isolated from one another, drawing of wires may not be easy. In the configuration in which the electrode patterns illustrated in FIG. 8A and the electrode patterns illustrated in FIG. 8B are laid one on top of another, the patterns themselves function as wires. Accordingly, manufacturing can be facilitated.

AC voltage signals 41a, 41b, and 41c are applied to the zigzag electrode patterns 40a, 40b, and 40c in the transparent electrode layer 7f, respectively. The signal 41a has the largest amplitude, the signal 41b has the next largest amplitude, and the signal 41c has the smallest amplitude. Assuming that facing electrodes are grounded, a refractive index difference occurs at positions in the liquid crystal layer corresponding to the zigzag electrode patterns 40a, 40b, and 40c due to this amplitude slope. The guided light beam 10g propagating from left to right of FIG. 8C in the waveguide layer 7d held between the electrodes is refracted downward in FIG. 8C every time the guided light beam 10g passes a border between the patterns tilted with respect to the light path. AC voltage signals 41A, 41B, and 41C are applied to the zigzag electrode patterns 40A, 40B, and 40C in the reflective electrode layer 7b, respectively. The signal 41A has the largest amplitude, the signal 41B has the next largest amplitude, and the signal 41C has the smallest amplitude. Assuming that facing electrodes are grounded, the guided light beam 10g propagating from left to right of FIG. 8C in the waveguide layer 7d held between the electrodes is refracted downward due to this amplitude slope.

The AC voltage signals 41A, 41B, and 41C have opposite polarities to the AC voltage signals 41a, 41b, and 41c, respectively. Accordingly, as illustrated in FIG. 8C, voltages illustrated in FIG. 8C are applied to the electrode pattern in which the transparent electrode layer 7f and the reflective electrode layer 7b are aligned and laid one on top of the other. In the example of FIG. 8C, an AC voltage signal 41a1 and an AC voltage signal 41A1 form a pair, an AC voltage signal 41b1 and an AC voltage signal 41B1 form a pair, and an AC voltage signal 41c1 and an AC voltage signal 41C1 form a pair. Since the phases of the two AC voltage signals forming the pair are inverted, the AC voltage amplitude is doubled. The guided light beam 10g is thereby greatly refracted downward. Moreover, the number of times the guided light beam 10g passes the border between the patterns increases from those in the electrode patterns illustrated in FIGS. 8A and 8B. Bending of the guided light beam 10g is thereby doubled and variation in a bending angle due to a difference in a light path is also improved.

Next, description is given of an example of the method of controlling the propagation direction of the guided light beam based on the principles described with reference to FIGS. 8A to 8C.

Figure 9A:
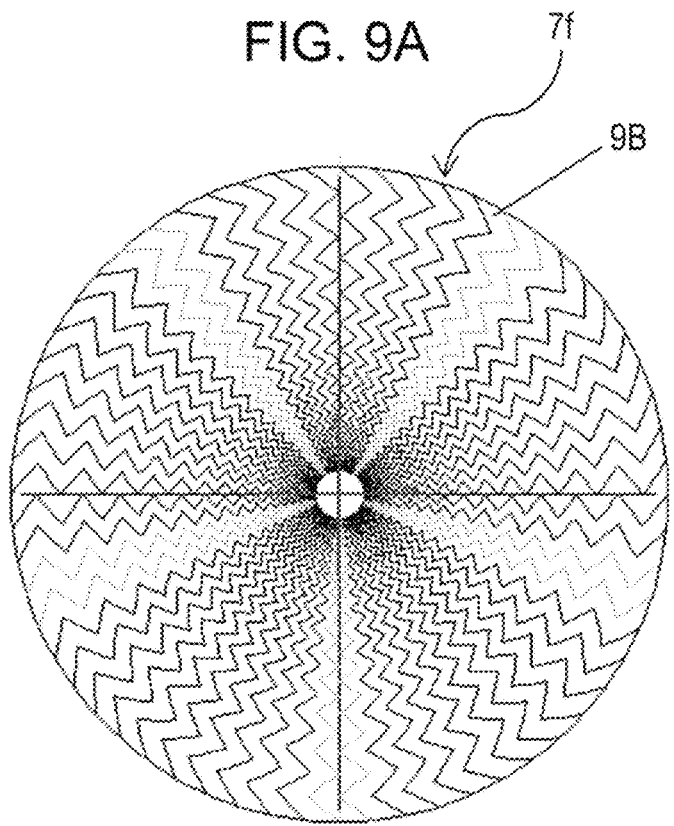
FIG. 9A is a view schematically illustrating an example of the electrode patterns in the transparent electrode layer.
Figure 9B:
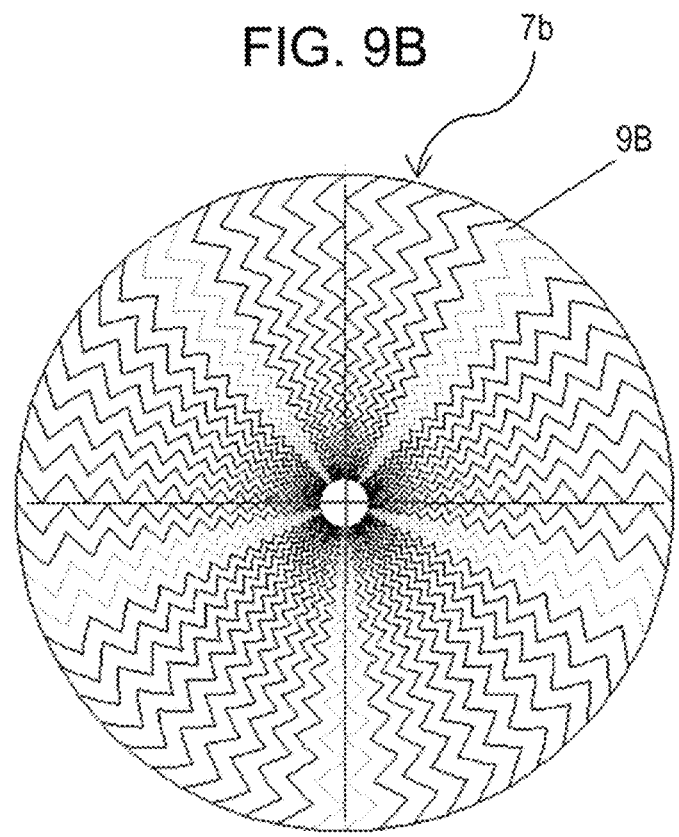
FIG. 9B is a view schematically illustrating an example of the electrode patterns in the reflective electrode layer.

FIGS. 9A and 9B are views schematically illustrating examples of the electrode patterns in the region 9B in the transparent electrode layer 7f and the reflective electrode layer 7b, respectively. The electrode pattern illustrated in FIG. 9A and the electrode pattern illustrated in FIG. 9B are each formed of 60 zigzag patterns extending from the inner peripheral side toward the outer peripheral side. Electrodes with such zigzag patterns may be provided only on one of the transparent electrode layer 7f and the reflective electrode layer 7b. A border between any two adjacent divided regions among the multiple divided regions in the region 9B has a zigzag shape extending in the moving radius direction of the imaginary circle about the point of incidence of the laser light beam. The zigzag patterns are insulated from one another and voltage signals are applied independently to the zigzag patterns. In the examples illustrated in FIGS. 9A and 9B, in the adjacent zigzag patterns, a line formed by connecting vertices on one side of the zigzag in one zigzag pattern matches that in the other zigzag pattern in the moving radius direction and these lines are in an adjacent and overlapping relationship. In this example, the shape of the zigzag patterns on the reflective electrode layer 7b side are a shape obtained by reversing the zigzag patterns on the transparent electrode layer 7f in the rotation direction.

Figure 9C:
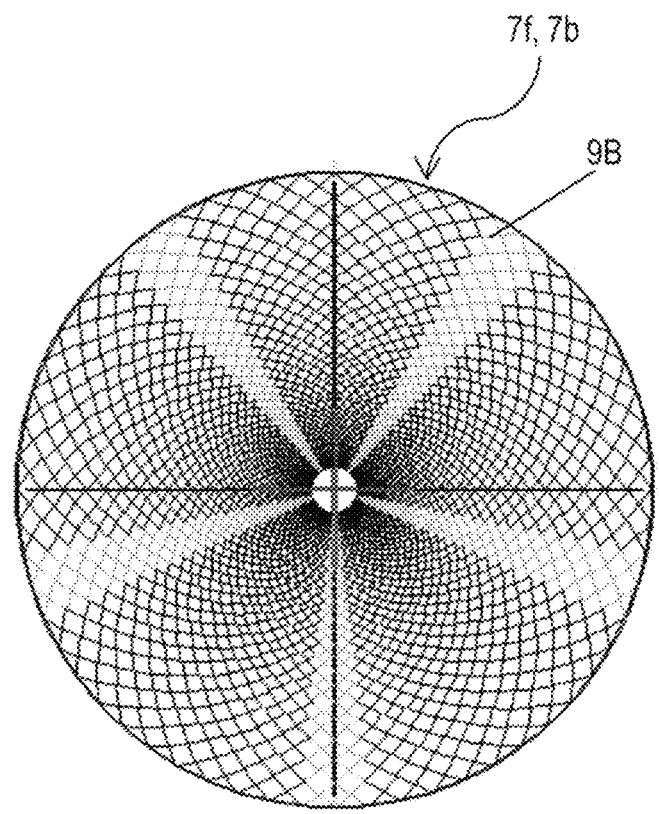
FIG. 9C is a view schematically illustrating a configuration in which the electrode patterns in the transparent electrode layer and the electrode patterns in the reflective electrode layer are aligned and laid one on top of another.
Figure 9D:
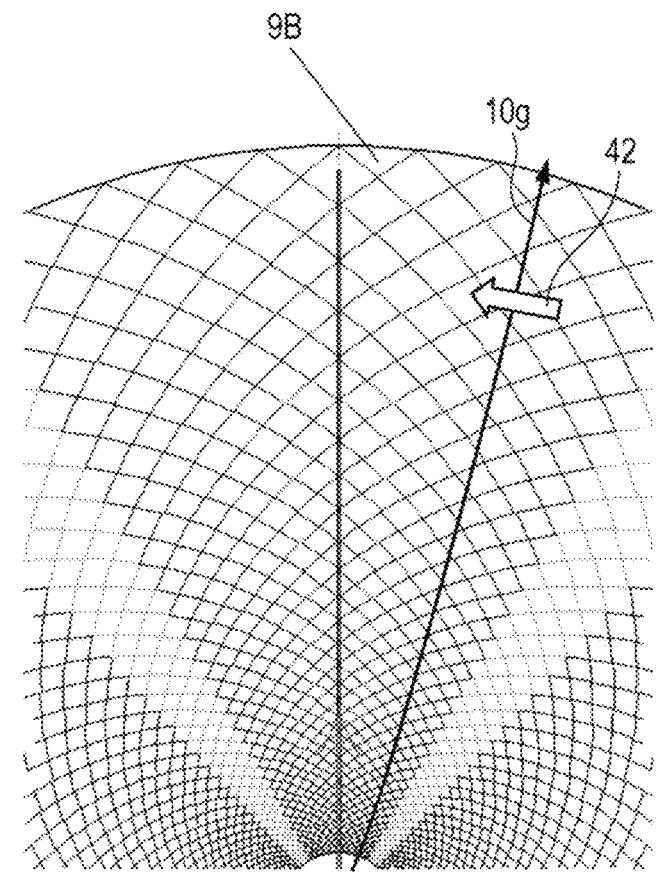
FIG. 9D is a view schematically illustrating a relationship between the propagation path of the guided light beam and some of the electrode patterns illustrated in FIG. 9C.

FIG. 9C is a view schematically illustrating a configuration in which the electrode patterns in the transparent electrode layer 7f and the electrode patterns in the reflective electrode layer 7b are aligned and laid one on top of another. FIG. 9D is a view schematically illustrating a relationship between the propagation path of the guided light beam 10g and some of the electrode patterns illustrated in FIG. 9C. As illustrated in FIG. 9C, the electrode pattern in the region 9B in which the transparent electrode layer 7f and the reflective electrode layer 7b are aligned and laid one on top of the other has a shape in which rhombuses are continuously arranged. In the reflective electrode layer 7b and the transparent electrode layer 7f, the border between any two adjacent divided regions among the multiple divided regions in the region 9B has the zigzag shape extending in the moving radius direction of the imaginary circle about the point of incidence of the laser light. In a view in a direction perpendicular to any one of the buffer layer 7c, the waveguide layer 7d, and the liquid crystal layer 7e, the borders in one of the paired electrode layers and the borders in the other one of the paired electrode layers form the shape in which rhombuses are continuously arranged.

As illustrated in FIG. 9D, when the magnitude of the amplitude of the AC voltage applied to the zigzag patterns has a slope in the circumferential direction, the refractive index of the liquid crystal increases in the direction of the arrow 42. The propagation path of the guided light beam 10g propagating in the waveguide layer 7d from the inner peripheral side to the outer peripheral side can be thereby bent in the direction of the arrow 42. The light beam exiting from the grating 8c can be thereby adjusted to be condensed on the axis $L_1$ illustrated in FIG. 5B and made to exit as the parallel light beam from the side surface of the truncated conical prism 6. Controlling the voltage applied to the electrodes having the structure illustrated in FIG. 9C as described above allows the radiating light beam from the grating 8c to exit as the parallel light beam from the side surface of the truncated conical prism 6.

Next, a configuration example of the light detectors 12a and 12b in the embodiment is described.

Figure 10A:
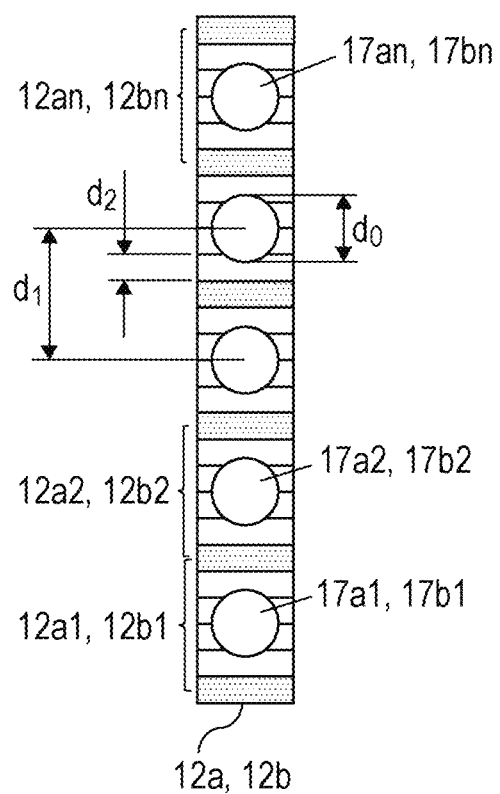
FIG. 10A is a view illustrating an example of a positional relationship between a light detector and multiple condensed light spots.
Figure 10B:
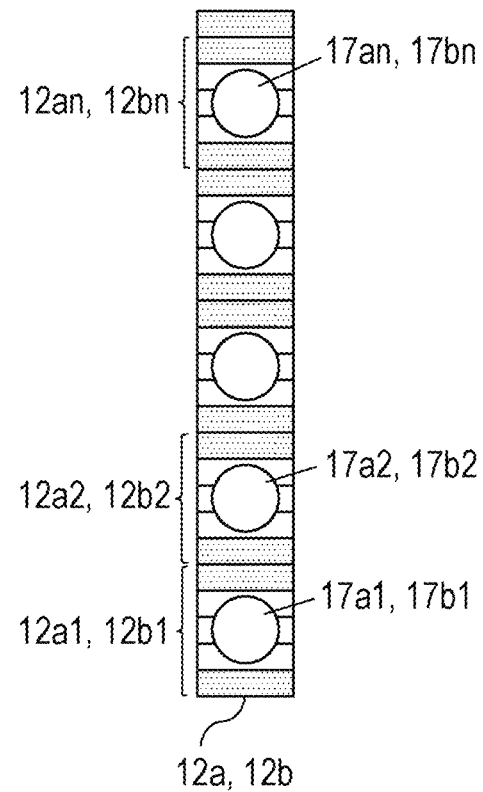
FIG. 10B is a view illustrating another example of the positional relationship between the light detector and the multiple condensed light spots.

FIGS. 10A and 10B are views illustrating examples of a positional relationship between multiple condensed light spots and each of the light detectors 12a and 12b. In these examples, each of the light detectors 12a and 12b includes multiple light receiving elements arranged in a line. Each light receiving element has a strip shape. The light detector 12a is divided into n light receiving regions 12a1, 12a2, . . . , 12an and can separately detect n condensed light spots 17a1, 17a2, . . . , 17an. Similarly, the light detector 12b is divided into n light receiving regions 12b1, 12b2, . . . , 12bn and can separately detect n condensed light spots 17b1, 17b2, . . . , 17bn. In these examples, n=5 for the sake of simplicity. The number n matches the number of modes of the multi-mode laser light beam emitted from the light source 1. When the number of modes is, for example, 10, each of the light detectors 12a and 12b includes 10 light receiving regions. In the examples illustrated in FIGS. 10A and 10B, each light receiving region includes five strip-shaped light receiving elements. Specifically, five light receiving elements are assigned for each condensed light spot. However, this is merely an example. The number of light receiving elements included in each light receiving region may be determined to be any number.

Assume that an interval between the centers of any two adjacent condensed light spots is $d_1$, the width of each light receiving element is $d_2$, and the diameter of each condensed light spot is $d_0$. In the example illustrated in FIG. 10A, $d_2=d_1/5$ and $2d_2<d_0<3d_2$. The interval $d_1$ of the spots depends on the design of the wavelength spectrometers 5a and 5b. The interval $d_1$ may be set to, for example, a size about twice the diameter $d_0$ of the condensed light spot. In the example illustrated in FIG. 10A, the center of each condensed light spot is located near the border between the adjacent two strip-shaped light receiving elements. In this case, each condensed light spot is formed to spread over four consecutive light receiving elements. Meanwhile, in the example illustrated in FIG. 10B, the center of each condensed light spot is located near the center of one of the light receiving elements. In this case, each spot is formed to spread over three consecutive light receiving elements. The positional relationship between the multiple condensed light spots and each of the light detectors 12a and 12b is one of the patterns in FIGS. 10A and 10B.

In the example of FIG. 10A, a light beam of each condensed light spot is received by four consecutive light receiving elements. One light receiving element that receives no light beam of the condensed light spot is present between two adjacent condensed light spots. Such light receiving elements are illustrated by a dot pattern in FIG. 10A. When there is one light receiving element in which the detected light amount is extremely low among five continuous light receiving elements, this light receiving element corresponds to the light receiving elements illustrated by the dot pattern in FIG. 10A.

In the example of FIG. 10B, a light beam of each condensed light spot is received by three consecutive light receiving elements. Two light receiving elements that receive no light beam of the condensed light spot is present between two adjacent condensed light spots. Such light receiving elements are illustrated by a dot pattern in FIG. 10B. When there are two light receiving elements in which the detected light amounts are extremely low among five continuous light receiving elements, these light receiving elements correspond to the two light receiving elements illustrated by the dot pattern in FIG. 10B.

In both of FIGS. 10A and 10B, the light amount of each of the multiple separate condensed light spots can be separately detected by using one or more light receiving elements with low detected light amounts as markers. The detected light amount of the light receiving element with low detected light amount may be used for interpolation and incorporated into the light amount of the closest condensed light spot. For example, when there is one light receiving element with a low detected light amount, this light amount may be halved and added to the detected light amounts of the upper and lower condensed light spots. When there are two light receiving elements with low detected light amounts, the light amounts may be separately added to the detected light amounts of the condensed light spots closest to the respective two light receiving elements.

Next, an example of a configuration of the wavelength spectrometers 5a and 5b are described.

Figure 10C:
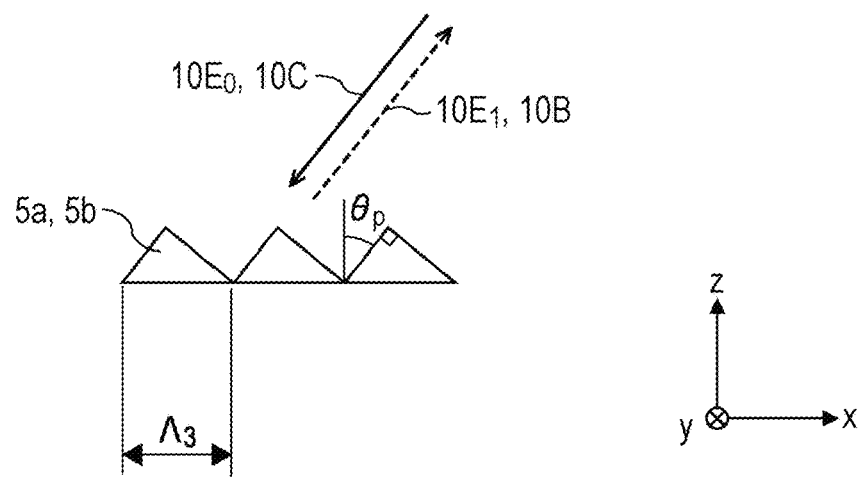
FIG. 10C is a view illustrating a cross section of a wavelength spectrometer parallel to an xz plane.
Figure 10D:
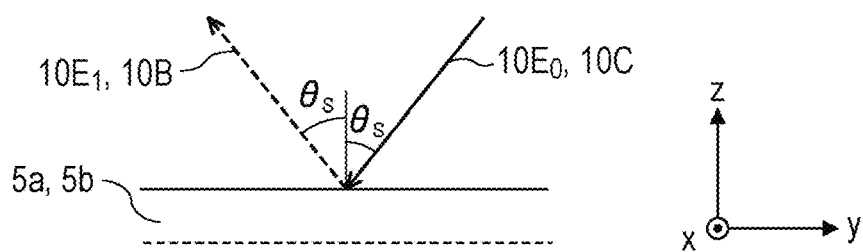
FIG. 10D is a view illustrating a cross section of the wavelength spectrometer parallel to a yz plane.

FIGS. 10C and 10D are views schematically illustrating an example of a cross-sectional shape of each of the wavelength spectrometers 5a and 5b. Each of the wavelength spectrometers 5a and 5b in the embodiment is a linear diffraction grating. To be more specific, each of the wavelength spectrometers 5a and 5b is a Littrow type reflective linear diffraction grating with a pitch $\Lambda_3$. Each of the wavelength spectrometers 5a and 5b are designed such that the entrance direction and the diffraction direction of the light beam substantially match each other in a plane including the normal line of a lattice surface and a lattice vector. In this description, in each of the wavelength spectrometers 5a and 5b, the direction of the lattice vector is assumed to be the x-axis direction, the direction in which the lattice line extends is assumed to be the y-axis direction, and the direction which is perpendicular to the x-axis and the y-axis and which is on the side from which the light beam comes is assumed to be the z-axis direction. FIG. 10C illustrates a cross section of each of the wavelength spectrometers 5a and 5b parallel to an xz plane. FIG. 10D illustrates a cross section of each of the wavelength spectrometers 5a and 5b parallel to a yz plane.

As illustrated in FIG. 10C, the cross section of each of the wavelength spectrometers 5a and 5b parallel to the xz plane has a triangular shape with a vertex of a right angle. One of two tilted surfaces forming a groove of the diffraction grating forms an angle of $\theta_p$ with a surface normal line. The azimuth of each of the entering light beams $10E_0$ and 10C to the wavelength spectrometers 5a and 5b in the xz plane forms an angle of $\theta_p$ with the surface normal line. Each of the reflected and diffracted light beams $10E_1$ and 10B similarly forms an angle of $\theta_p$ with the surface normal line on the same side.

Meanwhile, as illustrated in FIG. 10D, the azimuth of each of the entering light beams $10E_0$ and 10C to the wavelength spectrometers 5a and 5b in the yz plane forms an angle of $\theta_s$ with the surface normal line. Each of the reflected and diffracted light beams $10E_1$ and 10B forms an angle of $\theta_s$ with the surface normal line on the opposite side.

Figure 10E:
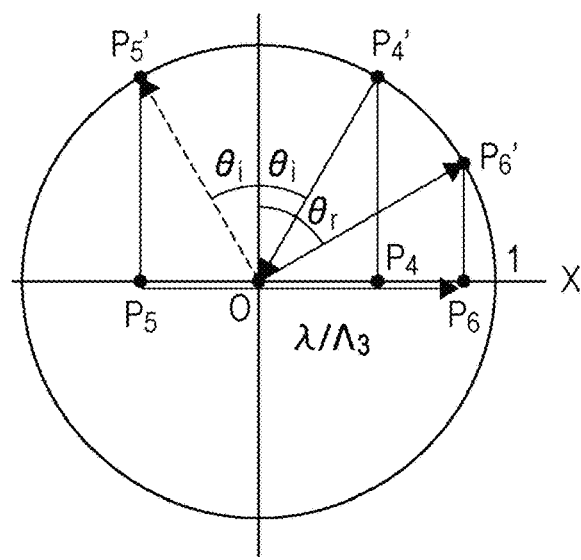
FIG. 10E is a vector diagram illustrating relationships between the entering light beam and the reflected light beam to the wavelength spectrometer in the xz plane.

FIG. 10E is a vector diagram illustrating relationships between the entering light beam to the wavelength spectrometers 5a and 5b and the reflected light beam in the xz plane. The incidence angle of the entering light beam and the reflection angle of the zeroth-order reflected light beam in the case where $\theta_s=0$ is assumed to be $\theta_i$ and the reflection angle of the reflected and diffracted light beam, that is the first-order reflection diffracted light beam is assumed to be $\theta_r$. A condition to be satisfied by the entering light beams 10E$_0$ and 10c and the reflected and diffracted light beams 10E$_1$ and 10B is expressed by Math 14.

$$\sin\theta_i + \sin\theta_r = \frac{\lambda}{\Lambda_3}$$

Since $\theta_i=\theta_r$ based on FIG. 10C, in FIG. 10E, P$_4'$ and P$_6'$ match P$_4$ and P$_6$, respectively, and a lattice vector P$_5$P$_6$ illustrated by an arrow with a size $\lambda/\Lambda_3$ becomes equal to twice a vector OP$_4$ formed by a foot of a perpendicular of a reflection vector.

When the pitch is calculated under a condition of $\theta_i=\theta_r=\theta_p=60$ degrees according conditions of the Littrow type, $\Lambda_3=0.5427$ μm in the case where $\lambda=0.940$ μm. When the wavelength of the light beam is shifted by 0.2 nm that is the interval of the multi-mode under this condition and is set to $\lambda=0.9402$ μm, $\theta_r=60.042$ degrees. In this case, the angle change is $\Delta\theta_r=0.042$ degrees. When the focal distance of each of the detection condensing lenses 13a and 13b is $f_D=40$ mm, the interval d$_1$ of the condensed light spots is d$_1$=f$_D$×tan $\Delta\theta_r$=30 μm. Accordingly, in this case, the width of each strip-shaped light receiving element is set to d$_2$=d$_1$/5=6 μm. When the diameter of the spot of each of the entering light beams 10E$_0$ and 10C is 1.5 mm, NA of a lens with a focal distance $f_D=40$ mm is 0.0188 and the diameter d$_0$ of each condensed light spot, that is the airy disc diameter is 15 μm(=d$_1$/2). In this case, the conditions illustrated in FIGS. 10A and 10B are satisfied.

Note that, in FIG. 10C, it seems as if the direction of the entering light beam and the direction of the reflected and diffracted light beam are the same and detectors cannot be arranged. However, in actual, since the entering light beam is tilted with respect to the surface normal line in the yz plane orthogonal to the lattice vector as illustrated in FIG. 10D, the azimuth of the entering light beam and the azimuth of the reflected and diffracted light beam are separate from each other and the detectors can be arranged.

Next, an example of signal processing in the embodiment is described.

Figure 11A:
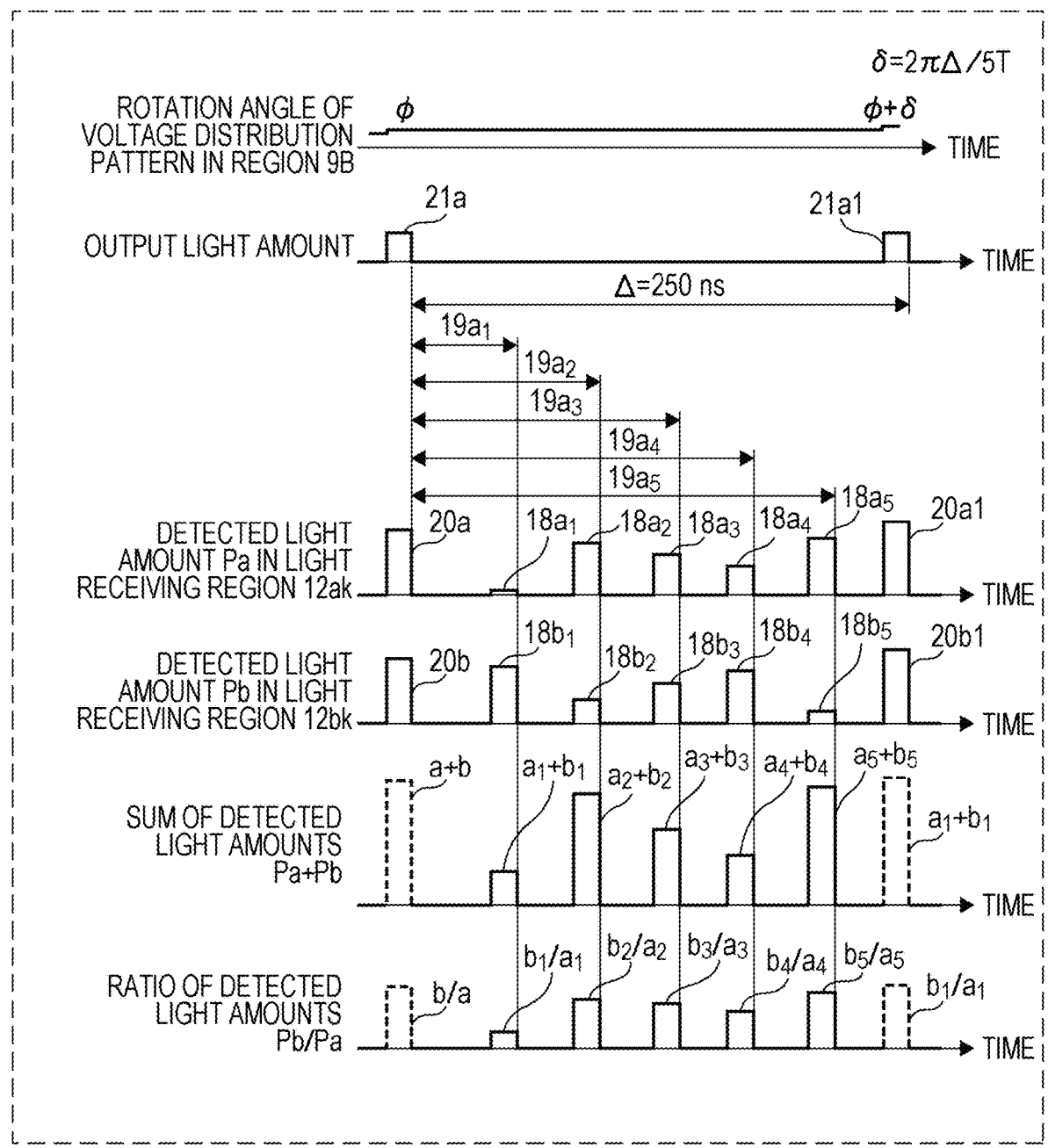
FIG. 11A is a diagram illustrating an example of signal processing.

FIG. 11A is a diagram for explaining the signal processing in the embodiment. FIG. 11A illustrates examples of a rotation angle of a voltage distribution pattern in the region 9B, an output light amount of the light source 1, a detected light amount Pa in a light receiving region 12ak of the light detector 12a, a detected light amount Pb in a light receiving region 12bk of the light detector 12b, the sum of the detected light amounts Pa+Pb, and a ratio of the detected light amounts Pb/Pa over time. In this case, the light receiving regions 12ak and 12bk indicate light receiving regions in which the k-th condensed light spots 17ak and 17bk among the n condensed light spots illustrated in FIG. 10A are formed.

Figure 11B:
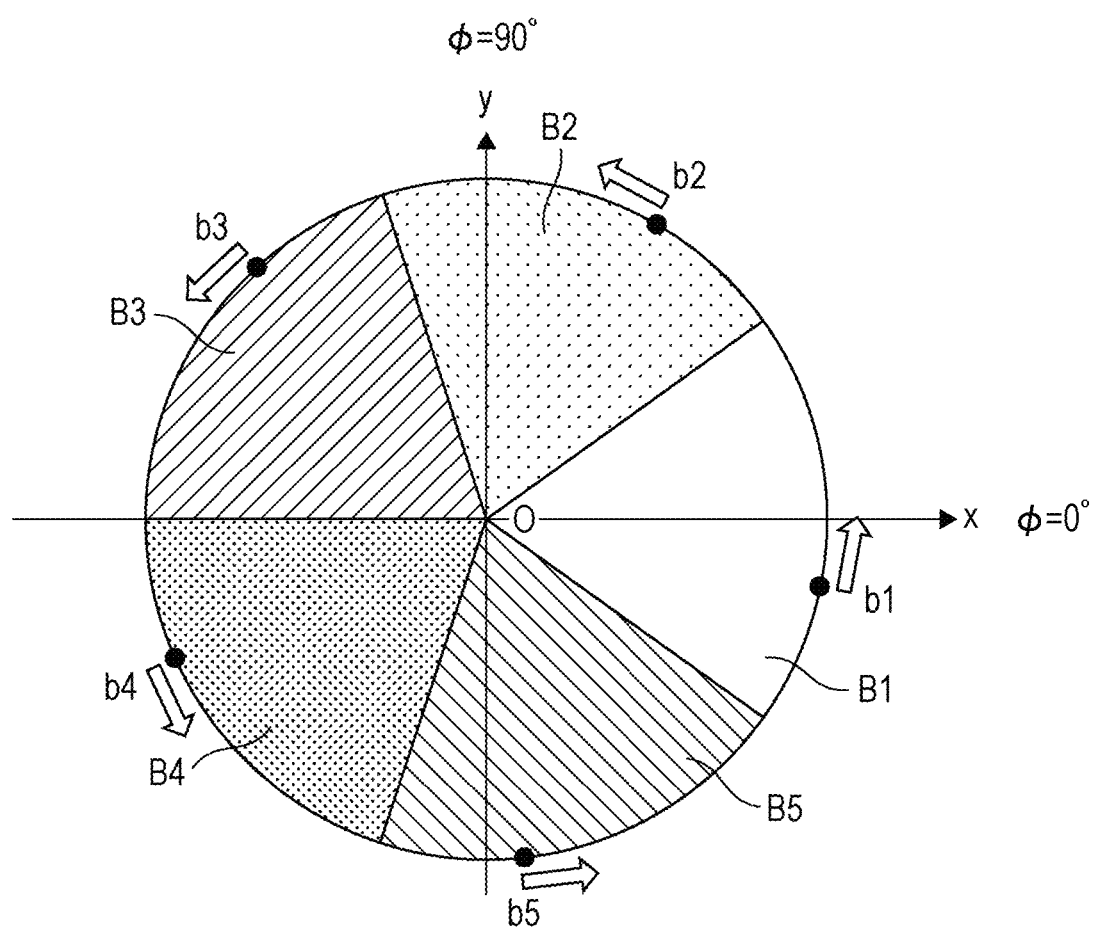
FIG. 11B is a view illustrating an example of relationships between divided regions of an electrode and moving directions of horizontal scanning beams.

FIG. 11B is a view illustrating an example of relationships between the divided regions of the region 9B that is an electrode and moving directions of horizontal scanning beams. In the example of FIG. 11B, the region 9B is divided into five fan-shaped divided regions B1, B2, B3, B4, and B5. The guided light beam for beam scanning propagates in each of the regions. The divided regions B1, B2, B3, B4, and B5 are responsible for horizontal scanning ranges of a range in which the deviation angle φ is −36 degrees to 36 degrees, a range in which the deviation angle φ is 36 degrees to 108 degrees, a range in which the deviation angle φ is 108 degrees to 180 degrees, a range in which the deviation angle φ is 180 degrees to 252 degrees, and a range in which the deviation angle φ is 252 degrees to 324 degrees, respectively. At a certain moment, scanning beams b1, b2, b3, b4, and b5 are made to radiate from the divided regions B1, B2, B3, B4, and B5, respectively. An angle of 72 degrees is formed between each adjacent two of the five scanning beams and the five scanning beams rotate about the center O at a constant angular velocity. A polarization amplitude of the light beam 10E$_0$ corresponding to a scanning beam of a point bk is expressed by Math 15, where ak is an amplitude coefficient and φ is an azimuth angle or a scanning angle. Note that k=1, 2, 3, 4, 5.

$$\text{amplitude of optical feedback} = \begin{pmatrix} a_k \cos\left(\phi - \frac{2\pi k}{5}\right) \\ a_k \sin\left(\phi - \frac{2\pi k}{5}\right) \end{pmatrix}$$

A relationship between the polarization amplitude of the light beam 10E$_0$ and the polarization amplitude of the transmitted light beam 10C is expressed by Math 16 by using a Jones matrix.

$$\begin{pmatrix} 1 & 0 \\ 0 & i \end{pmatrix}\begin{pmatrix} 1 & 0 \\ 0 & i \end{pmatrix}\begin{pmatrix} a_k \cos\left(\phi - \frac{2\pi k}{5}\right) \\ a_k \sin\left(\phi - \frac{2\pi k}{5}\right) \end{pmatrix} = \begin{pmatrix} 0 \\ ia_k \times \sin\left(\phi - \frac{2\pi k}{5}\right) \end{pmatrix}$$

On the left-hand side, the first term expresses a matrix of the polarization spectrometer 4, the second term expresses a matrix of the quarter wave plate 4a, and the third term expresses the polarization amplitude of the light beam 10E$_0$. The right-hand side expresses the polarization amplitude of the transmitted light beam 10C.

The detected light amounts Pa and Pb in the respective light detectors 12a and 12b are expressed respectively by Math 17 and Math 18 based on Math 15 and Math 16.

$$P_a = a_k^2 \cos^2\left(\phi - \frac{2\pi k}{5}\right) + a_k^2 \sin^2\left(\phi - \frac{2\pi k}{5}\right) = a_k^2$$

$$P_b = a_k^2 \sin^2\left(\phi - \frac{2\pi k}{5}\right)$$

The detected light amount ratio Pb/Pa is expressed by Math 19 based on Math 17 and Math 18.

$$\frac{P_b}{P_a} = \sin^2\left(\phi - \frac{2\pi k}{5}\right)$$

Figure 11C:
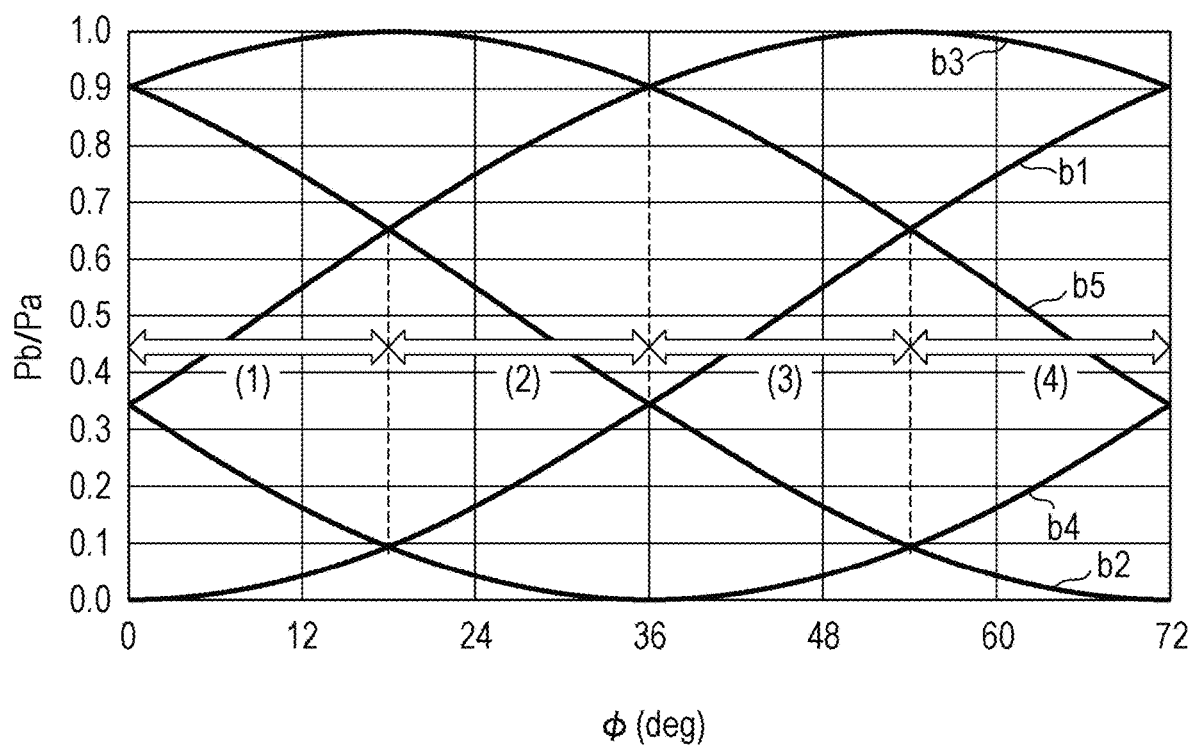
FIG. 11C is a diagram illustrating a relationship between an scanning angle φ and each of signals indicating detected light amount ratios for five scanning beams.

FIG. 11C is a diagram illustrating a relationship between the scanning angle φ and each of signals indicating the detected light amount ratios for the scanning beams b1, b2, b3, b4, and b5. This relationship can be obtained from Math 19. In the example illustrated in FIG. 11C, the following relationships are established.

Range of 0 degrees to 18 degrees: b1<b4<b3<b2<b5
Range of 18 degrees to 36 degrees: b4<b1<b2<b3<b5
Range of 36 degrees to 54 degrees: b4<b2<b1<b5<b3
Range of 54 degrees to 72 degrees: b2<b4<b5<b1<b3
Range of 72 degrees to 90 degrees: b2<b5<b4<b3<b1

In the range in which φ=72 degrees to 90 degrees, in comparison with the range in which φ=0 degrees to 18 degrees, the beam with the lowest ratio Pb/Pa changes from b1 to b2, the beam with the second lowest ratio Pb/Pa from b2 to b3, the beam with the third lowest ratio Pb/Pa from b3 to b4, the beam with the fourth lowest ratio Pb/Pa from b4 to b5, and the beam with the highest ratio Pb/Pa from b5 to b1. Similar rank change relationships are established in angle ranges beyond the aforementioned angle ranges. Thus, it is possible to know all magnitude relationships among the detected light amount ratios of the scanning beams in all angle ranges up to 360 degrees. Accordingly, when the scanning angle φ is determined by a drive signal to the region 9B, the magnitude relationships among the five detected light amount ratios are determined. Thus, it is possible to determine which one of the scanning beams the detection signal corresponds to.

In the example illustrated in FIG. 11A, a signal from the light source control circuit 30 that controls oscillation of the light source 1 changes, for example, every Δ=250 ns as a rectangular pulse with a width of 10 ns. Pulse light 21a and pulse light 21a1 are emitted according to this change. Pulse oscillation per 250 ns corresponds to 120,000 pulses per frame assuming that one frame is 30 ms. A change amount δ(=2πΔ/5T) corresponding to beam scanning is added to a rotation angle of the voltage applied to the region 9B in synchronization with this pulse signal. The voltage distribution pattern of the region 9B rotates ⅕ about the axis L in T=2 ms.

FIG. 11A illustrates an example of the detected light amounts Pa and Pb in the respective light receiving regions 12ak and 12bk over time. In a time range to a point 250 ns after the emission of the pulse light 21a, optical feedbacks from the divided regions B1, B2, B3, B4, and B5 are detected with delays of time differences $19a_1$, $19a_2$, $19a_3$, $19a_4$, and $19a_5$ that vary depending on a distance to an object present in each direction. Note that signal waveforms 20a, $20a_1$, 20b, and 20b1 are detections signals of light that has failed to enter the grating 8a being the input grating coupler and that has been directly reflected and fed back.

In the light receiving region 12ak of the light detector 12a, the optical feedbacks from the divided regions B1, B2, B3, B4, and B5 are detected as waveforms $18a_1$, $18a_2$, $18a_3$, $18a_4$, and $18a_5$. In the light receiving region 12bk, the optical feedbacks from the divided regions B1, B2, B3, B4, and B5 are detected as waveforms $18b_1$, $18b_2$, $18b_3$, $18b_4$, and $18b_5$. The main control circuit 34 receives an electric signal depending on the detected light amount Pa in each light receiving region of the light detector 12a and an electric signal depending on the detected light amount Pb in each light receiving region of the light detector 12b. The main control circuit 34 generates electric signals depending on the sum and ratio of these two electric signals. Signals of $a_1+b_1$, $a_2+b_2$, $a_3+b_3$, $a_4+b_4$, and $a_5+b_5$ are each generated as the sum signal Pa+Pb indicating the sum of the detected light amounts in the light detectors 12a and 12b. Signals of $b_1/a_1$, $b_2/a_2$, $b_3/a_3$, $b_4/a_4$, and $b_5/a_5$ are each generated as the signal ratio Pb/Pa indicating the ratio of the detected light amounts in the light detectors 12a and 12b.

Regarding the sum signals Pa+Pb, the aforementioned five signals are used as time of flight (TOF) signals. Meanwhile, these signals are based on reflection from objects varying in distance or reflectance. Accordingly, it is impossible to determine which signal corresponds to which one of the divided regions B1 to B5 only from the sum signals. However, adding the signal ratios Pb/Pa enables determination of which one of the five signals corresponds to which one of the divided regions B1 to B5, that is which one of the scanning beams $b_1$ to b5, from the magnitude relationships of the signal ratios. For example, in the example of the signal ratios illustrated in FIG. 11A, the relationship is $b_1/a_1<b_4/a_4<b_3/a_3<b_2/a_2<b_5/a_5$. Accordingly, when the scanning angle φ is in the range of 0 degrees to 18 degrees, it is found that these five signals are signals corresponding to the scanning beams $b_1$, $b_2$, $b_3$, $b_4$, and $b_5$, respectively, from the left. Meanwhile, when the scanning angle φ is in the range of 18 degrees to 36 degrees, it is found that these five signals are signals corresponding to the scanning beams b4, b3, b2, b1, and b5, respectively, from the left.

Figure 12A:
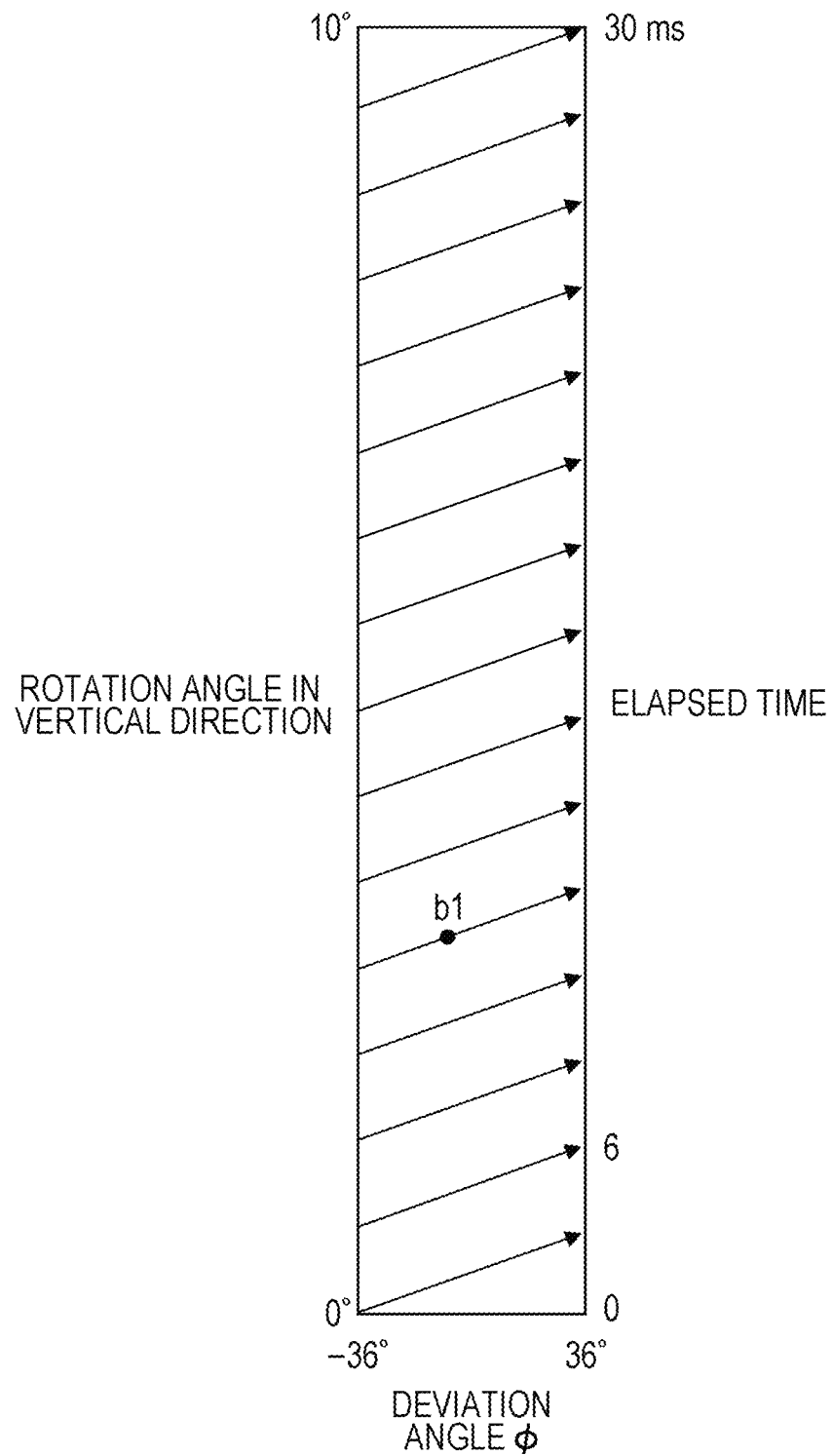
FIG. 12A is a view schematically illustrating a state of scanning in the horizontal direction and the vertical direction with a laser light beam of single mode oscillation in a divided region.

FIG. 12A is a view schematically illustrating a state of scanning in the horizontal direction and the vertical direction with a laser light beam of single mode oscillation in the divided region B1. In this example, voltage for achieving a distribution for the aberration correction is applied to the region 9B in the angle range of ±36 degrees with a direction connecting the center O and each of the points b1, b2, b3, b4, and b5 illustrated in FIG. 11B being the center of the application. The light beam from each of the points b1, b2, b3, b4, and b5 becomes a parallel beam as a result of the aberration correction and scans a region assigned to the light beam while maintaining an angle difference of 72 degrees from the adjacent light beams. The point b1 and the arrows illustrated in FIG. 12A illustrate a state of beam scanning in the divided region B1 corresponding to the range of φ=−36 degrees to 36 degrees. Similarly, scanning with light beams from the points b2, b3, b4, and b5 are also performed in the regions assigned to these light beams in synchronization. Assuming that the cycle of the voltage distribution in the region 9B is T=2 ms, in order to perform scanning at video speed of 33 frames per second, that is a cycle of 30 ms, the number of scanning lines in the vertical direction is set to 30/2=15. Assuming that the refractive index variation of the liquid crystal is 0.15, the aforementioned number of scanning lines can be achieved with effective refractive index variation of about ΔN=0.04 based on FIG. 7B. Based on Math 5, the width of this effective refractive index variation corresponds to about 10 degrees in terms of an angle difference of the radiating light beam from the grating 8c. Accordingly, the vertical scanning can be performed at intervals equal to a value obtained by dividing a vertical angle range of 10 degrees by 15. In this case, an angle between each adjacent scanning lines is 10/15=about 0.67 degrees.

Figure 12B:
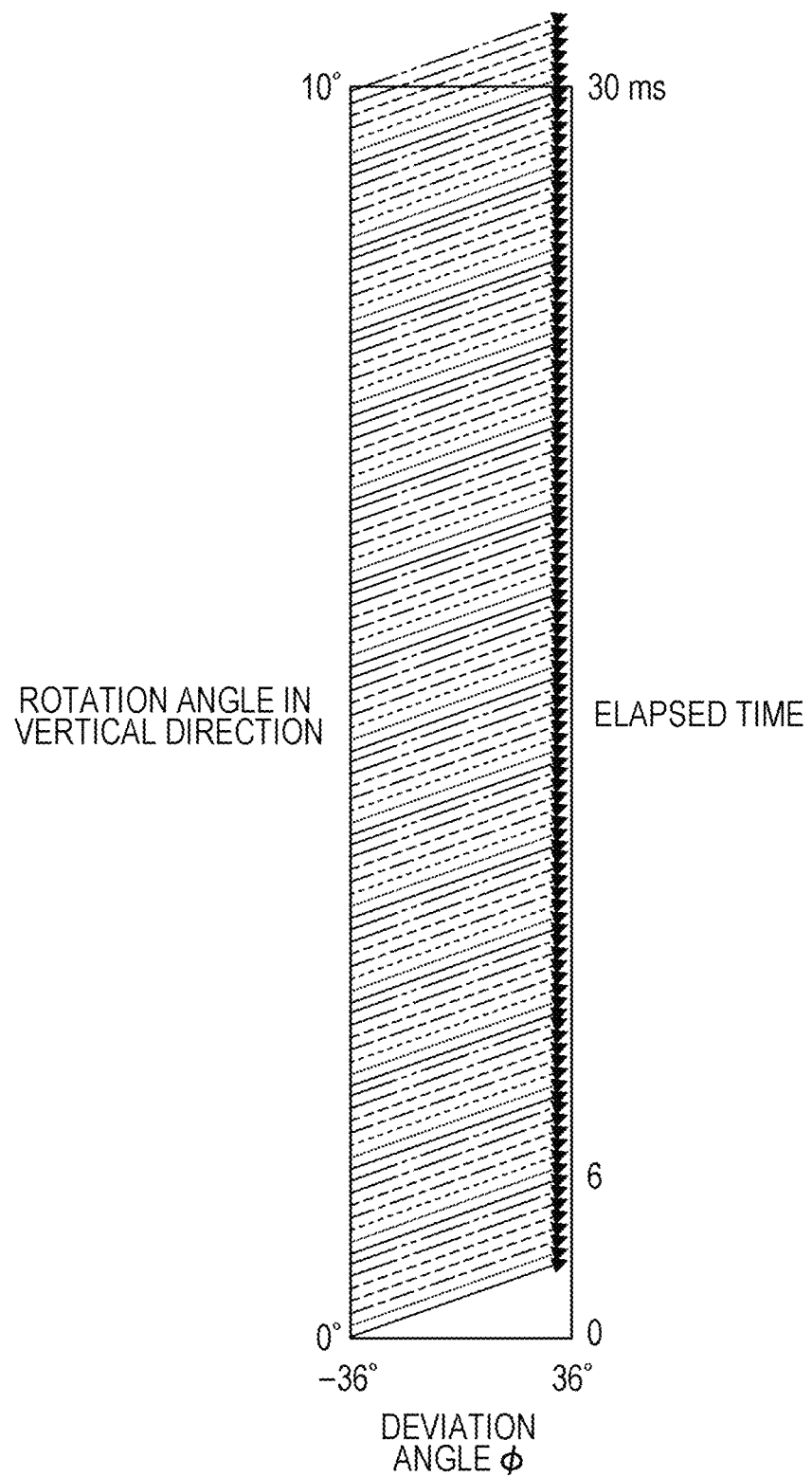
FIG. 12B is a view schematically illustrating a state of scanning in the horizontal direction and the vertical direction with a laser light beam of multi-mode oscillation in the divided region.

FIG. 12B is a view schematically illustrating a state of scanning in the horizontal direction and the vertical direction with a laser light beam of multi-mode oscillation in the divided region B1. The light source 1 oscillates the laser light beam in multi-mode as illustrated in the dotted line frame in FIG. 1A. This multi-mode light beam is, for example, overlapping of single-mode light beams with wavelengths $\lambda_1, \lambda_2, \ldots \lambda_n$ set away from one another at intervals of about 0.2 nm near the wavelength λ. Based on Math 7, the wavelength difference of 0.2 nm corresponds to about 0.1 degrees in terms of an angle difference of the radiating light from the grating 8c. Accordingly, a section between each two adjacent scanning lines in FIG. 12A can be filled without a gap with seven multi-mode oscillation light beams as illustrated in FIG. 12B. The optical feedbacks corresponding to the respective scanning lines in FIG. 12B are independently detected by the light receiving regions 12*ak* and 12*bk* of the light detectors. In this case, a spatial resolution in the signal detection is seven times that in FIG. 12A. In other words, the number of vertical scanning lines of 100 or more can be achieved. Note that it is desirable that the intensity of the oscillation light in each mode is temporally stable in the multi-mode oscillation. Such oscillation can be achieved by superimposing an AC signal of several hundred MHz to a drive current of the laser light source.

As described above, according to the configuration of the embodiment, a parallel laser light beam with a small divergence angle can be made to exit toward an external object. In this case, for example, scanning with the exiting beam can be performed at video speed of 30 frames per second or more with the number of vertical scanning lines being 100 or more in a field of view of 360 degrees in the horizontal direction and 10 degrees in the vertical direction.

Second Embodiment

Figure 13A:
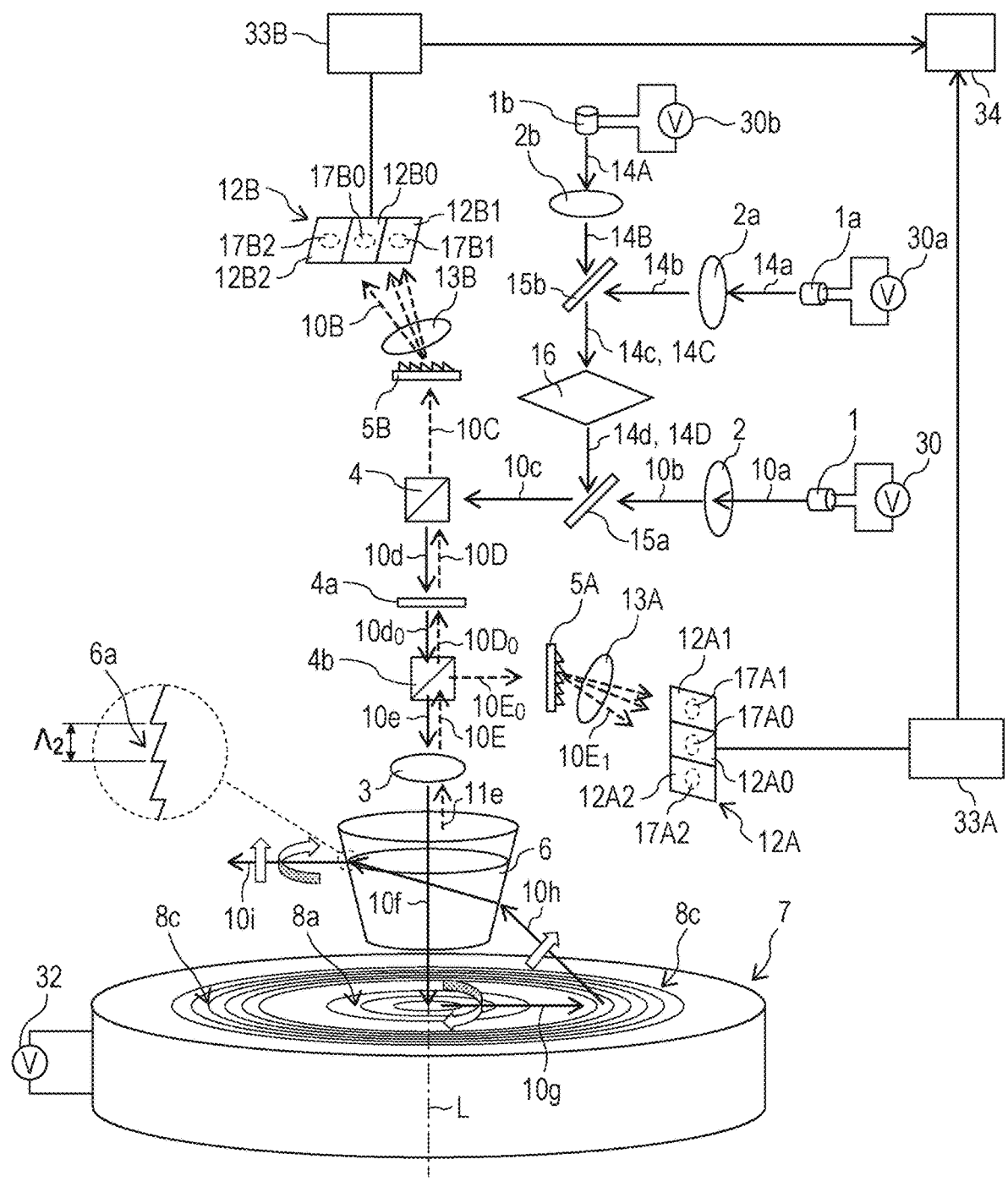
FIG. 13A is a perspective view schematically illustrating a configuration of an optical apparatus and a path of a beam in a second embodiment.

FIG. 13A is a perspective view schematically illustrating a configuration of an optical apparatus and a path of a beam in a second embodiment.

In the embodiment, the wavelength spectrometers 5*a* and 5*b* and the detection condensing lenses 13*a* and 13*b* in the first embodiment are replaced by wavelength spectrometers 5A and 5B and detection condensing lenses 13A and 13B and light sources 1*a* and 1 *b*, collimator lenses 2*a* and 2*b*, light source control circuits 30*a* and 30*b*, a conical lens 16, and wavelength filters 15*a* and 15*b* are added. Other configurations are the same as those in the first embodiment. Points different from the first embodiment are described below and overlapping description is omitted.

The light sources 1, 1*a*, and 1*b* emit laser light beams 10*a*, 14*a*, and 14A that are linearly-polarized light beams with wavelengths $\lambda_0$, $\lambda_0-\Delta\lambda$, and $\lambda_0+\Delta\lambda$, respectively, in response to control signals from the light source control circuits 30, 30*a*, and 30*b* that control laser oscillation. Each of the laser light beams 10*a*, 14*a*, and 14A may be a single mode light beam or a multi-mode light beam. For example, $\Delta\lambda$ may be set to a value of about 20 nm. The collimator lenses 2, 2*a*, and 2*b* convert the laser light beams 10*a*, 14*a*, and 14A to parallel light beams 10*b*, 14*b*, and 14B, respectively. The wavelength filter 15*b* is a dichroic mirror designed to reflect the light beam with the wavelength $\lambda_0-\Delta\lambda$ and transmit the light beam with the wavelength $\lambda_0+\Delta\lambda$. The parallel light beam 14*b* is reflected on the wavelength filter 15*b* and becomes a reflected light beam 14*c*. The parallel light beam 14B is transmitted through the wavelength filter 15*b* and becomes a transmitted light beam 14C. The reflected light beam 14*c* and the transmitted light beam 14C enter the conical lens 16 and are transmitted respectively as light beams 14*d* and 14D forming conical wavefronts. The wavelength filter 15*a* is a dichroic mirror designed to reflect the light beams with the wavelengths $\lambda_0-\Delta\lambda$ and $\lambda_0+\Delta\lambda$ and transmit the light beam with the wavelength $\lambda_0$. The parallel light beam 10*b* is transmitted through the wavelength filter 15*a* to become the light beam 10*c*. The transmitted light beams 14*d* and 14D are reflected on the wavelength filter 15*a* to overlap the light beam 10*c*.

The paths of the light beams in the outgoing route and the return route hereinafter are substantially the same as those in the first embodiment. In the return route, about half of the light beam 10E having traveled to the position of the half mirror 4*b* along the same path as that in the outgoing route in the reverse direction is reflected on the half mirror 4*b* to become the light beam $10E_0$. When the light beam $10E_0$ is transmitted through the wavelength spectrometer 5A, the light beam $10E_0$ is diffracted and the light beams $10E_1$ dispersed depending on the wavelength are generated. The light beams $10E_1$ are condensed by the detection condensing lens 13*a* and form condensed light spots 17AG, 17A1, and 17A2 on the light receiving surface of the light detector 12A. The light detector 12A detects the condensed light spots 17AG, 17A1, and 17A2. The light detector 12A is divided into strip-shaped light detectors 12A0, 12A1, and 12A2 to separately detect the condensed light spots 17AG, 17A1, and 17A2. A component $10D_0$ of the light beam 10E that is transmitted through the half mirror 4*b* is transmitted through the quarter wave plate 4*a* to become the transmitted light beam 10D. Part of the transmitted light beam 10D is transmitted through the polarization spectrometer 4 and is diffracted as a transmitted light beam 10C while being transmitted through the wavelength spectrometer 5B and the light beams 10B dispersed depending on the wavelength are generated. The light beams 10B are condensed by the detection condensing lens 13B and form condensed light spots 17B0, 17B1, and 17B2 on the light receiving surface of the light detector 12B. The light detector 12B detects the condensed light spots 17B0, 17B1, and 17B2. The light detector 12B is divided into strip-shaped light detectors 12B0, 12B1, and 12B2 to separately detect the condensed light spots 17B0, 17B1, and 17B2.

The condensed light spots 17AG and 17B0 correspond to the light beam with the wavelength $\lambda_0$. The condensed light spots 17A1 and 17B1 correspond to the light beam with the wavelength $\lambda_0-\Delta\lambda$. The condensed light spots 17A2 and 17B2 correspond to the light beam with the wavelength $\lambda_0+\Delta\lambda$. The light detector 12A is connected to the detection circuit 33A. The light detector 12B is connected to the detection circuit 33B. The detection signals outputted from the light detectors 12A and 12B are processed by the detection circuits 33A and 33B, respectively. The main control circuit 34 generates light source control signals for controlling the light sources 1, 1*a*, and 1*b* and a liquid crystal control signal for controlling the alignment of the liquid crystal based on the detection signals outputted from the detection circuits 33A and 33B. The main control circuit 34 outputs the light source control signals to the light source control circuits 30, 30*a*, and 30*b* and outputs the liquid crystal control signal to the liquid crystal control circuit 32. Note that all or some of the light source control circuits 30, 30A, and 30B, the liquid crystal control circuit 32, and the main control circuit 34 may be integrated into one control circuit.

Figure 13B:
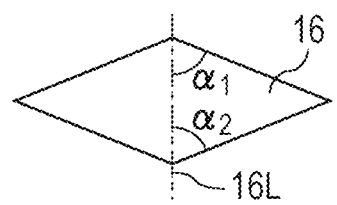
FIG. 13B is a view schematically illustrating a cross section of a conical lens.
Figure 13C:
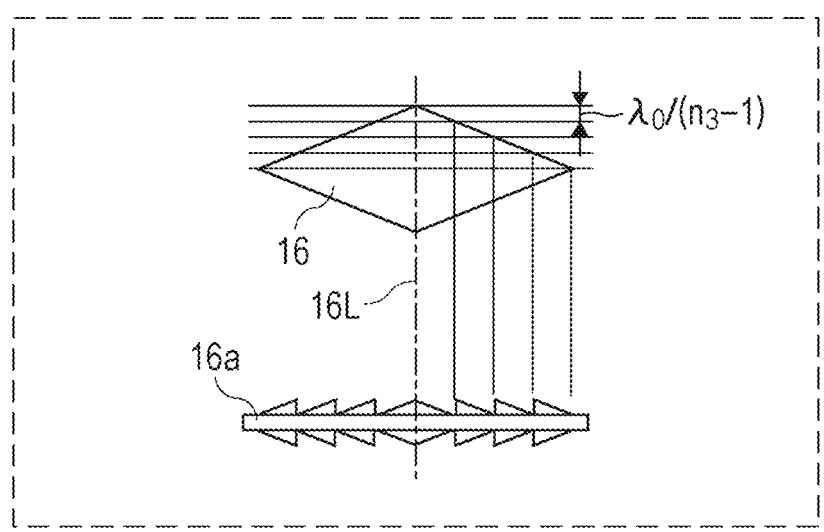
FIG. 13C is a view schematically illustrating a cross-sectional shape of a conical Fresnel lens.

FIG. 13B is a view schematically illustrating a cross section of the conical lens 16. The conical lens 16 has a shape obtained by arranging two conical surfaces having an axis 16L as center axes upside down to each other. A vertex angle $\alpha_1$ on the incidence side is larger than a vertex angle $\alpha_2$ on the transmittance side. A conical Fresnel lens 16*a* illustrated in a lower portion of FIG. 13C may be used instead of the conical lens 16. FIG. 13C is a view schematically illustrating a cross-sectional shape of the conical Fresnel lens 16*a*. The conical Fresnel lens 16*a* has a shape obtained by slicing upper and lower refraction surfaces of the conical lens 16 at multiple cut planes that are orthogonal to the center axis 16L and that are located at intervals of $\lambda_0/(n_3-1)$ and collapsing the sliced surfaces along the center axis 16L to arrange them on one plane. In this case, $\lambda_0$ is the center wavelength of the transmitted light beam and $n_3$ is the refractive index of the material forming the lens. Effects similar to those in the case where the conical lens 16 is used can be obtained also in the case where the conical Fresnel lens 16a is used.

Figure 13D:
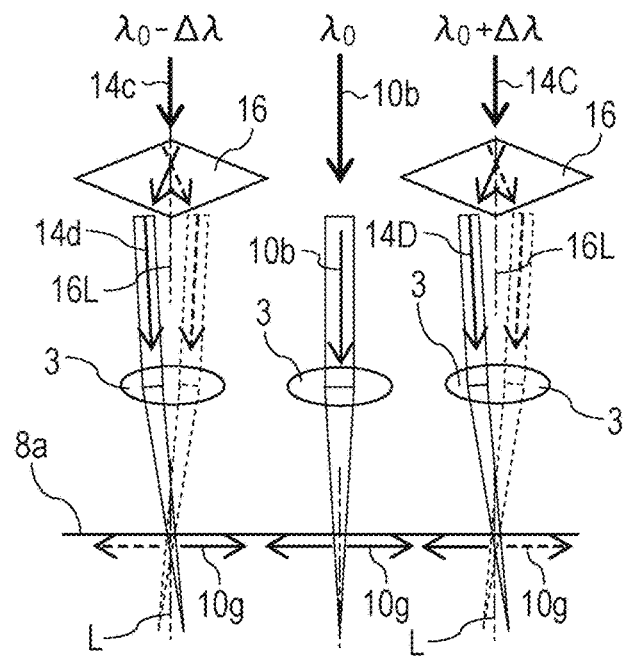
FIG. 13D is a cross-sectional view illustrating how a light path of a light beam entering a grating coupler varies depending on whether the light beam is transmitted through the conical lens or not.

FIG. 13D is a cross-sectional view illustrating how a path of a light beam entering the grating 8a being a grating coupler varies depending on whether the light beam is transmitted through the conical lens 16 or not. The light beam 10b with the wavelength $\lambda_0$ perpendicularly enters the grating 8a in a slightly defocused state. The grating 8a is designed to satisfy Math 1 for the light beam 10b with the wavelength $\lambda_0$. Accordingly, the light beam 10b excites the guided light beam 10g traveling from the center of the grating 8a toward the outer peripheral side in all directions in an almost optimal condition. The light beam 14c with the wavelength $\lambda_0-\Delta\lambda$ and the light beam 14C with the wavelength $\lambda_0+\Delta\lambda$ are both transmitted through the conical lens 16 and then become the light beams 14d and 14D with conical wavefronts having ring-shaped intensity distribution. Since the vertex angle $\alpha_1$ is greater than the vertex angle $\alpha_2$ in the conical lens 16, the conical wavefronts are formed such that the ring-shaped intensity distribution converges on the axis 16L. The optimal incidence angle of each of the light beams 14d and 14D to the grating 8a can be calculated from a relational formula in which $\Lambda_1$ and $n_0$ in Math 2 are replaced by $\Lambda_0$ and 1, respectively. For example, assuming that $\lambda_0$=940 nm and $\Delta\lambda$=20 nm, the optimal incidence angle of the light beam 14d is about −4 degrees and the optimal incidence angle of the light beam 14D is about 4 degrees. The two wavefronts of each of the light beams 14d and the 14D that have conical wavefronts are each tilted at 4 degrees with the center axis 16L of the conical lens 16 extending therebetween. These tilts are maintained also after the light beams are transmitted through the condensing lens 3. Then, these light beams enter the grating 8a in a slightly defocused state. In this case, the light beam 14d satisfies the conditions of the optical incidence angle in two directions in such a way that the two wavefronts are waveguided to intersect each other on the center axis L. The light beam 14D satisfies the conditions of the optical incidence angle in two directions in such a way that the two wavefronts are waveguided to be turned back at the center axis L. Accordingly, the coupling conditions to the grating 8a can be simultaneously satisfied for the three laser light beams with the wavelengths $\lambda_0$, $\lambda_0-\Delta\lambda$, and $\lambda_0+\Delta\lambda$.

Figure 13E:
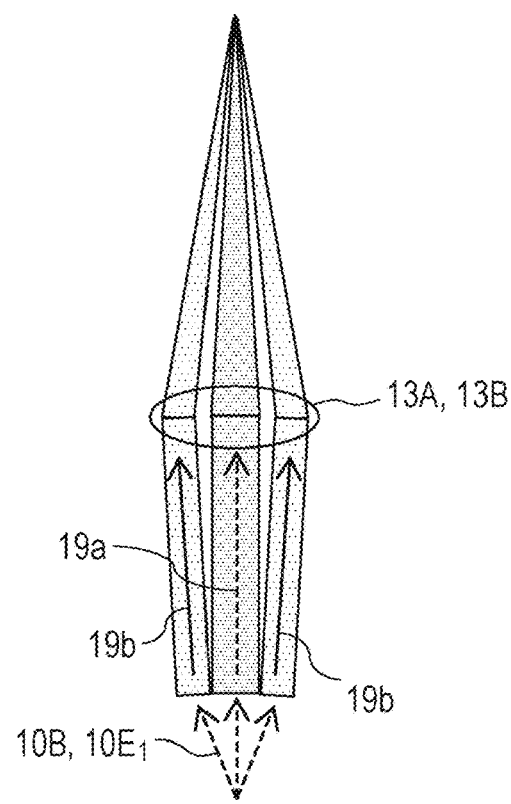
FIG. 13E is a cross-sectional view illustrating a state of condensation by a detection condensing lens in the second embodiment.

FIG. 13E is a cross-sectional view illustrating a state of condensation by each of the detection condensing lenses 13A and 13B in the embodiment. The light beam with the wavelength $\lambda_0$ among the light beams $10E_1$ transmitted through and diffracted by the wavelength spectrometer 5A or among the light beams 10B transmitted through and diffracted by the wavelength spectrometer 5B perpendicularly radiates from the grating 8a and thus becomes a light beam 19a passing a center region of the detection condensing lens 13A or 13B. Meanwhile, since the light beams with the wavelengths $\lambda_0-\Delta\lambda$ and $\lambda_0+\Delta\lambda$ radiate at an angle of about 4 degrees with respect to the center axis L of the grating 8a, these light beams become light beams 19b passing an outer edge region of the detection condensing lens 13A or 13B. Since the light beams 19a and 19b pass different regions of the detection condensing lens 13A or 13B, the detection condensing lens can be designed to condense each light beam without aberration.

Figure 14:
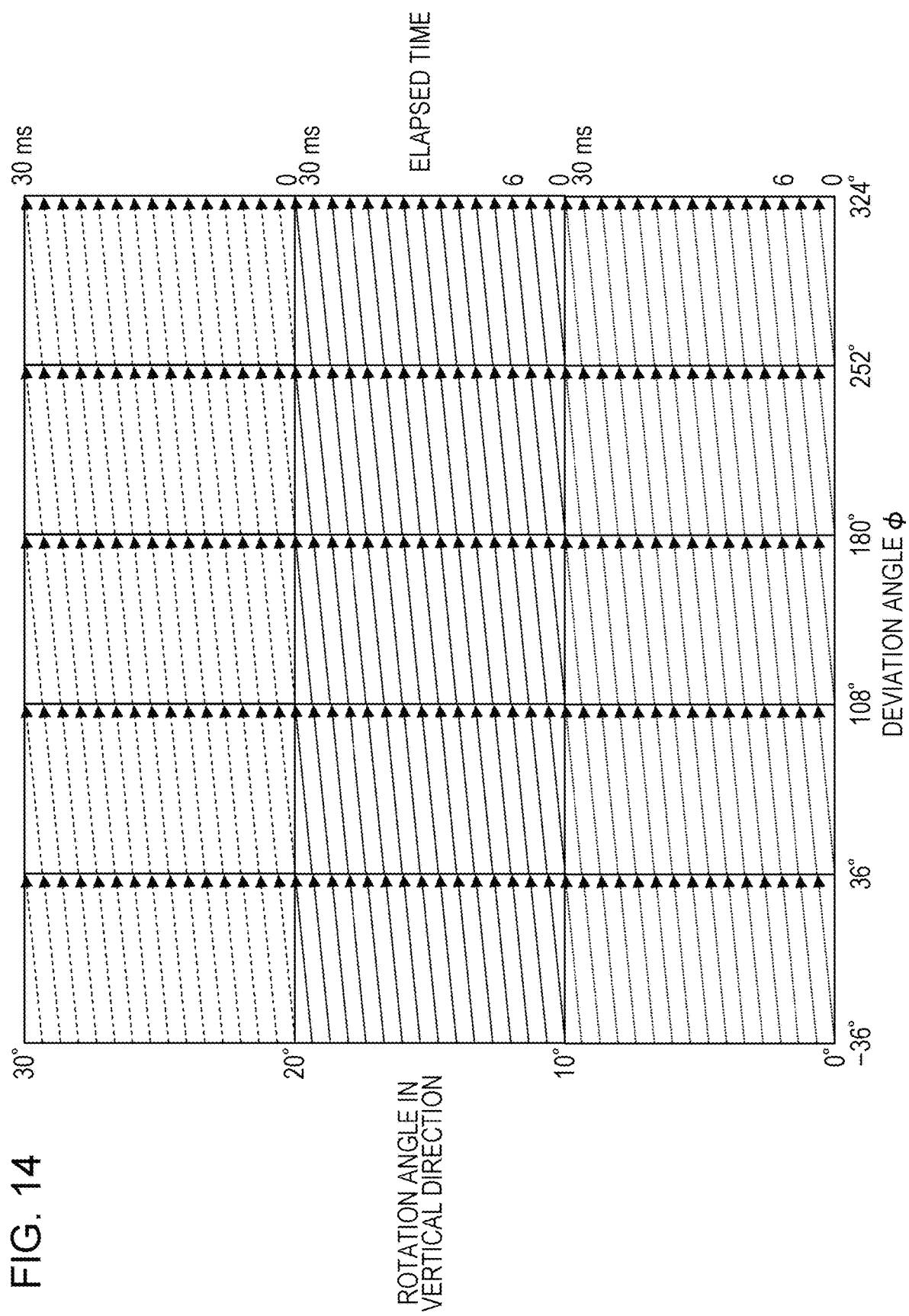
FIG. 14 is a view schematically illustrating an example of scanning in the horizontal direction and the vertical direction with a laser light beam of single mode oscillation in divided regions illustrated in FIG. 11B.

FIG. 14 is a view schematically illustrating an example of scanning in the horizontal direction and the vertical direction with a laser light beam of single mode oscillation in the divided regions B1, B2, B3, B4, and B5 illustrated in FIG. 11B. In this example, angles of 0 degrees to 10 degrees is a range in which scanning with the light beam with the wavelength $\lambda_0-\Delta\lambda$ is performed, angles of 10 degrees to 20 degrees is a range in which scanning with the light beam with the wavelength $\lambda_0$ is performed, and angles of 20 degrees to 30 degrees is a range in which scanning with the light beam with the wavelength $\lambda_0+\Delta\lambda$ is performed. According to the embodiment, the scanning range and the number of scanning lines in the vertical direction are tripled from those in the example of FIG. 12A.

As described above, according to the configuration of the embodiment, laser light beams with small divergence angles can be made to exit toward an external object. In this case, for example, scanning can be performed with the scanning range and the number of vertical scanning lines in the vertical direction tripled in a field of view of 360 degrees in the horizontal direction.

Although the three light source 1, 1a, and 1b are used in the embodiment, only two of the three light sources may be used. Even in this case, the scanning range and the number of vertical scanning lines in the vertical direction can be doubled from those in the example of FIG. 12A. Moreover, four or more light sources that emit light beams with different wavelengths can be used.

A method used in any of the aforementioned embodiments can be applied to other embodiments. For example, multi-mode oscillation laser light sources can be used as the light sources 1, 1a, and 1b in the second embodiment. In this case, the wavelength spectrometers 5A and 5B are changed to reflection type spectrometers illustrated in FIGS. 10C and 10D and detectors finely divided in strip shapes as illustrated in FIG. 10A may be used as the light detectors $12\Lambda_0$, 12A1, 12A2 and the light detectors 12B0, 12B1, and 12B2. Such changes enable independent detection of light beams oscillated in the respective modes by multi-mode oscillation. Accordingly, the effects of the second embodiment are added to the effects of the first embodiment. Specifically, it is possible to triple the scanning range and the number of vertical scanning lines in the vertical direction and also increase the density of the vertical scanning lines seven times.

As described above, according to the aforementioned embodiment, parallel laser light beams with small divergence angles can be made to exit toward external objects. In this case, for example, scanning with the exiting beams can be performed at video speed of 30 frames per second or more in a field of view of 360 degrees in the horizontal direction and 30 degrees in the vertical direction. Moreover, it is possible to selectively detect only the light beams from which stray light is removed and whose wavelength and phase are aligned among the reflected light beams from the objects. Information on the detected light beams can be converted to accurate two-dimensional distance information of the objects in the field of view. Three-dimensional positional relationships may be obtained from the two-dimensional distance information.

The technique of the present disclosure can be used in, for example, application of obtaining three-dimensional position information of an object by scanning a space with a light beam and selectively detecting a reflected light beam from the object.

What is claimed is:
1. An optical apparatus comprising:
at least one light source that emits a light beam containing components of a plurality of wavelengths;
an optical waveguide element that is located on a light path of the light beam;

a light detector; and an optical system, wherein the optical waveguide element includes:
- a first grating that has a refractive index varying along a moving radius direction of an imaginary circle about a point of incidence of the light beam and that causes part of the light beam to propagate in the optical waveguide element along the moving radius direction as a guided light beam; and
- a second grating that is arranged outside the first grating and has a refractive index varying along the moving radius direction and that causes part of the guided light beam to exit from the optical waveguide element as an exiting light beam, the optical system causes the light beam to enter the first grating and causes a reflected light beam generated by reflection of the exiting light beam on an object to enter the second grating, part of the reflected light beam entering the second grating propagates in the optical waveguide element and exits from the first grating as an optical feedback beam, the optical system causes part of the optical feedback beam to enter the light detector as a plurality of separated light beams separated depending on wavelength, and the light detector detects a light amount of each of the separated light beams.

2. The optical apparatus according to claim 1, wherein the first grating has a concentric structure about the point of incidence of the light beam.

3. The optical apparatus according to claim 1, wherein the second grating has a concentric structure about the point of incidence of the light beam.

4. The optical apparatus according to claim 1, wherein the at least one light source is a single light source that emits a single light beam containing the components of the plurality of wavelengths.

5. The optical apparatus according to claim 1, wherein
the at least one light source includes a plurality of light sources,
each of the plurality of light sources emits a corresponding one of a plurality of light beams with different wavelengths, and
the optical system integrates the plurality of light beams and causes the integrated light beam to enter the first grating.

6. The optical apparatus according to claim 5, wherein the optical system includes a dichroic mirror that integrates the plurality of light beams.

7. The optical apparatus according to claim 1, wherein the optical system includes a linear diffraction grating that separates part of the optical feedback beam depending on wavelength to generate the plurality of separated light beams.

8. The optical apparatus according to claim 7, wherein
the linear diffraction grating is a reflection type linear diffraction grating, and
an entrance direction of the light beam and a diffraction direction of the light beam substantially match each other in a plane including a normal line of a diffraction surface of the reflection type linear diffraction grating and a grating vector of the reflection type linear diffraction grating.

9. The optical apparatus according to claim 1, wherein the optical system includes an optical element that converts a wavefront of the light beam to a conical wavefront, and the optical system causes the light beam to enter the first grating with the conical wavefront maintained.

10. The optical apparatus according to claim 1, wherein
the optical system includes a transparent member having a bottom surface that faces the optical waveguide element and a side surface that is a rotationally-symmetrical body having an imaginary axis extending along the light path as a center axis, and
the exiting light beam enters the transparent member from the bottom surface or the side surface and exits from the side surface.

11. The optical apparatus according to claim 10, wherein
the transparent member is a truncated conical prism,
a bottom surface with a smaller area out of two bottom surfaces of the truncated conical prism facing each other is in contact with a surface of the optical waveguide element, and
the exiting light beam enters a side surface of the truncated conical prism.

12. The optical apparatus according to claim 11, wherein the side surface of the truncated conical prism includes a grating whose grating line extends along a circumferential direction of the truncated conical prism.

13. The optical apparatus according to claim 11, wherein
the optical waveguide element includes a hollow substrate on the surface, the hollow substrate including a cavity or a recess with a truncated conical shape having the axis as a center axis, and
the truncated conical prism is surrounded by the cavity or the recess.

14. The optical apparatus according to claim 1, wherein the optical waveguide element includes:
a transparent electrode layer;
a liquid crystal layer;
a waveguide layer including the first grating and the second grating on a surface and having a higher refractive index than the liquid crystal layer;
a dielectric layer having a lower refractive index than the waveguide layer; and
a reflective electrode layer in this order.

15. The optical apparatus according to claim 14, wherein
the waveguide layer further includes a third grating, used to control alignment of liquid crystal molecules in the liquid crystal layer, on the surface between the first grating and the second grating, and
at least one selected from the group consisting of the transparent electrode layer and the reflective electrode layer includes a first electrode facing the first grating, a second electrode facing the second grating, and a third electrode facing the third grating.

16. The optical apparatus according to claim 15, wherein
the third electrode includes a plurality of divided regions arranged in a circumferential direction of the imaginary circle, and
the plurality of divided regions are insulated from one another.

17. The optical apparatus according to claim 15, further comprising a control circuit that applies voltage between the transparent electrode layer and the reflective electrode layer.

18. The optical apparatus according to claim 17, wherein the control circuit controls a direction of the exiting light beam by controlling voltage applied to the liquid crystal layer via the second electrode.

* * * * *